United States Patent
Schamp

(10) Patent No.: US 8,768,007 B2
(45) Date of Patent: Jul. 1, 2014

(54) METHOD OF FILTERING AN IMAGE

(75) Inventor: Gregory Gerhard Schamp, South Lyon, MI (US)

(73) Assignee: TK Holdings Inc., Pontiac, MI (US)

( * ) Notice: Subject to any disclaimer, the term of this patent is extended or adjusted under 35 U.S.C. 154(b) by 269 days.

(21) Appl. No.: 13/429,803

(22) Filed: Mar. 26, 2012

(65) Prior Publication Data

US 2013/0251193 A1 Sep. 26, 2013

(51) Int. Cl.
*G06K 9/00* (2006.01)
*G06K 9/76* (2006.01)
*G06K 9/40* (2006.01)

(52) U.S. Cl.
USPC .......... 382/103; 382/210; 382/260; 382/274; 382/275

(58) Field of Classification Search
CPC ............... G06T 5/002; G06T 2207/20012; G06T 2207/20021; G06T 2207/20192; G06K 9/40
USPC .......... 382/103, 209, 210, 260–265, 274, 275
See application file for complete search history.

(56) References Cited

U.S. PATENT DOCUMENTS

| | | |
|---|---|---|
| 4,802,230 A | 1/1989 | Horowitz |
| 5,307,136 A | 4/1994 | Saneyoshi |
| 5,400,244 A | 3/1995 | Watanabe et al. |
| 5,487,116 A | 1/1996 | Nakano et al. |
| 5,671,290 A | 9/1997 | Vaidyanathan |
| 5,835,614 A | 11/1998 | Aoyama et al. |
| 5,937,079 A | 8/1999 | Franke |
| 5,987,174 A | 11/1999 | Nakamura et al. |
| 6,031,935 A | 2/2000 | Kimmel |
| 6,122,597 A | 9/2000 | Saneyoshi et al. |
| 6,169,572 B1 | 1/2001 | Sogawa |
| 6,215,898 B1 | 4/2001 | Woodfill et al. |
| RE37,610 E | 3/2002 | Tsuchiya et al. |

(Continued)

FOREIGN PATENT DOCUMENTS

| | | |
|---|---|---|
| EP | 0281725 A2 | 9/1988 |
| EP | 1944620 B1 | 1/2010 |

(Continued)

OTHER PUBLICATIONS

Zabih, R.; and Woodfill, J.; "Non-parametric Local Transforms for Computing Visual Correspondence," Proceeding of European Conference on Computer Vision, Stockholm, Sweden, May 1994, pp. 151-158.

(Continued)

*Primary Examiner* — Stephen R Koziol
*Assistant Examiner* — Timothy Choi
(74) *Attorney, Agent, or Firm* — Raggio & Dinnin, P.C.

(57) ABSTRACT

For each of a plurality of homogeneity regions in relative pixel space, a deviation associated therewith with respect to a pixel to be filtered is given by a sum of associated difference values, each difference value given by the absolute value of a difference between a value of a pixel to be filtered and that of a neighboring pixel selected in accordance with the selected homogeneity region. The filtered pixel value is responsive to values of the neighboring pixels for the homogeneity region with minimum deviation. The relative pixel locations of each homogeneity region are symmetric relative to a radially-extending axis extending outwards in a corresponding polar direction therealong from a relatively central pixel location to a boundary of the homogeneity region, including all relative pixels intersected by the radially-extending axis, different homogeneity regions being associated with different polar directions.

6 Claims, 42 Drawing Sheets

(56) References Cited

U.S. PATENT DOCUMENTS

| | | | |
|---|---|---|---|
| 6,456,737 | B1 | 9/2002 | Woodfill et al. |
| 6,477,260 | B1 | 11/2002 | Shimomura |
| 6,771,834 | B1 | 8/2004 | Martins et al. |
| 6,788,817 | B1 | 9/2004 | Saka et al. |
| 6,911,997 | B1 | 6/2005 | Okamoto et al. |
| 6,956,469 | B2 | 10/2005 | Hirvonen et al. |
| 6,961,443 | B2 | 11/2005 | Mahbub |
| 6,963,661 | B1 | 11/2005 | Hattori et al. |
| 7,046,822 | B1 | 5/2006 | Knoeppel et al. |
| 7,203,356 | B2 | 4/2007 | Gokturk et al. |
| 7,263,209 | B2 | 8/2007 | Camus et al. |
| 7,340,077 | B2 | 3/2008 | Gokturk et al. |
| 7,397,929 | B2 | 7/2008 | Nichani et al. |
| 7,400,744 | B2 | 7/2008 | Nichani et al. |
| 7,403,659 | B2 | 7/2008 | Das et al. |
| 7,493,202 | B2 | 2/2009 | Demro et al. |
| 7,505,841 | B2 | 3/2009 | Sun et al. |
| 7,539,557 | B2 | 5/2009 | Yamauchi |
| 7,667,581 | B2 | 2/2010 | Fujimoto |
| 7,796,081 | B2 | 9/2010 | Breed |
| 7,812,931 | B2 | 10/2010 | Nishiuchi |
| 7,920,247 | B2 | 4/2011 | Kitano |
| 8,094,888 | B2 | 1/2012 | Satoh et al. |
| 2001/0019356 | A1 | 9/2001 | Takeda et al. |
| 2003/0138133 | A1 | 7/2003 | Nagaoka et al. |
| 2003/0169906 | A1 | 9/2003 | Gokturk et al. |
| 2003/0204384 | A1 | 10/2003 | Owechko et al. |
| 2005/0013465 | A1 | 1/2005 | Southall et al. |
| 2005/0018043 | A1 | 1/2005 | Takeda et al. |
| 2005/0024491 | A1 | 2/2005 | Takeda et al. |
| 2005/0169530 | A1 | 8/2005 | Nakai et al. |
| 2008/0240526 | A1 | 10/2008 | Suri et al. |
| 2008/0240547 | A1 | 10/2008 | Cho et al. |
| 2008/0253606 | A1 | 10/2008 | Fujimaki et al. |
| 2009/0010495 | A1 | 1/2009 | Schamp et al. |
| 2010/0074532 | A1 | 3/2010 | Gordon et al. |
| 2010/0208994 | A1 | 8/2010 | Yao et al. |
| 2011/0026770 | A1 | 2/2011 | Brookshire |
| 2011/0208357 | A1 | 8/2011 | Yamauchi |
| 2011/0311108 | A1 | 12/2011 | Badino et al. |
| 2012/0045119 | A1 | 2/2012 | Schamp |

FOREIGN PATENT DOCUMENTS

| | | | |
|---|---|---|---|
| JP | 9254726 | A | 9/1997 |
| JP | 2000207693 | A | 7/2000 |
| JP | 2001052171 | A | 2/2001 |
| JP | 3450189 | B2 | 9/2003 |
| JP | 2003281503 | A | 10/2003 |
| WO | 2013148519 | A2 | 10/2013 |

OTHER PUBLICATIONS

Woodfill, J; and Von Herzen, B.; "Real-time stereo vision on the PARTS reconfigurable computer," Proceedings of the 5th Annual IEEE Symposium on Field Programmable Custom Computing Machines, (Apr. 1997).

Konolige, K., "Small Vision Systems: Hardware and Implementation," Proc. Eighth Int'l Symp. Robotics Research, pp. 203-212, Oct. 1997.

Das et al., U.S. Appl. No. 60/549,203, Mar. 2, 2004.

Baik, Y.K; Jo, J.H.; and Lee K.M.; "Fast Census Transform-based Stereo Algorithm using SSE2," in the 12th Korea-Japan Joint Workshop on Frontiers of Computer Vision, Feb. 2-3, 2006, Tokushima, Japan, pp. 305-309.

"Kim, J.H. Kim; Park, C.O.; and Cho, J. D.; "Hardware implementation for Real-time Census 3D disparity map Using dynamic search range," Sungkyunkwan University School of Information and Communication, Suwon, Korea, (downloaded from vada.skku.ac.kr/Research/Census.pdfon Dec. 28, 2011)."

Unknown Author, "3d Stereoscopic Photography," downloaded from http://3dstereophoto.blogspot.com/2012/01/stereo-matching-local-methods.html on Oct. 19, 2012.

Unknown Author, "Stereo Matching," downloaded from www.cvg.ethz.ch/teaching/2010fall/compvis/lecture/vision06b.pdf on Oct. 19, 2012.

Press, W. H.; Flannery, B. P.; Teukolsky, S. A.; and Vetterling, W. T., "14.8 Savitzky-Golay Smoothing Filters," in Numerical Recipes in C: The Art of Scientific Computing (ISBN 0-521-43108-5), Cambridge University Press, 1988-1992, pp. 650-655.

Wu, H.-S. et al., "Optimal segmentation of cell images", IEE Proceedings: Vision, Image and Signal Processing, Institution of Electrical Engineers, GB, vol. 145, No. 1, Feb. 25, 1998, pp. 50-56.

Halir, R.; and Flusser, J., "Numerically stable direct least squares fitting of ellipses." Proc. 6th International Conference in Central Europe on Computer Graphics and Visualization. WSCG. vol. 98. 1998.

Morse, B. S., "Lecture 2: Image Processing Review, Neighbors, Connected Components, and Distance," Bringham Young University, Copyright Bryan S. Morse 1998-2000, last modified on Jan. 6, 2000, downloaded from http://morse.cs.byu.edu/650/lectures/lect02/review-connectivity.pdf on Jul. 15, 2011, 7 pp.

Garnica, C.; Boochs, F.; and Twardochlib, M., "A New Approach to Edge-Preserving Smoothing for Edge Extraction and Image Segmentation," International Archives of Photogrammetry and Remote Sensing. vol. XXXIII, Part B3. Amsterdam 2000, pp. 320-325.

Wang Z et al., "Shape based leaf image retrieval", IEE Proceedings: Vision, Image and Signal Processing, Institution of Electrical Engineers, GB, vol. 150, No. 1, Feb. 20, 2003, pp. 34-43.

Grigorescu, C. et al., "Distance sets for shape filters and shape recognition", IEEE Transactions on Image Processing, IEEE Service Center, Piscataway, NJ, US, vol. 12, No. 10, Oct. 1, 2003, pp. 1274-1286.

Bernier, T. et al., "A new method for representing and matching shapes of natural objects", Pattern Recognition, Elsevier, GB, vol. 36, No. 8, Aug. 1, 2003, pp. 1711-1723.

Darrell, T. et al:"Integrated person tracking using stereo, color, and pattern detection", Internet Citation, 2000, XP002198613, Retrieved from the Internet: URL:http://www.ai.mit.edu/-trevor/papers/1998-021/TR-1998-021.pdf, [retrieved by Inernational Searching Authority/EPO on May 10, 2002].

International Search Report and Written Opinion of the International Searching Authority in International Application No. PCT/US2013/033539, Oct. 21, 2013, 17 pages.

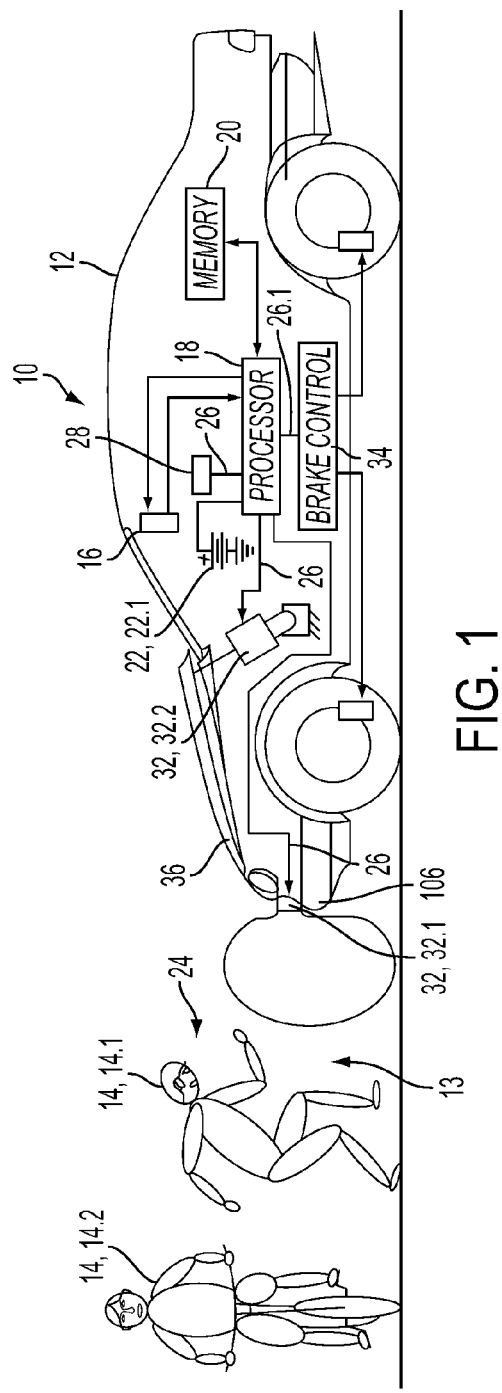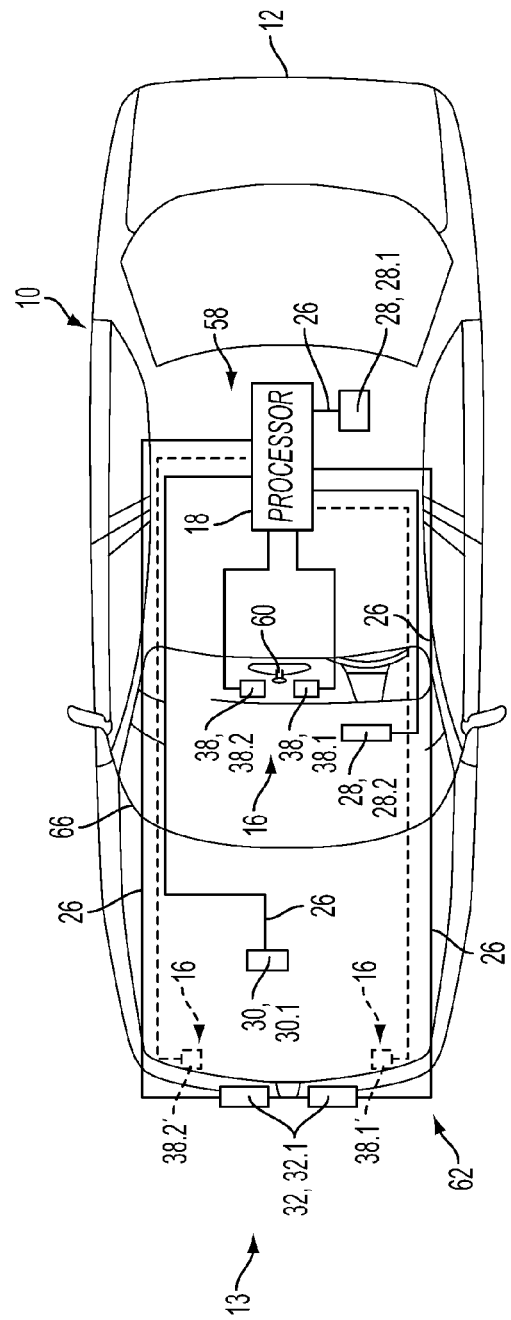

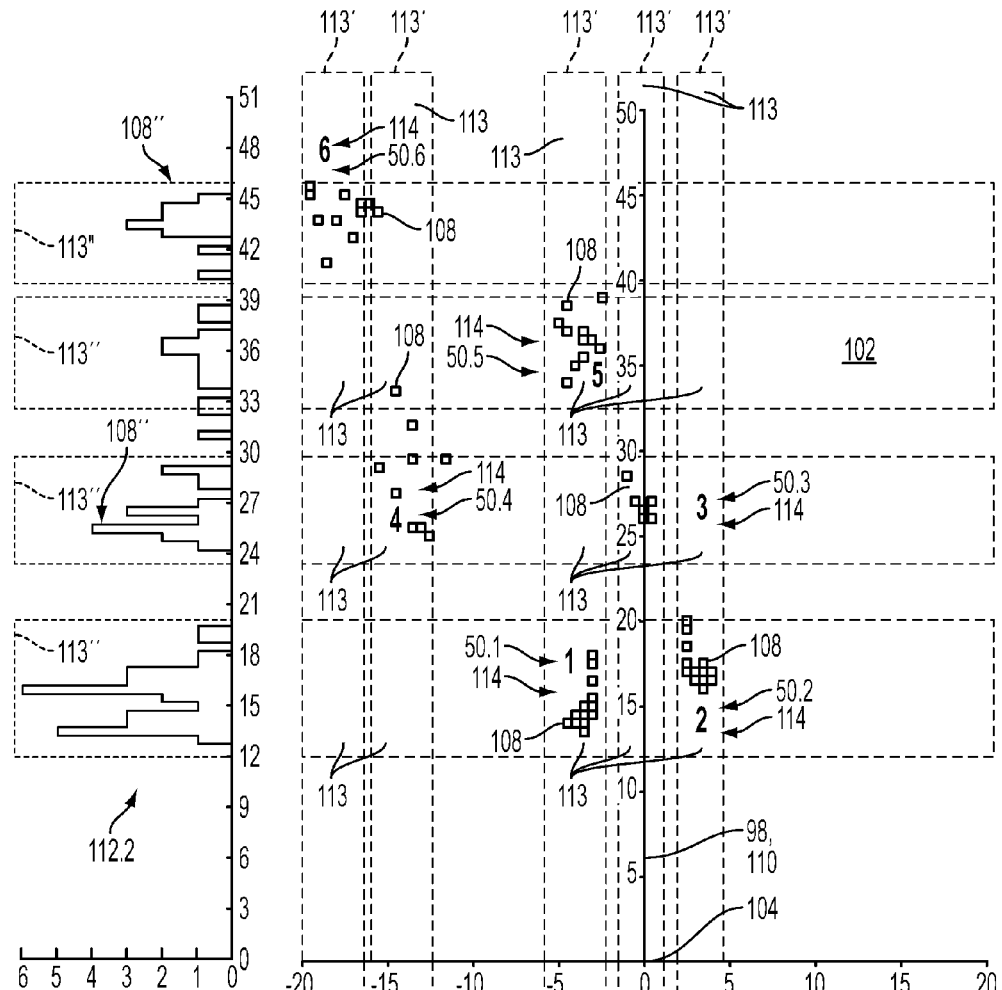
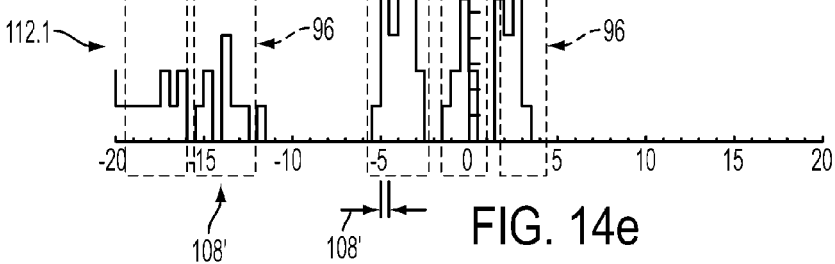
FIG. 14f    FIG. 14d
FIG. 14e

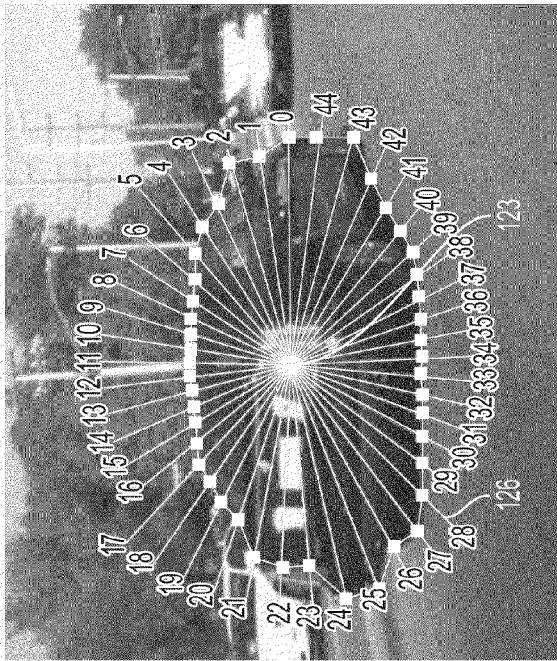
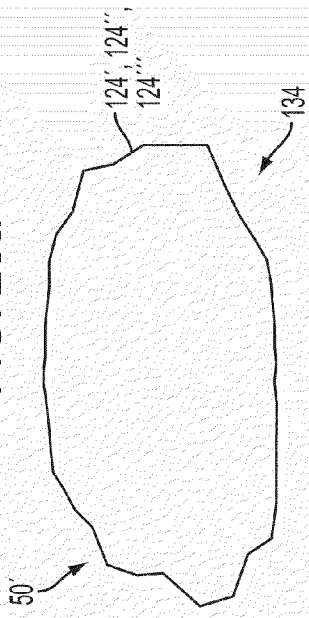
FIG. 25a
FIG. 25b
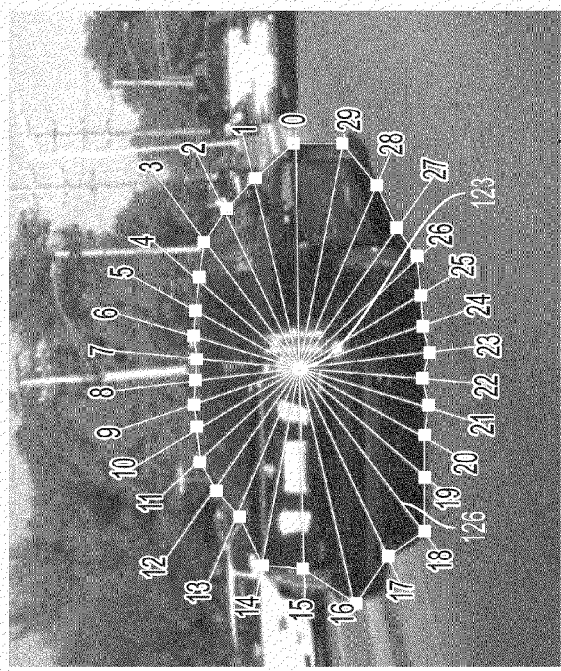
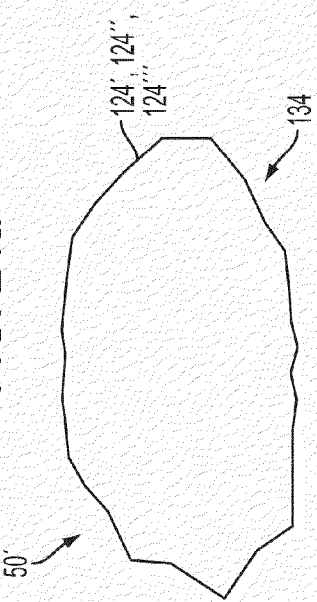
FIG. 24a
FIG. 24b

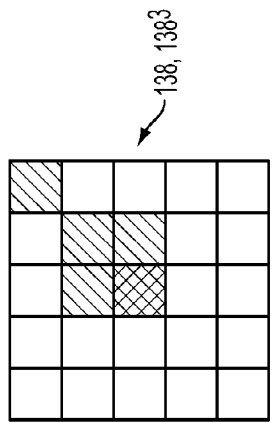
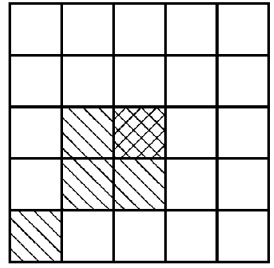
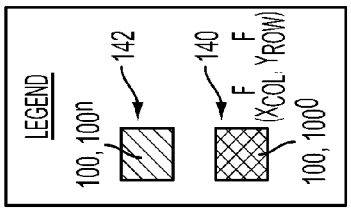
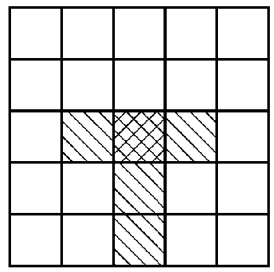
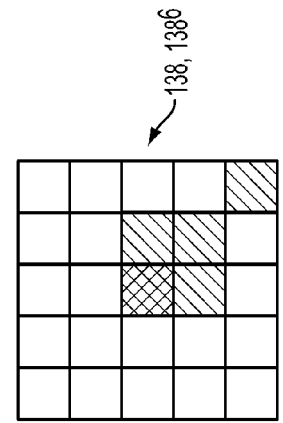
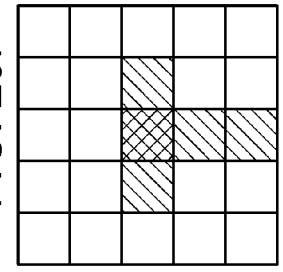
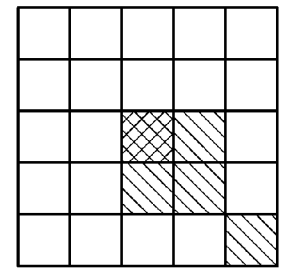

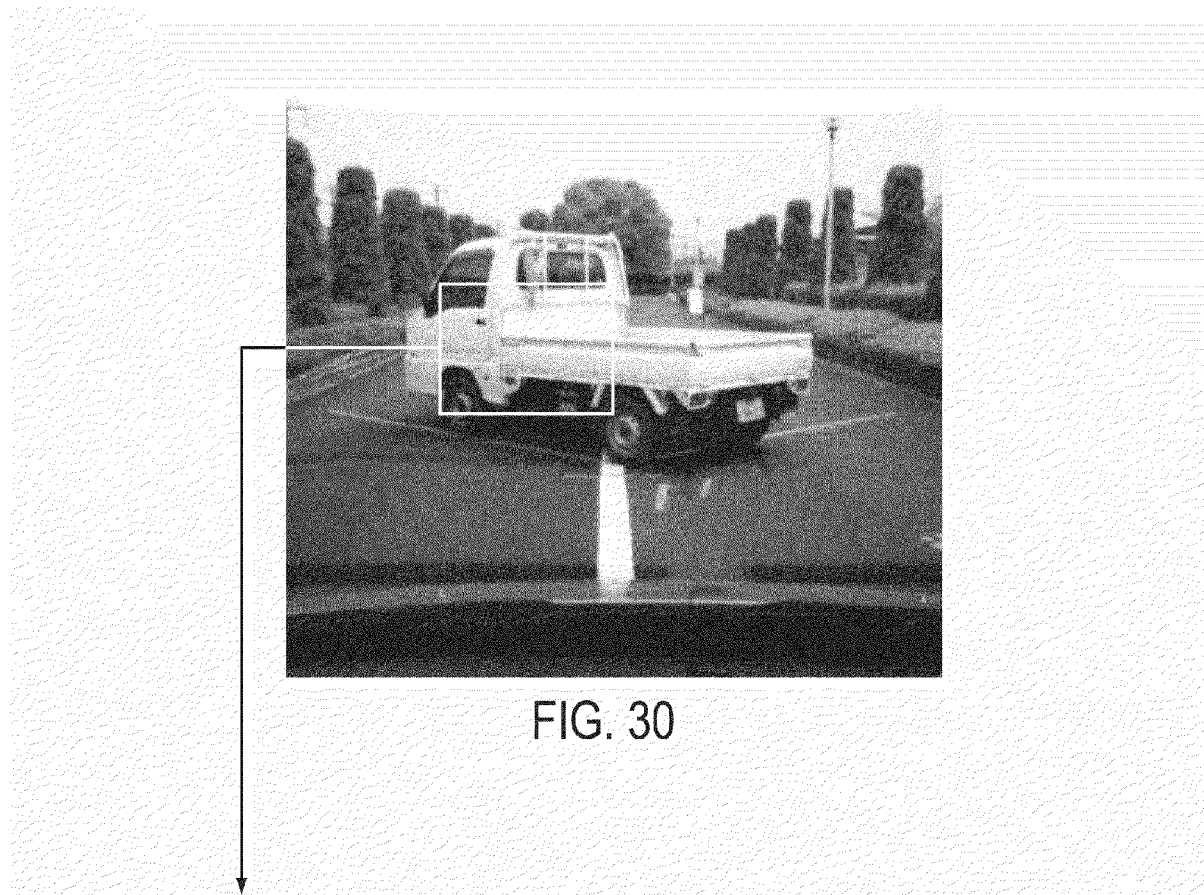
FIG. 30
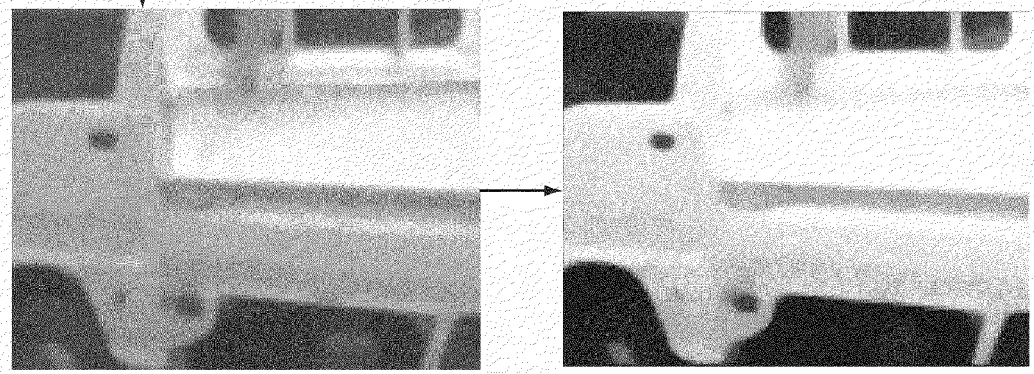
FIG. 31
FIG. 32

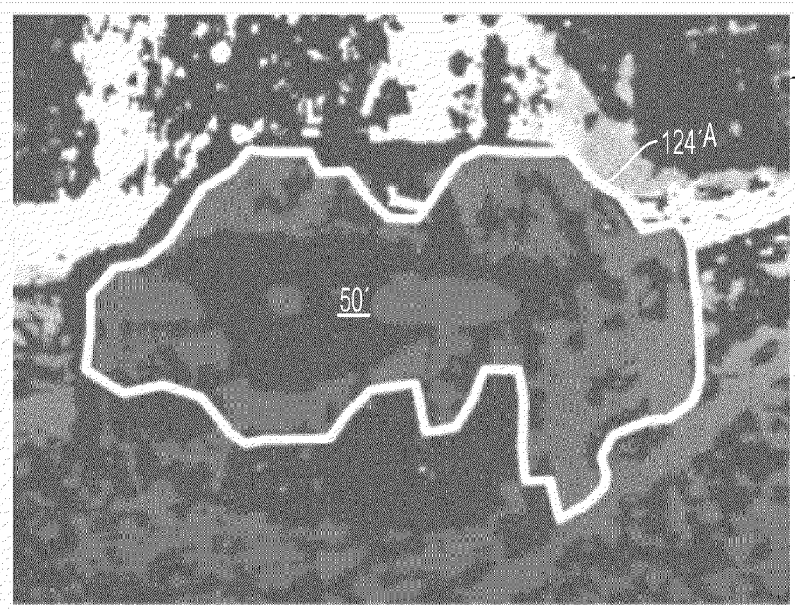
FIG. 41a
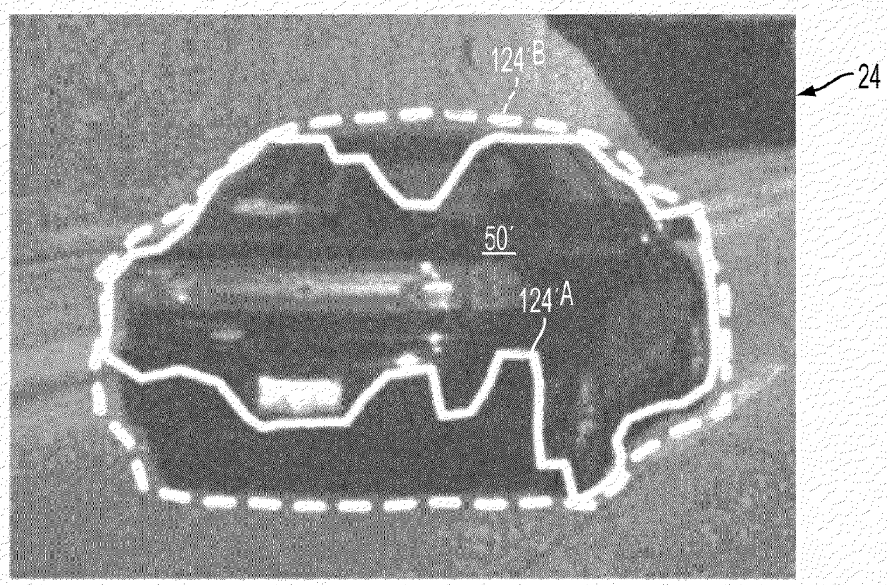
FIG. 41b
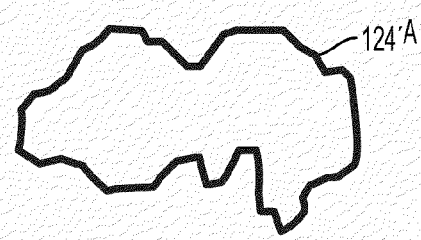 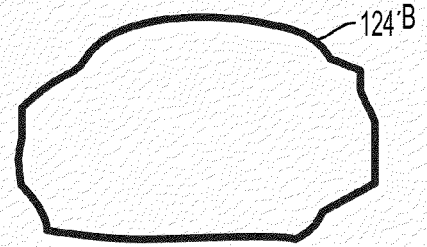
FIG. 41c          FIG. 41d

METHOD OF FILTERING AN IMAGE

BRIEF DESCRIPTION OF THE DRAWINGS

FIG. 1 illustrates an left-side view of a vehicle encountering a plurality of vulnerable road users (VRU), and a block diagram of an associated range-cued object detection system;

FIG. 2 illustrates a top view of a vehicle and a block diagram of a range-cued object detection system thereof;

FIG. 14d illustrates a plurality of predetermined two-dimensional clustering bins superimposed upon the top-down view of range bins of FIG. 14a, in accordance with the second embodiment of the associated clustering process;

FIG. 14e illustrates the plurality of one-dimensional cross-range cluster boundaries associated with FIG. 14d, superimposed upon the cross-range histogram from FIG. 14b, in accordance with the second embodiment of the associated clustering process;

FIG. 14f illustrates the plurality of one-dimensional down-range cluster boundaries associated with FIG. 14d, superimposed upon the down-range histogram of FIG. 14c, in accordance with the second embodiment of the associated clustering process;

FIG. 16 illustrates corresponding best-fit ellipses associated with each of the regions of interest (ROI) illustrated in FIG. 14a;

FIG. 24a illustrates a half-tone image of a vehicle object upon which is superimposed 30 associated uniformly-spaced radial search paths and associated edge locations of the vehicle object;

FIG. 24b illustrates a profile of the edge locations from FIG. 24a;

FIG. 25a illustrates a half-tone image of a vehicle object upon which is superimposed 45 associated uniformly-spaced radial search paths and associated edge locations of the vehicle object;

FIG. 25b illustrates a profile of the edge locations from FIG. 25a;

FIGS. 29a-29h illustrate a plurality of different homogeneity regions used by an associated Maximum Homogeneity Neighbor Filter;

FIG. 29i illustrates a legend to identify pixel locations for the homogeneity regions illustrated in FIGS. 29a-29h;

FIG. 29j illustrates a legend to identify pixel types for the homogeneity regions illustrated in FIGS. 29a-29h;

FIG. 30 illustrates a half-tone image of a vehicle, upon which is superimposed a profile of a portion of the image that is illustrated with expanded detail in FIG. 31;

FIG. 31 illustrates a portion of the half-tone image of FIG. 30 that is transformed by a Maximum Homogeneity Neighbor Filter to form the image of FIG. 32;

FIG. 32 illustrates a half-tone image resulting from a transformation of the image of FIG. 31 using a Maximum Homogeneity Neighbor Filter;

FIG. 33a-33ss illustrates plots of the amplitudes of 45 polar vectors associated with the radial search paths illustrated in FIG. 25a;

FIG. 41a illustrates a half-tone image of a range map of a visual scene, and an edge profile of an object therein, wherein the edge profile is based solely upon information from the range map image;

FIG. 41b illustrates a half-tone image a visual scene, a first edge profile of an object therein is based solely upon information from the range map image, and a second edge profile of the object therein based upon a radial search of the a mono-image of the visual scene;

FIG. 41c illustrates the first edge profile alone, as illustrated in FIGS. 41a and 41b;

FIG. 41d illustrates the second edge profile alone, as illustrated in FIG. 41b;

DESCRIPTION OF EMBODIMENT(S)

Figure 3A:
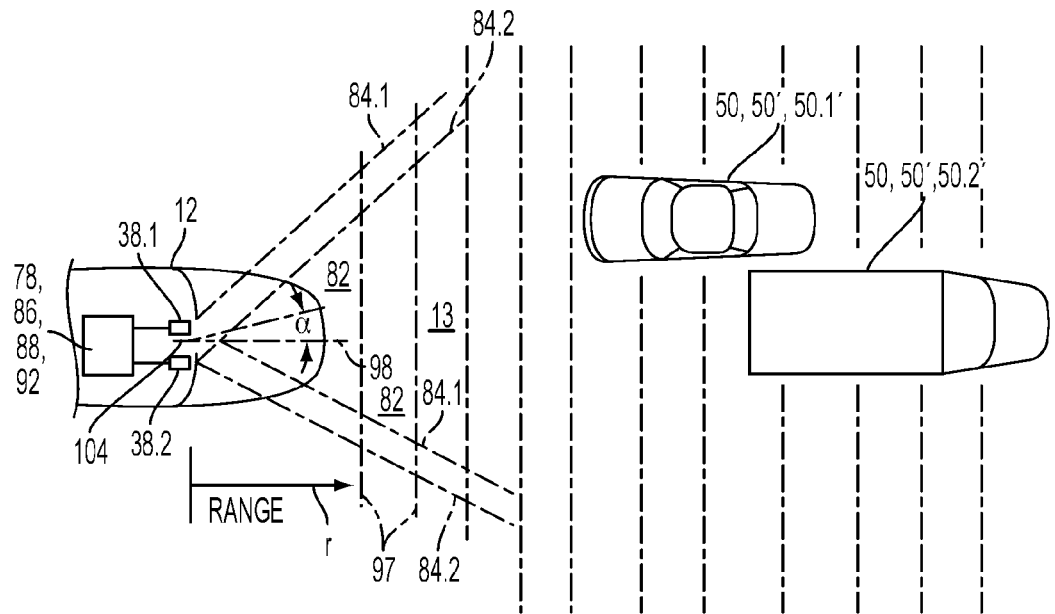
FIG. 3a illustrates a top view of the range-cued object detection system incorporated in a vehicle, viewing a plurality of relatively near-range objects, corresponding to FIGS. 3b and 3c.
Figure 3B:
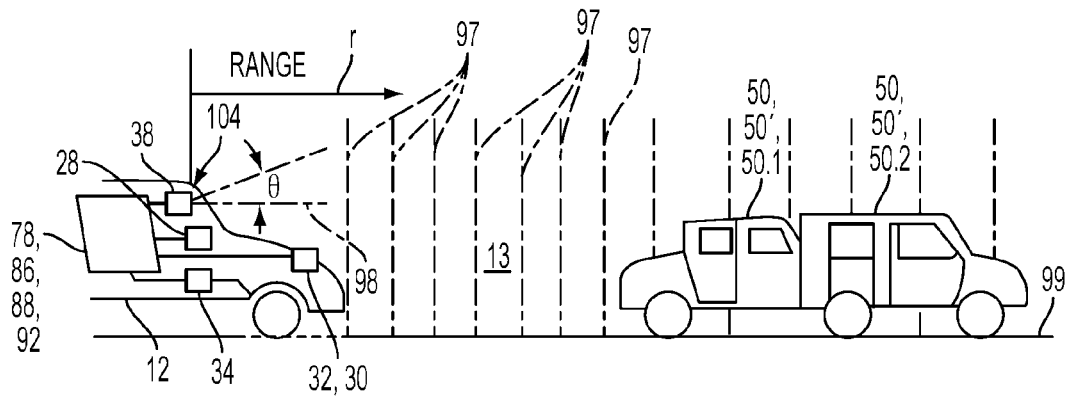
FIG. 3b illustrates a right-side view of a range-cued object detection system incorporated in a vehicle, viewing a plurality of relatively near-range objects, corresponding to FIGS. 3a and 3c.
Figure 3C:
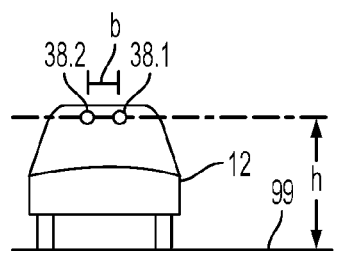
FIG. 3c illustrates a front view of the stereo cameras of the range-cued object detection system incorporated in a vehicle, corresponding to FIGS. 3a and 3b.

Referring to FIGS. 1, 2 and 3a-3c, a range-cued object detection system 10 is incorporated in a vehicle 12 so as to provide for viewing a region 13 in front of the vehicle 12 so as to provide for sensing objects therein, for example, in accordance with the teachings of U.S. patent application Ser. No. 11/658,758 filed on 19 Feb. 2008, entitled Vulnerable Road User Protection System, and U.S. patent application Ser. No. 13/286,656 filed on 1 Nov. 2011, entitled Method of Identifying an Object in a Visual Scene, both of which are incorporated herein by reference in their entirety, so as to provide for detecting and protecting a vulnerable road user 14 (hereinafter "VRU 14") from a collision with the vehicle 12. Examples of VRUs 14 include a pedestrian 14.1 and a pedal cyclist 14.2.

The range-cued object detection system 10 incorporates a stereo-vision system 16 operatively coupled to a processor 18 incorporating or operatively coupled to a memory 20, and powered by a source of power 22, e.g. a vehicle battery 22.1. Responsive to information from the visual scene 24 within the field of view of the stereo-vision system 16, the processor 18 generates one or more signals 26 to one or more associated driver warning devices 28, VRU warning devices 30, or VRU protective devices 32 so as to provide for protecting one or more VRUs 14 from a possible collision with the vehicle 12 by one or more of the following ways: 1) by alerting the driver 33 with an audible or visual warning signal from a audible warning device 28.1 or a visual display or lamp 28.2 with sufficient lead time so that the driver 33 can take evasive action to avoid a collision; 2) by alerting the VRU 14 with an audible or visual warning signal—e.g. by sounding a vehicle horn 30.1 or flashing the headlights 30.2—so that the VRU 14 can stop or take evasive action; 3) by generating a signal 26.1 to a brake control system 34 so as to provide for automatically braking the vehicle 12 if a collision with a VRU 14 becomes likely, or 4) by deploying one or more VRU protective devices 32—for example, an external air bag 32.1 or a hood actuator 32.2 in advance of a collision if a collision becomes inevitable. For example, in one embodiment, the hood actuator 32.2—for example, either a pyrotechnic, hydraulic or electric actuator—cooperates with a relatively compliant hood 36 so as to provide for increasing the distance over which energy from an impacting VRU 14 may be absorbed by the hood 36.

Figure 4A:
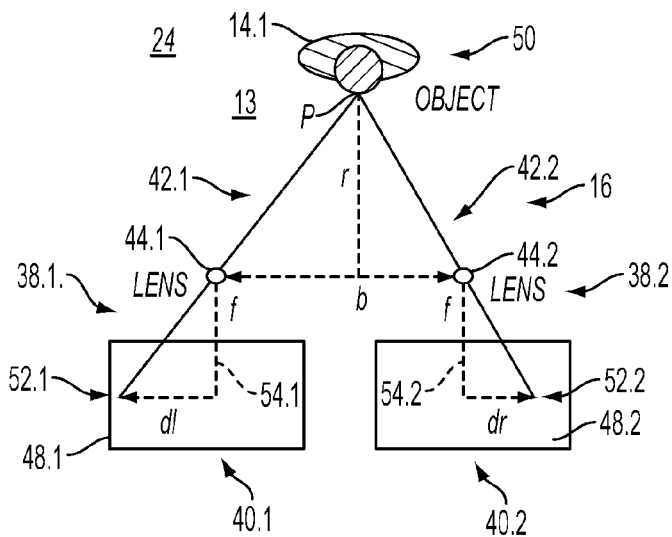
FIG. 4a illustrates a geometry of a stereo-vision system.

Referring also to FIG. 4a, in one embodiment, the stereo-vision system 16 incorporates at least one stereo-vision camera 38 that provides for acquiring first 40.1 and second 40.2 stereo image components, each of which is displaced from one another by a baseline b distance that separates the associated first 42.1 and second 42.2 viewpoints. For example, as illustrated in FIGS. 2, 3c, 4a and 5, first 38.1 and second 38.2 stereo-vision cameras having associated first 44.1 and second 44.2 lenses, each having a focal length f, are displaced from one another such that the optic axes of the first 44.1 and second 44.2 lenses are separated by the baseline b. Each stereo-vision camera 38 can be modeled as a pinhole camera 46, and the first 40.1 and second 40.2 stereo image components are electronically recorded at the corresponding coplanar focal planes 48.1, 48.2 of the first 44.1 and second 44.2 lenses. For example, the first 38.1 and second 38.2 stereo-vision cameras may comprise wide dynamic range electronic cameras that incorporate focal plane CCD (charge coupled device) or CMOS (complementary metal oxide semiconductor) arrays and associated electronic memory and signal processing circuitry. For a given object 50 located a range r distance from the first 44.1 and second 44.2 lenses, the associated first 40.1 and second 40.2 stereo image components are taken from associated different first 42.1 and second 42.2 viewpoints. For a given point P on the object 50, the first 52.1 and second 52.2 images of that point P are offset from the first 54.1 and second 54.2 image centerlines of the associated first 40.1 and second 40.2 stereo image components by a first offset dl for the first stereo image component 40.1 (e.g. left image), and a second offset dr for the second stereo image component 40.2 (e.g. right image), wherein the first dl and second dr offsets are in a plane containing the baseline b and the point P, and are in opposite directions relative to the first 54.1 and second 54.2 image centerlines. The difference between the first dl and second dr offsets is called the disparity d, and is directly related to the range r of the object 50 in accordance with the following equation:

$$r = b \cdot f / d, \text{ where } d = dl - dr \quad (1)$$

Figure 4B:
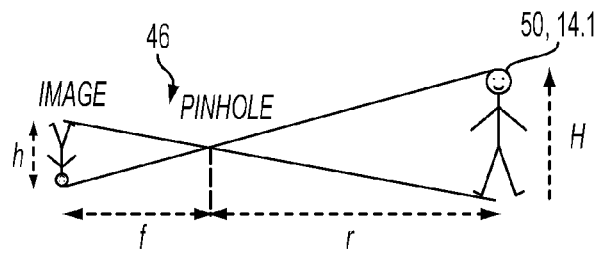
FIG. 4b illustrates an imaging-forming geometry of a pin-hole camera.

Referring to FIG. 4b, the height H of the object 50 can be derived from the height H of the object image 56 based on the assumption of a pinhole camera 46 and the associated image forming geometry.

Figure 5:
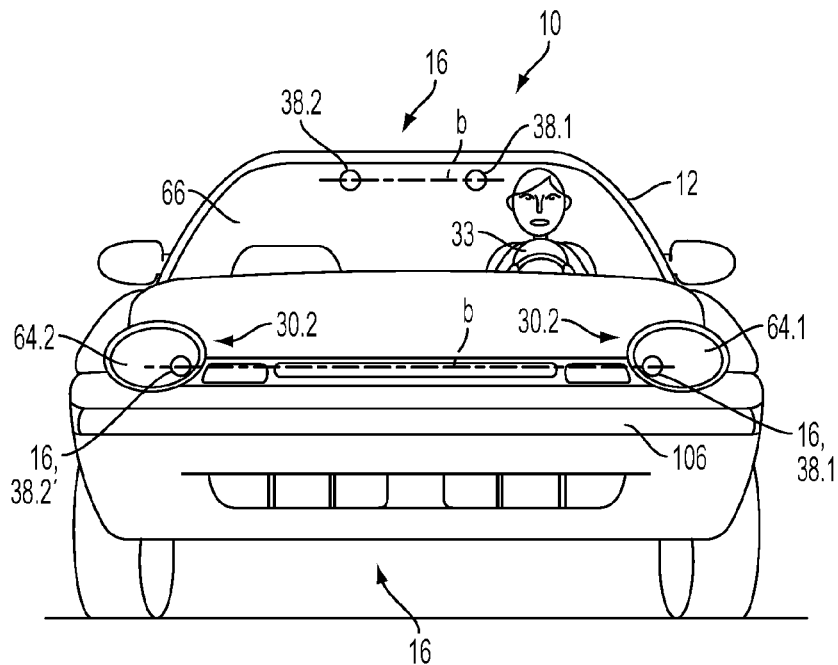
FIG. 5 illustrates a front view of a vehicle and various stereo-vision camera embodiments of a stereo-vision system of an associated range-cued object detection system.

Referring to FIGS. 2 and 5, in one embodiment, the first 38.1 and second 38.2 stereo-vision cameras are located along a substantially horizontal baseline b within the passenger compartment 58 of the vehicle 12, e.g. in front of a rear view mirror 60, so as to view the visual scene 24 through the windshield 66 of the vehicle 12. In another embodiment, the first 38.1' and second 38.2' stereo-vision cameras are located at the front 62 of the vehicle 12 along a substantially horizontal baseline b, for example, within or proximate to the left 64.1 and right 64.2 headlight lenses, respectively.

Figure 6:
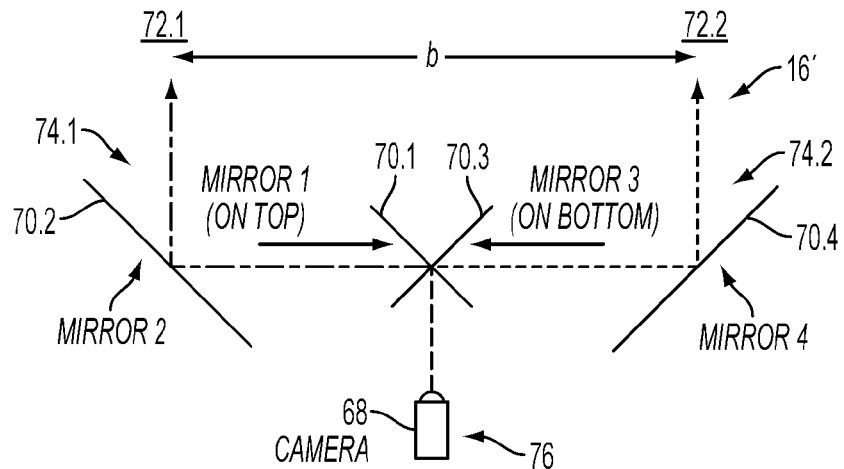
FIG. 6 illustrates a single-camera stereo-vision system.

Referring to FIG. 6, in yet another embodiment, a stereo-vision system 16' incorporates a single camera 68 that cooperates with a plurality of flat mirrors 70.1, 70.2, 70.3, 70.4, e.g. first surface mirrors, that are adapted to provide for first 72.1 and second 72.2 viewpoints that are vertically split with respect to one another, wherein an associated upper portion of the field of view of the single camera 68 looks out of a first stereo aperture 74.1 and an associated lower part of the field of view of the single camera 68 looks out of a second stereo aperture 74.2, wherein the first 74.1 and second 74.2 stereo apertures are separated by a baseline b distance. If the detector 76 of the single camera 68 is square, then each corresponding field of view would have a horizontal-to-vertical aspect ratio of approximately 2-to-1, so as to provide for a field of view that is much greater in the horizontal direction than in the vertical direction. In the embodiment illustrated in FIG. 6, the field of view of the single camera 68 is divided into the upper and lower fields of view by a first mirror 70.1 and a third mirror 70.3, respectively, that are substantially perpendicular to one another and at an angle of 45 degrees to the baseline b. The first mirror 70.1 is located above the third mirror 70.3 and cooperates with a relatively larger left-most second mirror 70.2 so that the upper field of view of the single camera 68 provides a first stereo image component 40.1 from the first viewpoint 72.1 (i.e. left viewpoint). The third mirror 70.3 cooperates with a relatively larger right-most fourth mirror 70.4 so that the lower field of view of the single camera 68 provides a second stereo image component 40.2 from the second viewpoint 72.2 (i.e. right viewpoint).

Figure 7:
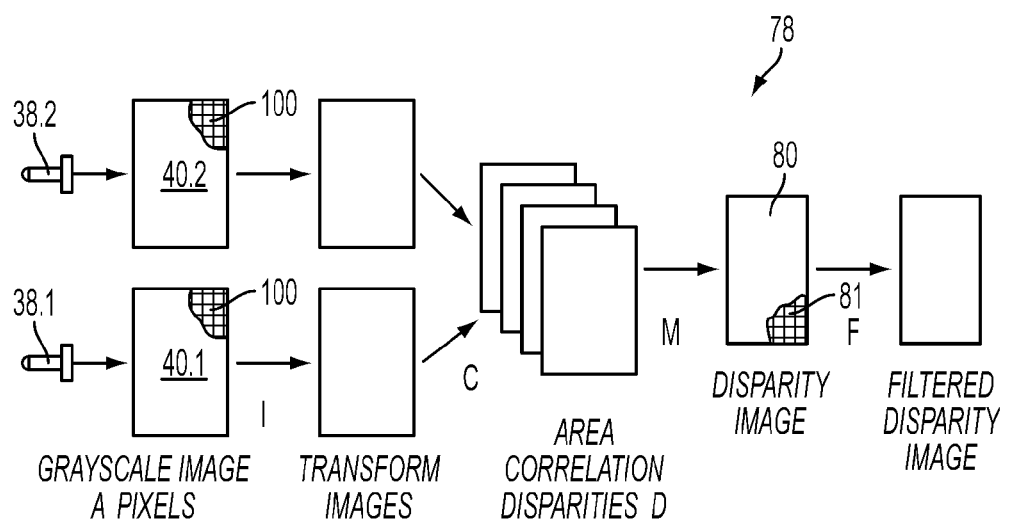
FIG. 7 illustrates a block diagram of an area-correlation-based stereo-vision processing algorithm.

Referring to FIG. 7, a stereo-vision processor 78 provides for generating a range-map image 80 (also known as a range image or disparity image) of the visual scene 24 from the individual grayscale images from the stereo-vision cameras 38, 38.1, 38.2 for each of the first 42.1 and second 42.2 viewpoints. The range-map image 80 provides for each range pixel 81, the range r from the stereo-vision system 16 to the object. Alternatively or additionally, the range-map image 80 may provide a vector of associated components, e.g. down-range (Z), cross-range (X) and height (Y) of the object relative to an associated reference coordinate system fixed to the vehicle 12. In another embodiment, in addition to the range r from the stereo-vision system 16 to the object, the stereo-vision processor 78 could also be adapted to provide the azimuth and elevation angles of the object relative to the stereo-vision system 16. For example, the stereo-vision processor 78 may operate in accordance with a system and method disclosed in U.S. Pat. No. 6,456,737, which is incorporated herein by reference. Stereo imaging overcomes many limitations associated with monocular vision systems by recovering an object's real-world position through the disparity d between left and right image pairs, i.e. first 40.1 and second 40.2 stereo image components, and relatively simple trigonometric calculations.

An associated area correlation algorithm of the stereo-vision processor 78 provides for matching corresponding areas of the first 40.1 and second 40.2 stereo image components so as to provide for determining the disparity d therebetween and the corresponding range r thereof. The extent of the associated search for a matching area can be reduced by rectifying the input images (I) so that the associated epipolar lines lie along associated scan lines of the associated first 38.1 and second 38.2 stereo-vision cameras. This can be done by calibrating the first 38.1 and second 38.2 stereo-vision cameras and warping the associated input images (I) to remove lens distortions and alignment offsets between the first 38.1 and second 38.2 stereo-vision cameras. Given the rectified images (C), the search for a match can be limited to a particular maximum number of offsets (D) along the baseline direction, wherein the maximum number is given by the minimum and maximum ranges r of interest. For implementations with multiple processors or distributed computation, algorithm operations can be performed in a pipelined fashion to increase throughput. The largest computational cost is in the correlation and minimum-finding operations, which are proportional to the number of pixels times the number of disparities. The algorithm can use a sliding sums method to take advantage of redundancy in computing area sums, so that the window size used for area correlation does not substantially affect the associated computational cost. The resultant disparity map (M) can be further reduced in complexity by removing such extraneous objects such as road surface returns using a road surface filter (F).

The associated range resolution ($\Delta r$) is a function of the range r in accordance with the following equation:

$$\Delta r = \frac{r^2}{b \cdot f} \cdot \Delta d \qquad (2)$$

The range resolution ($\Delta r$) is the smallest change in range r that is discernible for a given stereo geometry, corresponding to a change $\Delta d$ in disparity (i.e. disparity resolution $\Delta d$). The range resolution ($\Delta r$) increases with the square of the range r, and is inversely related to the baseline b and focal length f so that range resolution ($\Delta r$) is improved (decreased) with increasing baseline b and focal length f distances, and with decreasing pixel sizes which provide for improved (decreased) disparity resolution $\Delta d$.

Alternatively, a CENSUS algorithm may be used to determine the range map image 80 from the associated first 40.1 and second 40.2 stereo image components, for example, by comparing rank-ordered difference matrices for corresponding pixels separated by a given disparity d, wherein each difference matrix is calculated for each given pixel of each of the first 40.1 and second 40.2 stereo image components, and each element of each difference matrix is responsive to a difference between the value of the given pixel and a corresponding value of a corresponding surrounding pixel.

Referring to FIG. 3a, stereo imaging of objects 50—i.e. the generation of a range map image 80 from corresponding associated first 40.1 and second 40.2 stereo image components—is theoretically possible for those objects 50 located within a region of overlap 82 of the respective first 84.1 and second 84.2 fields-of-view respectively associated with the first 42.1, 72.1 and second 42.2, 72.2 viewpoints of the associated stereo-vision system 16, 16'. Generally, as the range r to an object 50 decreases, the resulting associated disparity d increases, thereby increasing the difficulty of resolving the range r to that object 50. If a particular point P on the object 50 cannot be resolved, then the corresponding range pixel 81 of the associated range map image 80 will be blank or 0. On-target range fill (OTRF) is the ratio of the number of non-blank range pixels 81 to the total number of range pixels 81 bounded by the associated object 50, wherein the total number of range pixels 81 provides a measure of the projected surface area of the object 50. Accordingly, for a given object 50, the associated on-target range fill (OTRF) generally decreases with decreasing range r.

Accordingly, the near-range detection and tracking performance based solely on the range map image 80 from the stereo-vision processor 78 can suffer if the scene illumination is sub-optimal and when object 50 lacks unique structure or texture, because the associated stereo matching range fill and distribution are below acceptable limits to ensure a relatively accurate object boundary detection. For example, the range map image 80 can be generally used alone for detection and tracking operations if the on-target range fill (OTRF) is greater than about 50 percent.

Figure 8:
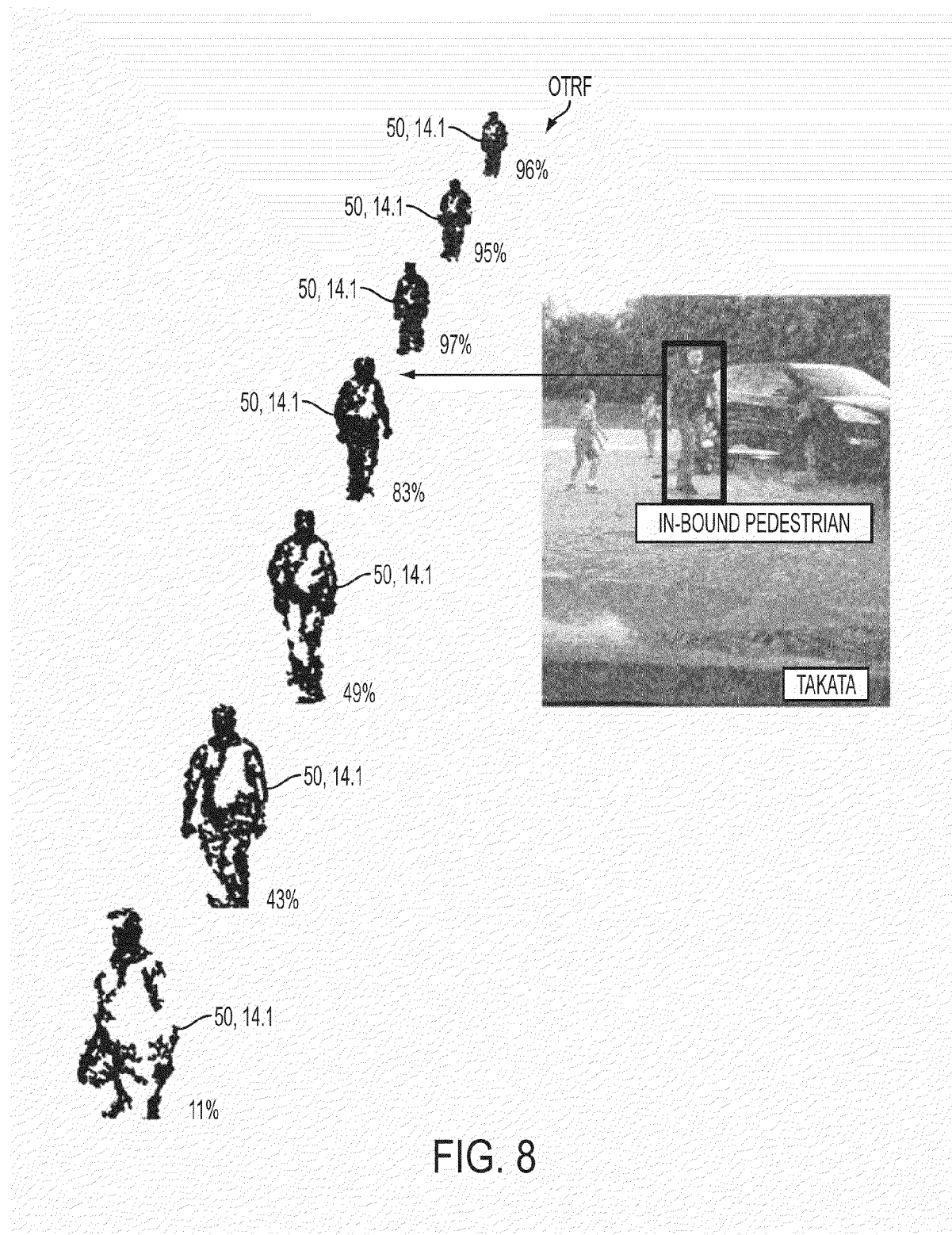
FIG. 8 illustrates a plurality of range-map images of a pedestrian at a corresponding plurality of different ranges from a stereo-vision system, together with a single-camera half-tone mono-image of the pedestrian at one of the ranges.

It has been observed that under some circumstances, the on-target range fill (OTRF) can fall below 50 percent with relatively benign scene illumination and seemly relatively good object texture. For example, referring to FIG. 8, there is illustrated a plurality of portions of a plurality of range map images 80 of an inbound pedestrian at a corresponding plurality of different ranges r, ranging from 35 meters to 4 meters—from top to bottom of FIG. 8—wherein at 35 meters (the top silhouette), the on-target range fill (OTRF) is 96 percent; at 16 meters (the middle silhouette), the on-target range fill (OTRF) is 83 percent; at 15 meters, the on-target range fill (OTRF) drops below 50 percent; and continues progressively lower as the pedestrian continues to approach the stereo-vision system 16, until at 4 meters, the on-target range fill (OTRF) is only 11 percent.

Figure 9:
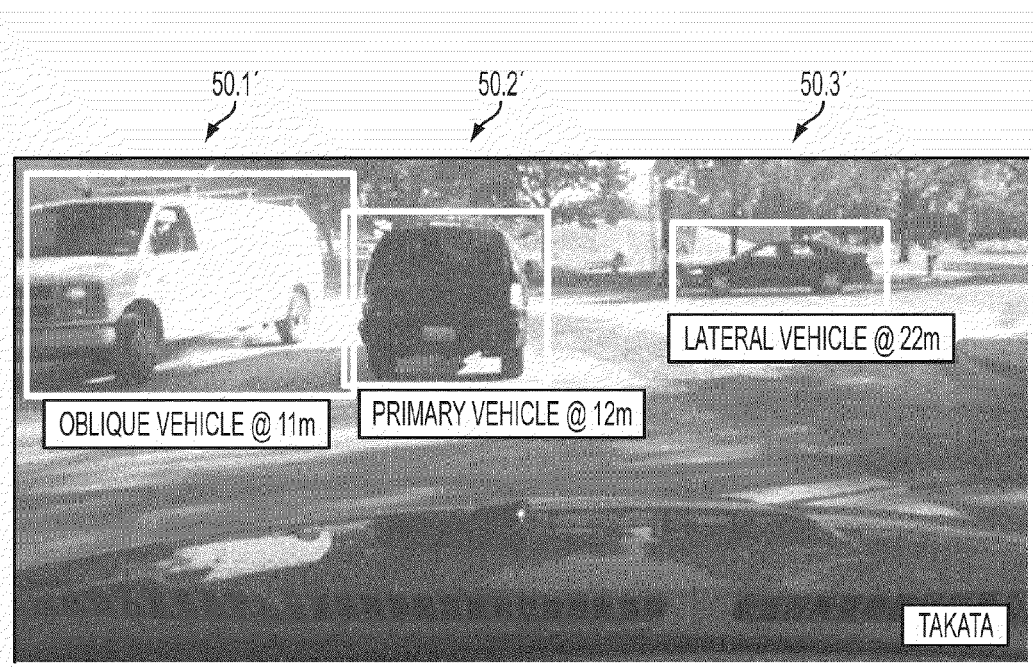
FIG. 9 illustrates a half-tone image of a scene containing a plurality of vehicle objects.
Figure 10:
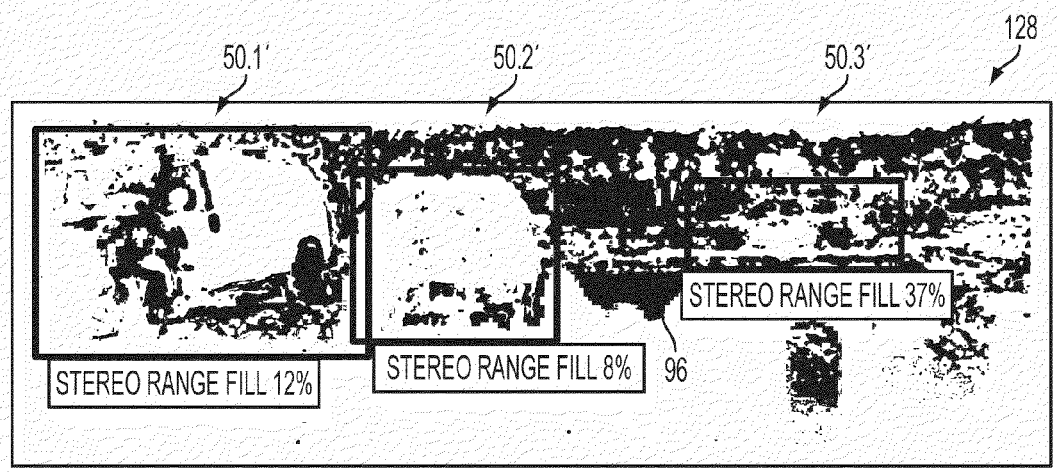
FIG. 10 illustrates a range map image generated by a stereo-vision system of the scene illustrated in FIG. 9.

Referring to FIG. 9, there are illustrated three relatively near-range vehicle objects 50.1', 50.2', 50.3' at ranges of 11 meters, 12 meters and 22 meters, respectively, from the stereo-vision system 16 of the range-cued object detection system 10, wherein the first near-range vehicle object 50.1' is obliquely facing towards the stereo-vision system 16, the second near-range vehicle object 50.2' is facing away from the stereo-vision system 16, and the third near-range vehicle object 50.3' is facing in a transverse direction relative to the stereo-vision system 16. Referring to FIG. 10, the corresponding on-target range fill (OTRF) of the first 50.1', second 50.2' and third 50.3' near-range vehicle objects—from the associated range map image 80 generated by the associated stereo-vision processor 78—is 12 percent, 8 percent and 37 percent, respectively, which is generally insufficient for robust object detection and discrimination from the information in the range map image 80 alone. Generally, it has been observed that near-range vehicle objects 50' at ranges less than about 25 meters can be difficult to detect and track from the information in the range map image 80 alone.

Figure 11:
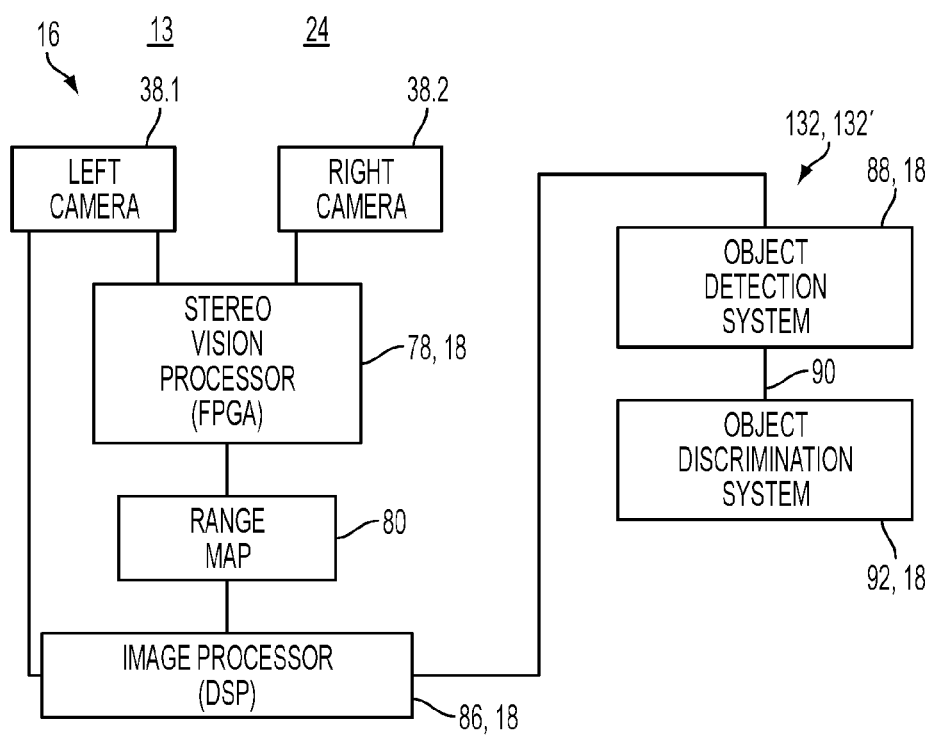
FIG. 11 illustrates a block diagram of the range-cued object detection system illustrated in FIGS. 1, 2 and 3a through 3c.

Referring to FIG. 11, the range-cued object detection system 10 provides for processing the range map image 80 in cooperation with one of the first 40.1 of second 40.2 stereo image components so as to provide for detecting one or more relatively near-range objects 50' at relatively close ranges r for which the on-target range fill (OTRF) is not sufficiently large so as to otherwise provide for detecting the object 50 from the range map image 80 alone. More particularly, range-cued object detection system 10 incorporates additional image processing functionality, for example, implemented in an image processor 86 in cooperation with an associated object detection system 88, that provides for generating from a portion of one of the first 40.1 or second 40.2 stereo image components an image 90 of a near-range object 50', or of a plurality of near-range objects 50', suitable for subsequent discrimination of the near-range object(s) 50' by an associated object discrimination system 92, wherein the portion of the first 40.1 or second 40.2 stereo image components is selected responsive to the range map image 80, in accordance with an associated range-cued object detection process 1200 illustrated in FIG. 12, as described more fully hereinbelow.

Figure 12:
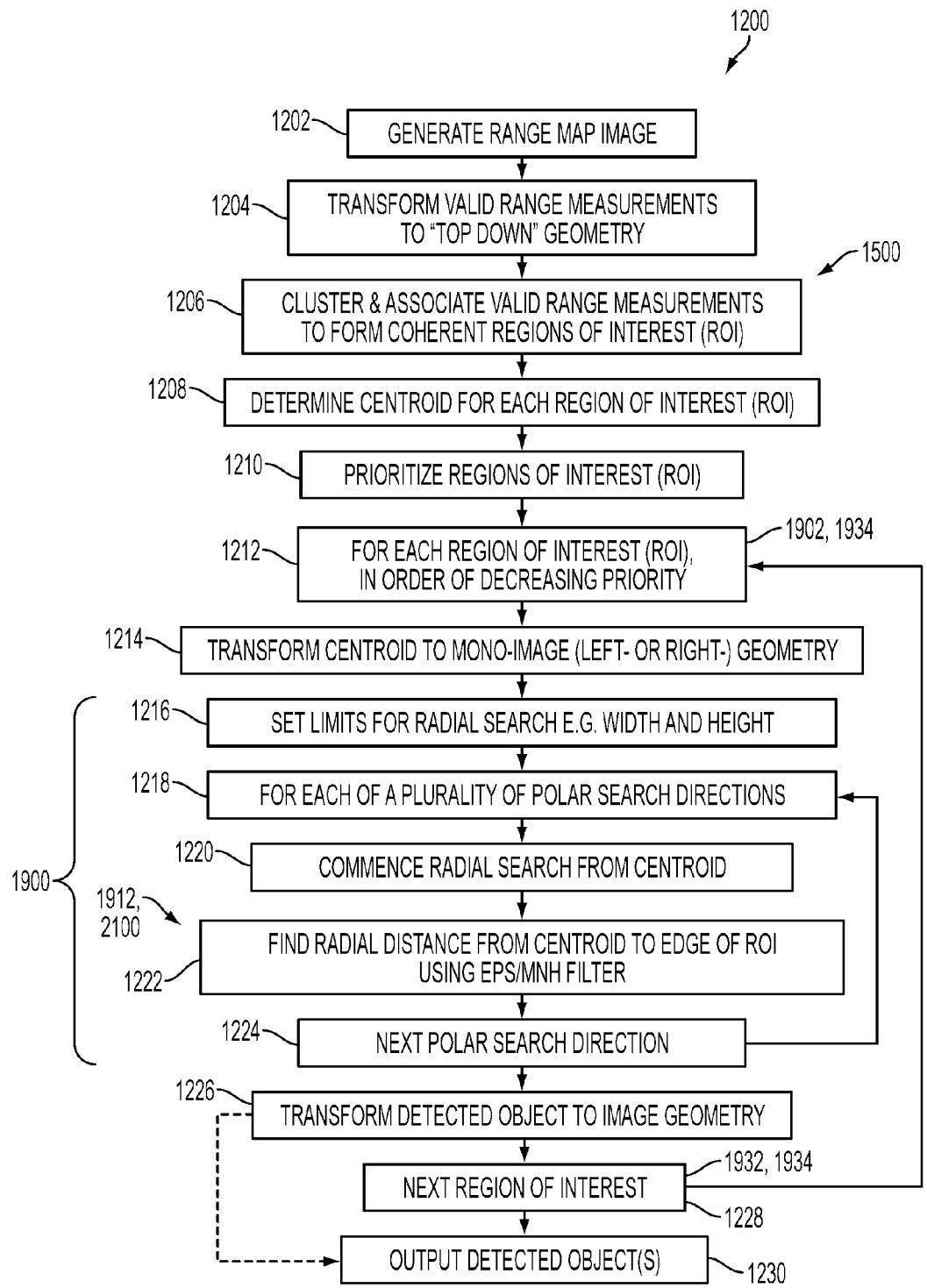
FIG. 12 illustrates a flow chart of a range-cued object detection process carried out by the range-cued object detection system illustrated in FIG. 11.
Figure 13:
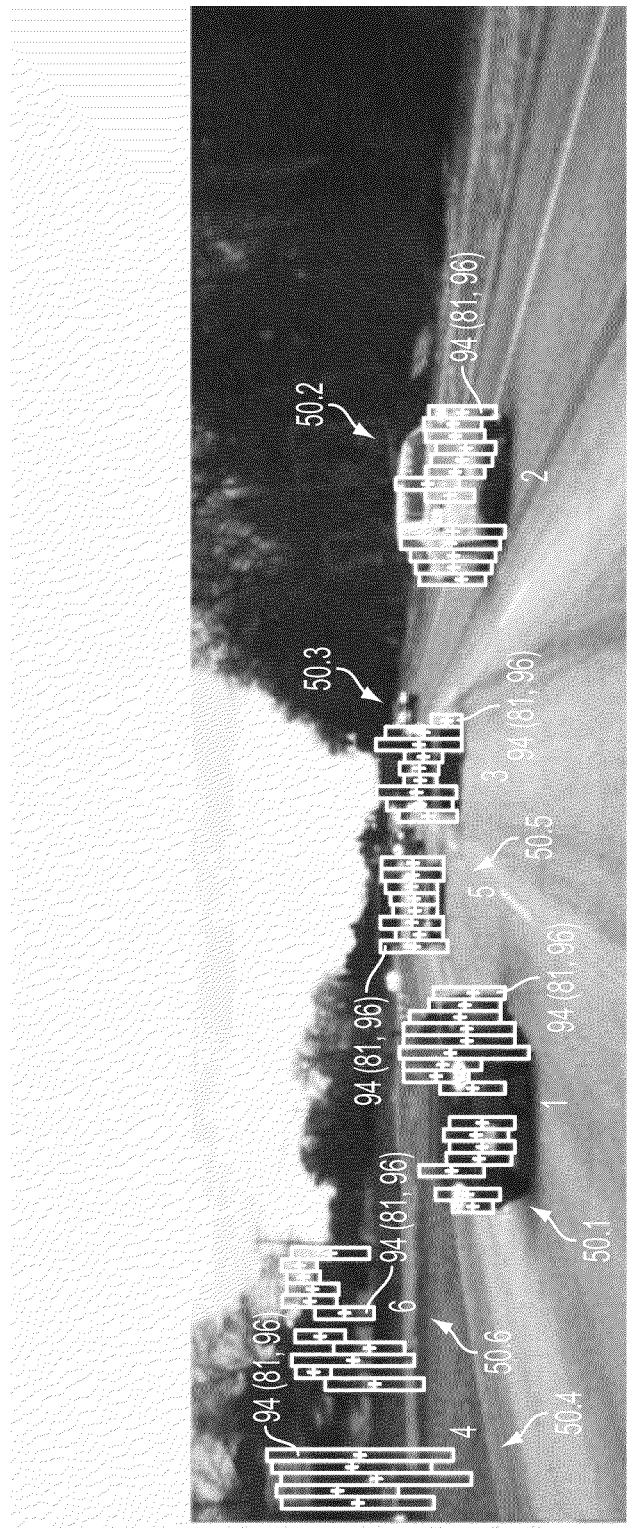
FIG. 13 illustrates a half-tone image of a scene containing a plurality of objects, upon which is superimposed a plurality of range bins corresponding to locations of corresponding valid range measurements of an associated range map image.

More particularly, referring to FIGS. 12 and 13, in step (1202), a range map image 80 is first generated by the stereo-vision processor 78 responsive to the first 40.1 or second 40.2 stereo image components, in accordance with the methodology described hereinabove. For example, in one embodiment, the stereo-vision processor 78 is implemented with a Field Programmable Gate Array (FPGA). For example, the half-tone image of FIG. 13 contains six primary objects 50 as follows, in order of increasing range r from the stereo-vision system 16: first 50.1, second 50.2, third 50.3 vehicles, a street sign 50.4, a fourth vehicle 50.5 and a tree 50.6. Superimposed on FIG. 13 are a plurality of corresponding range bins 94—each color-coded by range r in the original image from which the half-tone image of FIG. 13 is derived—wherein each range bin 94 indicates the presence of at least one valid range value 96 for each corresponding row of range pixels 81 within the range bin 94, the width of each range bin 94 is a fixed number of range pixels 81, for example, ten range pixels 81, and the height of each range bin 94 is indicative of a contiguity of rows of range pixels 81 with valid range values 96 for a given corresponding range r value.

Referring again to FIG. 11, the range map image 80 and one of the first 40.1 or second 40.2 stereo image components are then processed by the image processor 86, which, for example, may implemented using a digital signal processor (DSP).

Figures 14A, 14B, 14C:
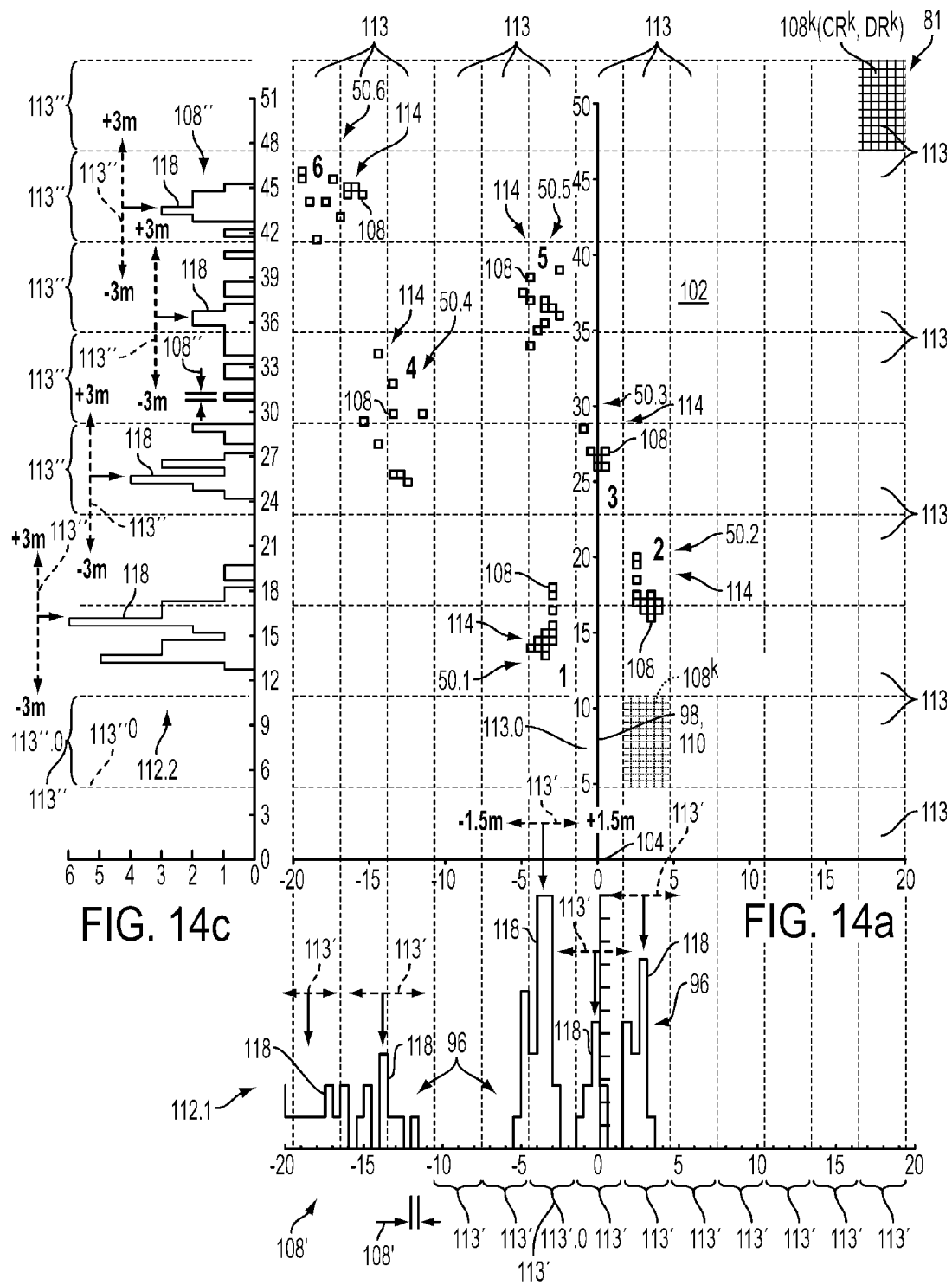
FIG. 14a illustrates a top-down view of range bins corresponding to locations of valid range measurements for regions of interest associated with the plurality of objects illustrated in FIG. 13, upon which is superimposed predetermined locations of associated two-dimensional nominal clustering bins in accordance with a first embodiment of an associated clustering process.
FIG. 14b illustrates a first histogram of valid range values with respect to cross-range location for the range bins illustrated in FIG. 14a, upon which is superimposed predetermined locations of associated one-dimensional nominal cross-range clustering bins in accordance with the first embodiment of the associated clustering process, and locations of one-dimensional nominal cross-range clustering bins corresponding to FIG. 14e in accordance with a second embodiment of the associated clustering process.
FIG. 14c illustrates a second histogram of valid range values with respect to down-range location for the range bins illustrated in FIG. 14a, upon which is superimposed predetermined locations of associated one-dimensional nominal down-range clustering bins in accordance with the first embodiment of the associated clustering process, and locations of one-dimensional down-range clustering bins corresponding to FIG. 14f in accordance with the second embodiment of the associated clustering process.

Referring to FIG. 14*a*, in step (1204), the spatial coordinates of each valid range measurement are transformed from the natural three-dimensional coordinates of the stereo-vision system 16 to corresponding two-dimensional coordinates of a "top-down" coordinate system. Each stereo-vision camera 38 is inherently an angle sensor of light intensity, wherein each pixel represents an instantaneous angular field of view at a given angles of elevation $\phi$ and azimuth $\alpha$. Similarly, the associated stereo-vision system 16 is inherently a corresponding angle sensor of range r. The range r of the associated range value corresponds to the distance from the stereo-vision system 16 to a corresponding plane 97, wherein the plane 97 is normal to the axial centerline 98 of the stereo-vision system 16, and the axial centerline 98 is normal to the baseline b through a midpoint thereof and parallel to the optic axes of the first 38.1 and second 38.2 stereo-vision cameras. Accordingly, in one embodiment, for example, for a given focal length f of the stereo-vision camera 38 located at a given height h above the ground 99, the column $X_{COL}$ and row $Y_{ROW}$ of either the associated range pixel 81, or the corresponding image pixel 100 of one of the first 40.1 or second 40.2 stereo image components, in combination with the associated elevation angle $\phi$, are transformed to corresponding two-dimensional coordinates in top-down space 102 of down-range distance DR and cross-range distance CR relative to an origin 104 along the vehicle centerline at either the baseline b of the stereo-vision system 16 or the bumper 106 of the vehicle 12 in accordance with the following relations:

$$CR(i) = \frac{h \cdot X_{COL}(i)}{f \cdot \sin(\phi) - Y_{ROW}(i) \cdot \cos(\phi)}, \text{ and} \quad (3)$$

$$DR(i) = \frac{h \cdot (f \cdot \cos(\phi) + Y_{ROW}(i) \cdot \sin(\phi))}{f \cdot \sin(\phi) - Y_{ROW}(i) \cdot \cos(\phi)}. \quad (4)$$

Figure 15:
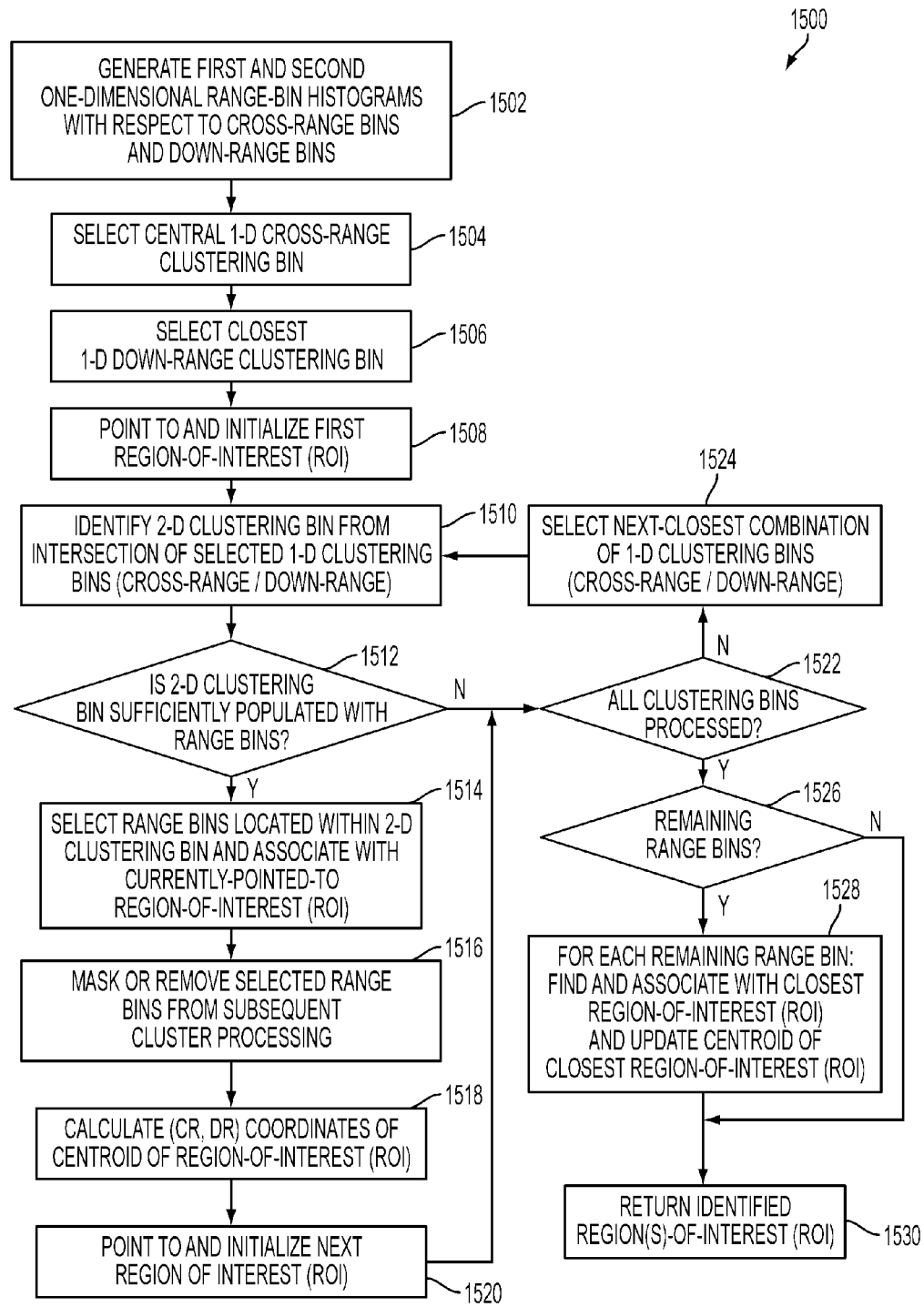
FIG. 15 illustrates a flow chart of a clustering process.

Referring again also to FIG. 12, in step (1206) each range pixel 81 having a valid range value 96 is assigned to a corresponding two-dimensional range bin 108 in top-down space 102, for example, using an associated clustering process 1500 as illustrated in FIG. 15. For example, FIG. 14*a* illustrates a down-range distance DR region that extends 50 meters from the bumper 106 of the vehicle 12, and a cross-range distance CR region that extends 20 meters on both sides (left and right) of the axial centerline 110 of the vehicle 12, of a portion of the scene illustrated in FIG. 13. For example, the range bins 108 illustrated in FIG. 14*a* are each rectangular of a size ½ meter by ½ meter in down-range distance DR and cross-range distance CR respectively. The particular size of the range bins 108 is not limiting, and could be either variable, or of some other dimension—e.g. 0.25 meters, 1 meter, etc.—and the range bins 108 need not necessarily be square. During the process of associating the individual range pixels 81 with the corresponding range bins 108, a link to the corresponding range bin 108 may be associated with each range pixel 81, and/or a series of linked-lists may be constructed that provide for associating each range bin 108 with the corresponding range pixels 81 associated therewith. Thereafter, the subsequent operations of the associated clustering process 1500 may be with respect to the range bins 108 themselves, rather than with respect to the individual range pixels 81 associated therewith, wherein each range bin $108^k$ is assigned a coordinate $(CR^k, DR^k)$ in top-down space 102 and is associated with a corresponding number $N^k$ of range pixels 81 associated therewith. For example, the corresponding coordinate values $CR^k$, $DR^k$ could be either the location of the center of the range bin $108^k$, or could be given as a function of, or responsive to, the corresponding coordinates of the associated range pixels 81, for example, as either the corresponding average locations in cross-range distance CR and down-range distance DR, or the corresponding median locations thereof.

Referring also to FIGS. 14*b* and 15, in step (1502) of the associated clustering process 1500, a first histogram 112.1 is generated containing a count of the above-described range bins 108 with respect to cross-range distance CR alone, or equivalently, a count of range pixels 81 with respect to one-dimensional cross-range bins 108' with respect to cross-range distance CR, for range pixels 81 having a valid range values 96, wherein the cross-range distance CR of each one-dimensional cross-range bin 108' is the same as the corresponding cross-range distance CR of the corresponding two-dimensional range bins 108. Similarly, referring further to FIG. 14*c*, also in step (1502) of the associated clustering process 1500, a second histogram 112.2 is generated containing a count of the above range bins 108 with respect to down-range distance DR alone, or equivalently, a count of range pixels 81 with respect to one-dimensional down-range bins 108" with respect to down-range distance DR, for range pixels 81 having a valid range values 96, wherein the down-range distance DR of each one-dimensional down-range bin 108" is the same as the corresponding down-range distance DR of the corresponding two-dimensional range bins 108.

A first embodiment of the associated clustering process 1500 provides for clustering the range bins 108 with respect to predefined two-dimensional nominal clustering bins 113, the boundaries of each of which defined by intersections of corresponding associated one-dimensional nominal cross-range clustering bins 113' with corresponding associated one-dimensional nominal down-range clustering bins 113". More particularly, the predefined two-dimensional nominal clustering bins 113 are each assumed to be aligned with a Cartesian top-down space 102 and to have a fixed width of cross-range distance CR, for example, in one embodiment, 3 meters, and a fixed length of down-range distance DR, for example, in one embodiment, 6 meters, which is provided for by the corresponding associated set of one-dimensional nominal cross-range clustering bins 113', for example, each element of which spans 3 meters, and the corresponding associated set of one-dimensional nominal down-range clustering bins 113", for example, each element of which spans 6 meters, wherein the one-dimensional nominal cross-range clustering bins 113' abut one another, the one-dimensional nominal down-range clustering bins 113" separately abut one another, and the one-dimensional nominal cross-range clustering bins 113' and the one-dimensional nominal down-range clustering bins 113" are relatively orthogonal with respect to one another.

In one set of embodiments, the set of one-dimensional nominal cross-range clustering bins 113' is centered with respect to the axial centerline 110 of the vehicle 12, and the closest edge 113"⁰ of the one-dimensional nominal down-range clustering bins 113" is located near or at the closest point on the roadway 99' that is visible to the stereo-vision system 16. For example, for a 3 meter by 6 meter two-dimensional nominal clustering bin 113, and a top-down space 102 extending 20 meters left and right of the axial centerline 110 of the vehicle 12 and 50 meters from the origin 104 of the stereo-vision system 16, then in one embodiment, there are about 14 one-dimensional nominal cross-range clustering bins 113', i.e. ((+20) meter right boundary—(−20) meter left boundary)/3 meter cross-range distance CR with of a one-dimensional nominal cross-range clustering bin 113'), and with the closest one-dimensional nominal down-range clustering bins 113" each located 5 meters down range of the origin 104, there are about 8 one-dimensional nominal down-range clustering bins 113", i.e. (50 meter end point −5 meter start point)/6 meter down-range distance DR length of a one-dimensional nominal down-range clustering bin 113"). If an odd number of one-dimensional nominal cross-range clustering bins 113' are used, then there will be a central dimensional nominal cross-range clustering bin 113'.0 that is centered about the axial centerline 110 of the vehicle 12.

The two-dimensional nominal clustering bins 113 provide for initially associating the two-dimensional range bins 108 with corresponding coherent regions of interest (ROI) 114, beginning with the closest two-dimensional nominal clustering bin 113.0, and then continuing laterally away from the axial centerline 110 of the vehicle 12 in cross range, and longitudinally away from the vehicle in down range. More particularly, continuing with the associated clustering process 1500 illustrated in FIG. 15, in step (1504) a central one-dimensional nominal cross-range clustering bin 113.0' is selected, and in step (1506) the closest one-dimensional nominal down-range clustering bin 113.0" is selected. Then, in step (1508), the first region of interest (ROI) 114 is pointed to and initialized, for example, with a null value for a pointer to the associated two-dimensional range bins 108. Then, step (1510) provides for identifying the two-dimensional nominal clustering bin 113 corresponding to the selected one-dimensional nominal cross-range 113' and down-range 113" clustering bins. For example, as illustrated in FIG. 14a, following steps (1504) and (1506), the first two-dimensional nominal clustering bin 113 identified in step (1510) is the two-dimensional nominal clustering bin 113.0 closest to the vehicle 12 along the axial centerline 110 thereof. For each two-dimensional nominal clustering bin 113 identified in step (1510), an associated linked list provides for identifying each of the associated two dimensional range bin 108 that are located within the boundary thereof, and that are thereby associated therewith. For example, the linked list may be constructed by polling each of the associated two dimensional range bins 108 to find the corresponding indexing coordinate of the corresponding two-dimensional nominal clustering bin 113 within which the associated two dimensional range bin 108 is located, and to then add a pointer to that two dimensional range bin 108 to the linked list associated with the two-dimensional nominal clustering bin 113.

If, in step (1512), the identified two-dimensional nominal clustering bin 113 is sufficiently populated with a sufficient number of range pixels 81 accounted for by the associated two-dimensional range bins 108, then, in step (1514), the two-dimensional range bins 108 located within the boundaries of the identified two-dimensional nominal clustering bin 113 are associated with the currently pointed-to region of interest (ROI) 114, for example, using the above-described linked list to locate the associated two-dimensional range bins 108. Then, in step (1516), those two-dimensional range bins 108 that have been associated with the currently pointed-to region of interest (ROI) 114 are either masked or removed from the associated first 112.1 and second 112.2 histograms, so as to not be considered for subsequent association with other regions of interest (ROI) 114. Then, in step (1518), the cross-range $\overline{CR}$ and down-range $\overline{DR}$ coordinates in top-down space 102 of the centroid 116 of the corresponding $i^{th}$ region of interest (ROI) 114 are then determined as follows from the coordinates of the corresponding N two-dimensional range bins 108 associated therewith:

$$\overline{CR}(i) = \frac{\sum_{k=1}^{N} CR_k(i)}{N}, \tag{5.1}$$

and $$\overline{DR}(i) = \frac{\sum_{k=1}^{N} DR_k(i)}{N}. \tag{6.1}$$

Alternatively, the centroid 116 of the corresponding $i^{th}$ region of interest (ROI) 114 could be calculated using weighted coordinate values that are weighted according to the number $n_k$ of range pixels 81 associated with each range bin 108, for example, as follows:

$$\overline{CR}(i) = \frac{\sum_{k=1}^{N} n_k \cdot CR_k(i)}{\sum_{k=1}^{N} n_k}, \tag{5.2}$$

and $$\overline{DR}(i) = \frac{\sum_{k=1}^{N} n_k \cdot DR_k(i)}{\sum_{k=1}^{N} n_k}. \tag{6.2}$$

Then, in step (1520), the next region of interest (ROI) 114 is pointed to and initialized, for example, with a null value for the pointer to the associated two-dimensional range bins 108.

Then, either from step (1520), or from step (1512) if the current two-dimensional nominal clustering bin 113 is insufficiently populated with corresponding two-dimensional range bins 108, then, in step (1522), if all two-dimensional nominal clustering bins 113 have not been processed, then, in step (1524) the next-closest combination of one-dimensional nominal cross-range clustering bins 113' and one-dimensional nominal down-range clustering bins 113" is selected, and the process repeats with step (1510).

Otherwise, from step (1522), if all two-dimensional nominal clustering bins 113 have been processed, then, in step (1526), if any two-dimensional range bins 108 remain that haven't been assigned to a corresponding two-dimensional nominal clustering bin 113, then, in step (1528), each remaining two-dimensional range bin 108—for example, proceeding from the closest to the farthest remaining two-dimensional range bins 108, relative to the vehicle 12—is associated with the closest region of interest (ROI) 114 thereto. For example, in one set of embodiments, the location of the corresponding centroid 116 of the region of interest (ROI) 114 is updated as each new two-dimensional range bin 108 is associated therewith. Then, following step (1528), or from step (1526) if no two-dimensional range bins 108 remain that haven't been assigned to a corresponding two-dimensional nominal clustering bin 113, then, in step (1530), the resulting identified regions of interest (ROI) 114 are returned, each of which includes an identification of the two-dimensional range bins 108 associated therewith.

Referring again to step (1512), various tests could be use to determine whether or not a particular two-dimensional nominal clustering bin 113 is sufficiently populated with two-dimensional range bin 108. For example, this could depend upon a total number of associated range pixels 81 in the associated two-dimensional range bins 108 being in excess of a threshold, or upon whether the magnitude of the peak values of the first 112.1 and second 112.2 histograms are each in excess of corresponding thresholds for the associated one-dimensional nominal cross-range 113' and down-range 113" clustering bins corresponding to the particular two-dimensional nominal clustering bin 113.

Furthermore, referring again to step (1524), the selection of the next-closest combination of one-dimensional nominal cross-range 113' and down-range 113" clustering bins could be implemented in various ways. For example, in one embodiment, the two-dimensional nominal clustering bins 113 are scanned in order of increasing down-range distance DR from the vehicle 12, and for each down-range distance DR, in order of increasing cross-range distance DR from the axial centerline 110 of the vehicle 12. In another embodiment, the scanning of the two-dimensional nominal clustering bins 113 is limited to only those two-dimensional nominal clustering bins 113 for which a collision with the vehicle 12 is feasible given either the speed alone, or the combination of speed and heading, of the vehicle 12. In another embodiment, these collision-feasible two-dimensional nominal clustering bins 113 are scanned with either greater frequency or greater priority than remaining two-dimensional nominal clustering bins 113. For example, remaining two-dimensional nominal clustering bins 113 might be scanned during periods when no threats to the vehicle 12 are otherwise anticipated.

Referring also to FIGS. 14d-14f, and again to FIGS. 14b and 14c, in accordance with a second embodiment of the clustering process 1500, as an alternative to using predetermined one-dimensional nominal cross-range 113' and down-range 113" clustering bins 113', the selection and location of the one-dimensional nominal cross-range 113' and down-range 113" clustering bins 113' may instead be responsive to the corresponding associated first 112.1 and second 112.2 histograms, for example, centered about corresponding localized peaks 118 therein. For example, the localized peaks 118 may be found by first locating the peak histogram bin within the boundaries of each of the above-described predetermined one-dimensional nominal cross-range 113' and down-range 113" clustering bins, for which the value of the peak exceeds a corresponding threshold, and then pruning the resulting set of localized peaks 118 to remove sub-peaks within half of a clustering bin length of a neighboring localized peak 118, for example, less than 1.5 meters in cross-range distance CR or 3 meters in down-range distance DR for the above-describe 3 meter by 6 meter two-dimensional nominal clustering bin 113. Then, referring to FIGS. 14d through 14f, the corresponding one-dimensional nominal cross-range 113' and down-range 113" clustering bins used in the associated clustering process 1500 are centered about each of the corresponding localized peaks 118. For example, FIGS. 14d through 14f illustrate 5 one-dimensional nominal cross-range clustering bins 113' and 4 one-dimensional nominal down-range clustering bins 113". Otherwise, the clustering process 1500 proceeds as described hereinabove with respect to the one-dimensional nominal cross-range 113' and down-range 113" clustering bins that are each aligned with, for example, centered about, the corresponding localized peaks 118. Accordingly, in comparison with the above-describe first embodiment, the second embodiment of the clustering process 1500 provides for potentially reducing the number of two-dimensional nominal clustering bins 113 that need to be processed.

For example, in FIG. 14d, the vehicle objects 50.1, 50.2 and 50.3, respectively identified as 1, 2 and 3, are each contained within the associated 3 meter wide by 6 meter deep two-dimensional nominal clustering bin 113. However, the relatively distant vehicle object 50.5, identified as 5, is slightly wider that the 3 meter wide by 6 meter deep two-dimensional nominal clustering bin 113 because of the inclusion of background noise from an overlapping vehicle object 50 in the background. In this case, the stereo matching process of the stereo-vision processor 78 for generating the range map image 80 from the associated first 40.1 and second 40.2 stereo image components provides a range value that is the average of the ranges of the foreground and background vehicles 50, and the inclusion of this range measurement in the corresponding region of interest (ROI) 114 stretches the width thereof from 3 to 4 meters.

Although the ½ meter by ½ meter range bins 108 illustrated in FIGS. 14a and 14d illustrate an associated top-down transform having an associated ½ meter resolution, it should be understood that the resolution of the top-down transform may be different, for example, coarser or finer, for example, either 1 meter or 0.25 meters. For example, relatively smaller range bins 108 provide for a corresponding relatively finer resolution that provides for background clutter measurements to populate neighboring two-dimensional nominal clustering bin 113 and then be more easily eliminated during the subsequent processing, so as to provide for a more accurate determination of the width and depth of the boundary of the object 50 associated with the corresponding region of interest (ROI) 114.

The two-dimensional nominal clustering bins 113 associated with the street sign 50.4 and tree 50.6 objects 50, identified as 4 and 6, include portions of an associated central median and a relatively large, different tree. In one set of embodiments, depending upon the associated motion tracking and threat assessment processes, these two-dimensional nominal clustering bins 113 might be ignored because they are too large to be vehicle objects 50', and they are stationary relative to the ground 99.

As another example, in another set embodiments, one or more of the associated two-dimensional nominal clustering bins 113 are determined responsive to either situational awareness or scene interpretation, for example, knowledge derived from the imagery or through fusion of on-board navigation and map database systems, for example a GPS navigation system and an associated safety digital map (SDM) that provide for adapting the clustering process 1500 to the environment of the vehicle 12. For example, when driving on a highway at speeds in excess of 50 MPH it would be expected to encounter only vehicles, in which case the size of the two-dimensional nominal clustering bin 113 and might be increased to, for example, 4 meters of cross-range distance CR by 10 meters of down-range distance DR so as to provide for clustering relatively larger vehicles 12, for example, semi-tractor trailer vehicles 12. In FIGS. 14a and 14d, each region of interest (ROI) 114 is identified by a corresponding index value number in relatively large bold font which corresponds to the corresponding associated centroid 116 illustrated in FIG. 18.

The clustering process 1500 may also incorporate situation awareness to accommodate relatively large objects 50 that are larger than a nominal limiting size of the two-dimensional nominal clustering bins 113. For example, on a closed highway—as might determined by the fusion of a GPS navigation system and an associated map database—the range-cued object detection system 10 may limit the scope of associated clustering to include only vehicle objects 50' known to be present within the roadway. In this case, the vehicle object 50' will fit into a two-dimensional nominal clustering bin 113 of 3 meters wide (i.e. of cross-range distance CR) by 6 meters deep (i.e. of down-range distance DR). If the vehicle object 50' is longer (i.e. deeper) than 6 meters (for example an 18-wheeled semi-tractor trailer) the clustering process 1500 may split the vehicle object 50' into multiple sections that are then joined during motion tracking into a unified object based on coherent motion characteristics, with the associated individual parts moving with correlated velocity and acceleration.

Returning to FIG. 12, in step (1208) the cross-range $\overline{CR}$ and down-range $\overline{DR}$ coordinates of each centroid 116 of each region of interest (ROI) 114 are then determined in top-down space 102 for each region of interest (ROI) 114, as given by equations (5.1 or 5.2) and (6.1 or 6.2) above for the $i^{th}$ region of interest (ROI) 114 containing N associated valid range values 96. For example, if in step (1528) the coordinates of the associated centroid(s) 116 are updated, then, in step (1208), the previously determined coordinates for the centroid(s) 116 may be used, rather than recalculated.

In accordance with one set of embodiments, the resulting regions of interest (ROI) 114 are further characterized with corresponding elliptical or polygonal boundaries that can provide a measure of an associated instantaneous trajectories or heading angles of the corresponding objects 50 associated with the regions of interest (ROI) 114 so as to provide for an initial classification thereof.

Figure 16:
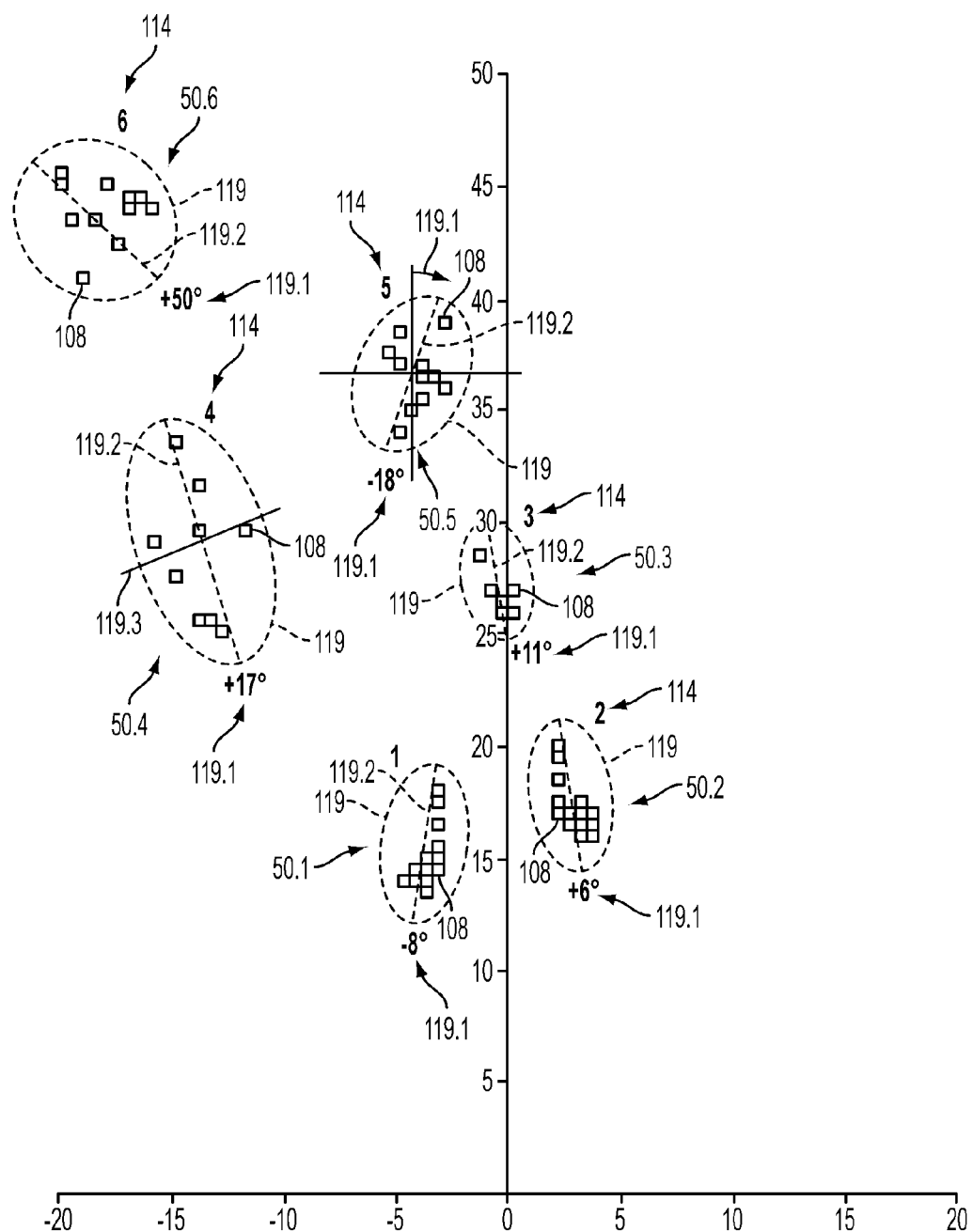

For example, referring to FIG. 16, for each region of interest (ROI) 114, an associated best-fit ellipse 119 is determined by using the following procedure, wherein the associated orientation thereof is defined as the counter-clockwise rotation angle 119.1 of the associated major axis 119.2 thereof relative to vertical (Y-Axis), and the associated rotation angles 119.1 are indicated on FIG. 16 for each corresponding region of interest (ROI) 114:

1. For each region of interest (ROI) 114, the following 2×2 matrix C is computed from the associated valid range values 96:

$$C = \begin{bmatrix} C_{1,1} & C_{1,2} \\ C_{2,1} & C_{2,2} \end{bmatrix} \quad (7.1)$$

wherein:

$$C_{1,1} = \frac{\sum_{k=1}^{N}(DR_k - \overline{DR})^2}{N-1}, \quad (7.2)$$

$$C_{1,2} = C_{2,1} = \frac{-\sum_{k=1}^{N}(CR_k - \overline{CR}) \cdot (DR_k - \overline{DR})}{N-1}, \quad (7.3)$$

and $$C_{2,2} = \frac{\sum_{k=1}^{N}(CR_k - \overline{CR})^2}{N-1}; \quad (7.4)$$

2. The eigenvalues $\{\lambda_1, \lambda_2\}$ and corresponding eigenvectors $\{\xi_1, \xi_2\}$ of matrix C are determined using principles of linear algebra;

3. The rotation angle 119.1 of the major axis of the best-fit ellipse 119 is given from the $\{\xi_1, \xi_2\}$ as:

$$\tan^{-1}\left(\frac{\xi_1(1)}{\xi_1(0)}\right); \text{ and} \quad (8)$$

4. The corresponding lengths of major 119.2 and minor 119.3 axes of the best-fit ellipse 119, are given from the associated eigenvalues $\{\lambda_1, \lambda_2\}$ as:

$$L_{Major} = \sqrt{2\lambda_1} \text{ and} \quad (9.1)$$

$$L_{Minor} = \sqrt{2\lambda_2}, \quad (9.2),$$

respectively.

Figure 17A:
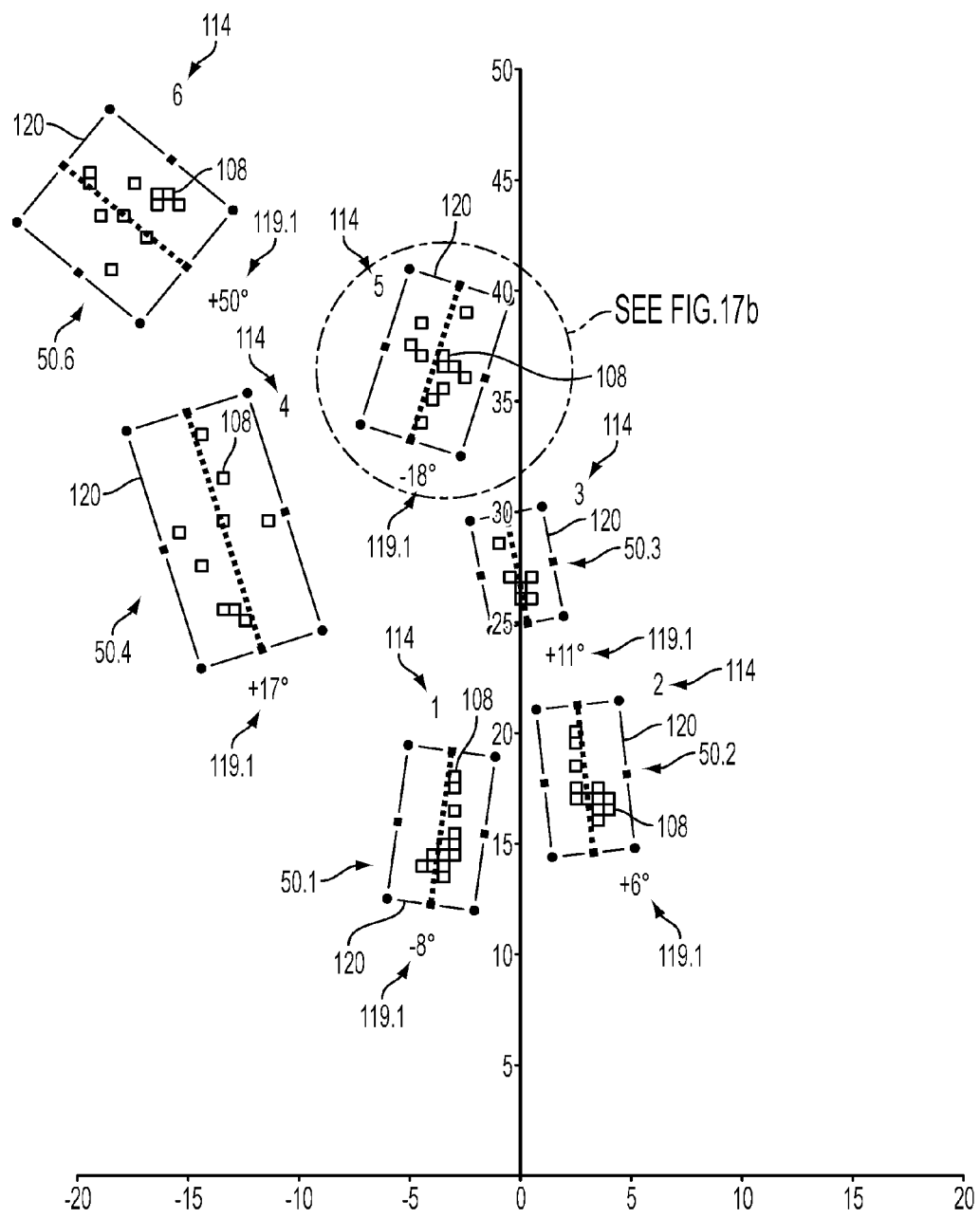
FIG. 17a illustrates corresponding best-fit rectangles associated with each of the regions of interest (ROI) illustrated in FIGS. 14a, 14d and 16.
Figure 17B:
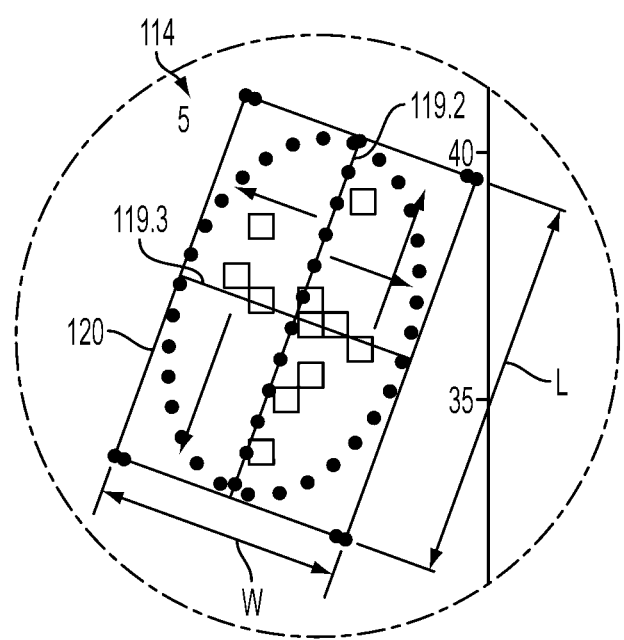
FIG. 17b illustrates a correspondence between the best-fit ellipse illustrated in FIG. 16 and the best-fit rectangle illustrated in FIG. 17a for one of the regions of interest (ROI)

Referring to FIGS. 17*a* and 17*b*, for each region of interest (ROI) 114, the corresponding best-fit polygonal boundary, for example, a best-fit rectangle 120, is then found from the corresponding lengths $L_{Major}$, $L_{Minor}$ of the major 119.2 and minor 119.3 axes of the corresponding associated best-fit ellipse 119, wherein the length L of the best-fit rectangle 120 is equal to the length $L_{Major}$ of the major axis 119.2 of the best-fit ellipse 119, and the width W of the best-fit rectangle 120 is equal to the length $L_{Minor}$ of the minor axis 119.3 of the best-fit ellipse 119, so that the best-fit ellipse 119 is circumscribed within the best-fit rectangle 120, with both sharing a common center and a common set of major 119.2 and minor 119.3 axes.

The polygonal boundary is used as a measure of the instantaneous trajectory, or heading angle, of the object 50 associated with the region of interest 114, and provides for an initial classification of the region of interest 114, for example, whether or not the range bins 108 thereof conform to a generalized rectangular vehicle model having a length L of approximately 6 meters and a width W of approximately 3 meters, the size of which may be specified according to country or region.

Then, in step (1210), the regions of interest (ROI) 114 are prioritized so as to provide for subsequent analysis thereof in order of increasing prospect for interaction with the vehicle 12, for example, in order of increasing distance in top-down space 102 of the associated centroid 116 of the region of interest (ROI) 114 from the vehicle 12, for example, for collision-feasible regions of interest (ROI) 114, possibly accounting for associated tracking information and the dynamics of the vehicle 12.

Then, beginning with step (1212), and continuing through step (1228), the regions of interest (ROI) 114 are each analyzed in order of increasing priority relative to the priorities determined in step (1210), as follows for each region of interest (ROI) 114:

In step (1214), with reference also to FIG. 18, the coordinates $\overline{CR}$, $\overline{DR}$ of the centroid 116 of the $i^{th}$ region of interest (ROI) 114 being analyzed are transformed from top-down space 102 to the coordinates $(X_{COL}^0(i), Y_{ROW}^0(i))$ of one of the first 40.1 or second 40.2 stereo image components—i.e. to a mono-image geometry,—as follows:

$$X_{COL}^0(i) = \frac{f \cdot \overline{CR}(i)}{\overline{DR}(i) \cdot \cos(\phi^i) + h \cdot \sin(\phi^i)}, \quad (10)$$

and $$Y_{ROW}^0(i) = \frac{f \cdot (\overline{DR}(i) \cdot \sin(\phi^i) - h \cdot \cos(\phi^i))}{\overline{DR}(i) \cdot \cos(\phi^i) + h \cdot \sin(\phi^i)}. \quad (11)$$

Figure 18:
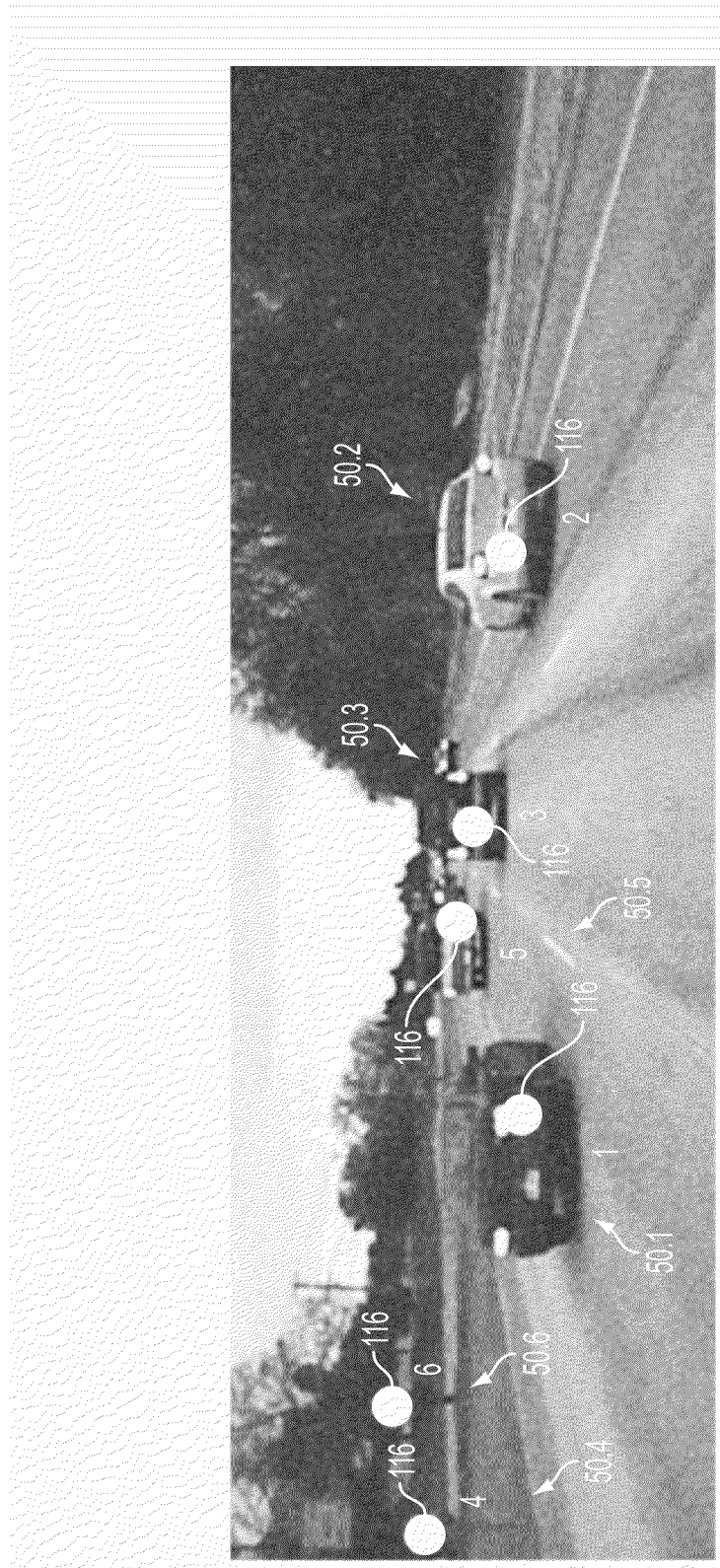
FIG. 18 illustrates the half-tone image of the scene of FIG. 13, upon which is superimposed locations of the centroids associated with each of the associated plurality of clusters of range bins.

FIG. 18 identifies the centroids 116 of each of regions of interest (ROI) 114 identified in FIGS. 14*a* and 14*d* corresponding to the objects 50 illustrated in FIG. 13, for six regions of interest (ROI) 114 in total.

Referring to FIGS. 19*a* through 23, in accordance with a third embodiment of the clustering process 1500, instead of nominally-sized clustering bins (113', 113", 113), the size and location of associated one-dimensional cross-range 121' and down-range 121" clustering bins are determined directly from the corresponding first 112.1 and second 112.2 histograms. These one-dimensional cross-range 121' and down-range 121" clustering bins are then used in the clustering process 1500 to determine corresponding two-dimensional clustering bins, which are then used in a manner similar to the way the two-dimensional nominal clustering bins 113 were used in the above-described second embodiment of the clustering process 1500.

Figure 19A:
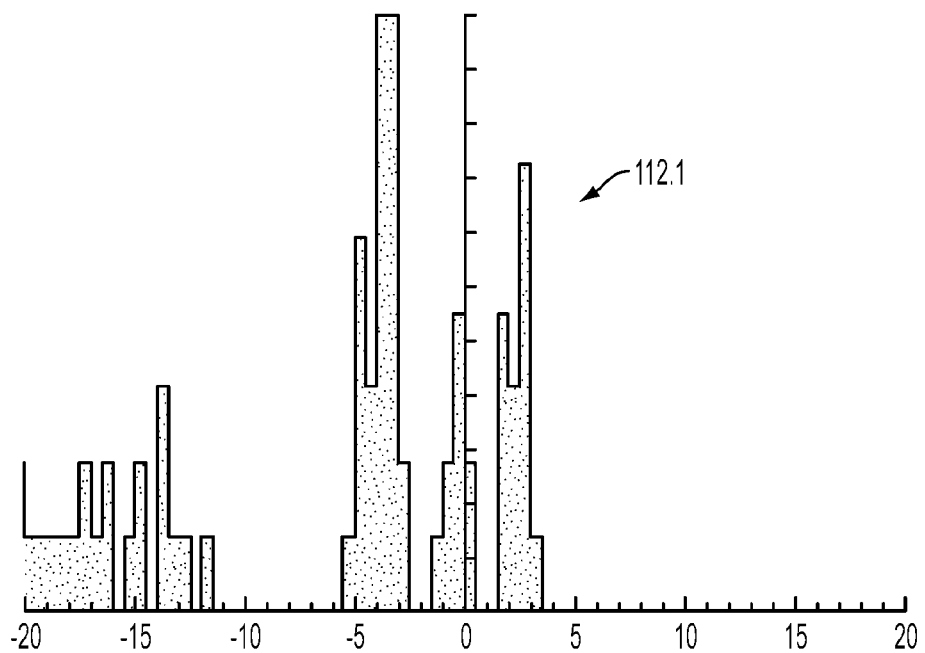
FIG. 19a is a copy of the first histogram illustrated in FIG. 14b.
Figure 19B:
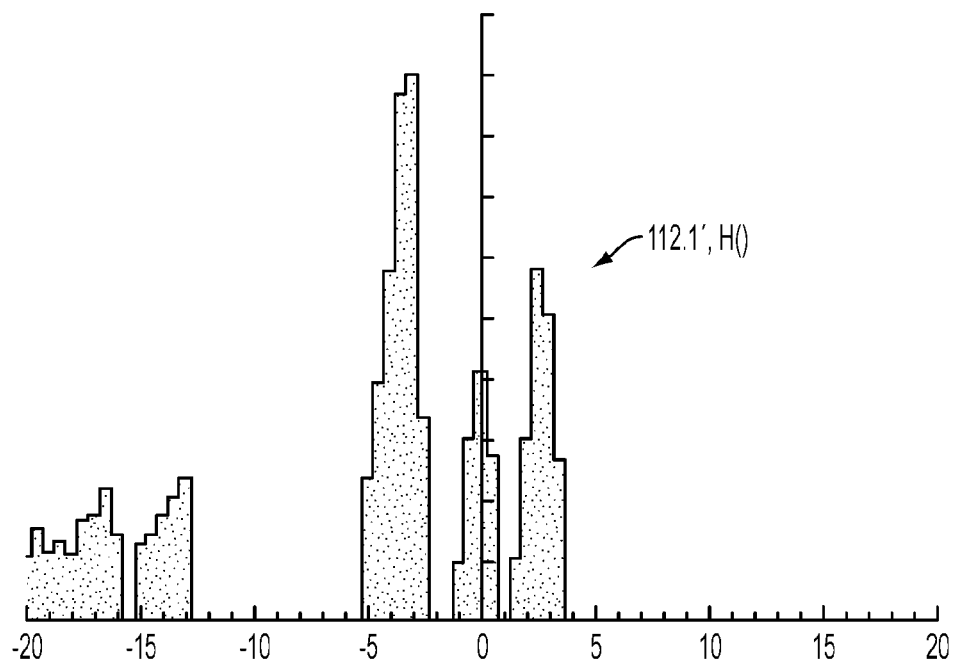
FIG. 19b illustrates a first filtered histogram generated by filtering the first histogram of FIGS. 14b and 19a using the first impulse response series illustrated in FIG. 21.
Figure 20A:
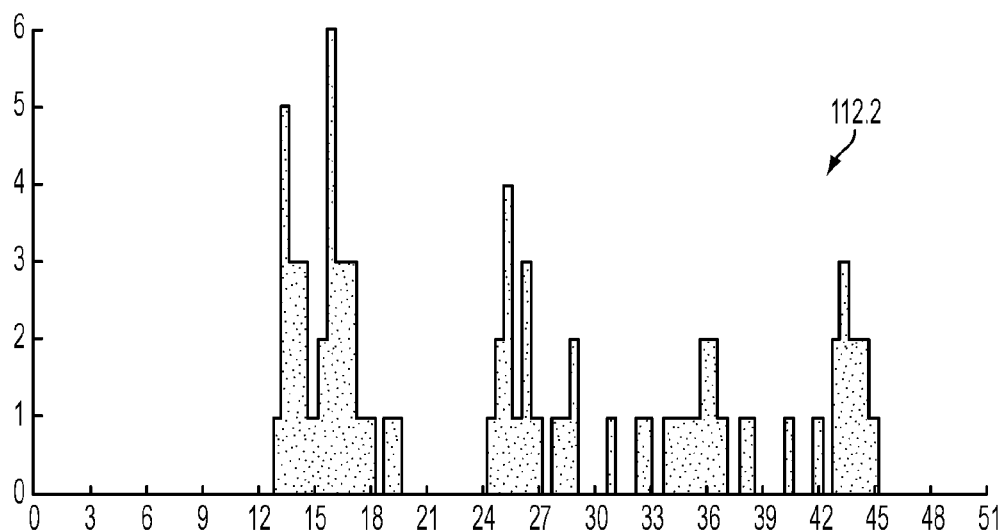
FIG. 20a is a copy of the second histogram illustrated in FIG. 14c.
Figure 20B:
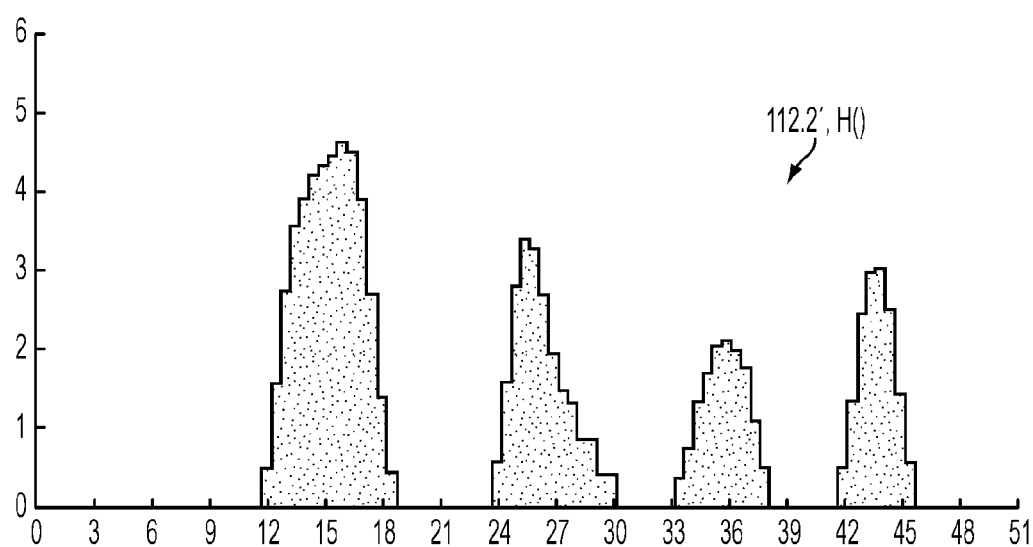
FIG. 20b illustrates a second filtered histogram generated by filtering the second histogram of FIGS. 14c and 20a using the second impulse response series illustrated in FIG. 21.
Figure 21:
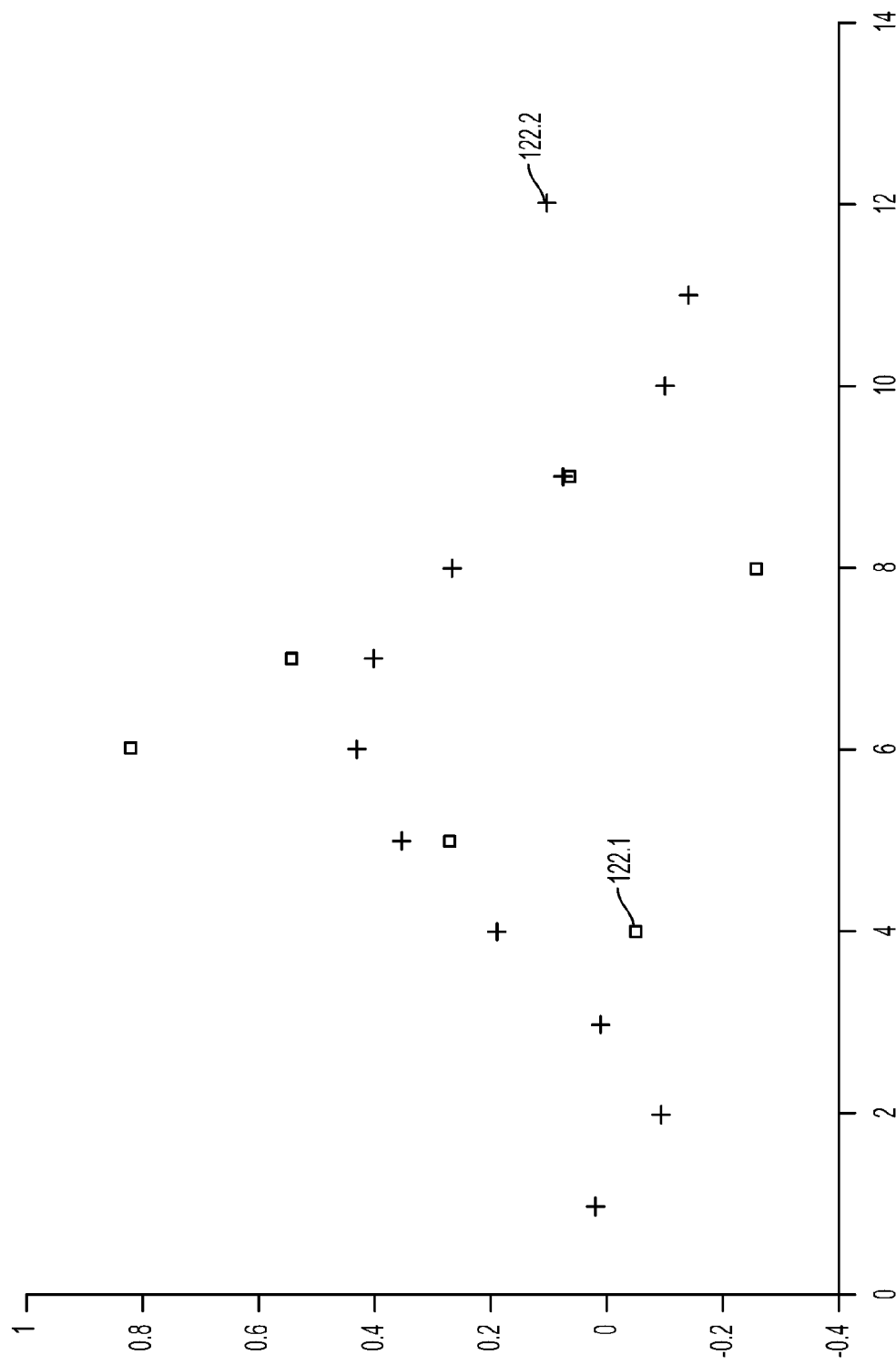
FIG. 21 illustrates first and second impulse response series used to filter the first and second histograms of FIGS. 19a and 20a to generate the corresponding first and second filtered histograms illustrated in FIGS. 19b and 20b, respectively.

More particularly, referring to FIGS. 19a and 19b, the first histogram 112.1 in cross-range, illustrated in FIG. 19a, is filtered—for example, using a Savitzky-Golay Smoothing Filter of length 6 for a clustering bin length of 3 meters with ½ meter resolution, the general details of which are described more fully hereinbelow—so as to generate a spatially-filtered first histogram 112.1', for example, as illustrated in FIG. 19b. Similarly, referring to FIGS. 20a and 20b, the second histogram 112.2 in down-range, illustrated in FIG. 20a, is filtered—for example, using a Savitzky-Golay Smoothing Filter of length 12 for a clustering bin length of 6 meters with ½ meter resolution—so as to generate a spatially-filtered first histogram 112.2', for example, as illustrated in FIG. 20b. The one-dimensional cross-range clustering bins 121' are assumed to be shorter than the one-dimensional down-range clustering bins 121"—so as to accommodate typically-oriented normally-proportioned vehicles—so the underlying filter kernel 122.1 for filtering in cross-range is shorter that the underlying filter kernel 122.2 for filtering in down-range so as to avoid joining adjacent one-dimensional clustering bins 121', 121". For example, the respective impulse responses 122.1, 122.2 of the cross-range and down-range Savitzky-Golay Smoothing Filters illustrated in FIG. 21 have the following corresponding values;

$$\mathbf{122.1}: \{-0.053571, 0.267856, 0.814286, 0.535715, \\ -0.267858, 0.053572\} \tag{12}$$

$$\mathbf{122.2}: \{0.018589, -0.09295, 0.00845, 0.188714, \\ 0.349262, 0.427, 0.394328, 0.25913, 0.064783, \\ -0.10985, -0.15041, 0.092948\} \tag{13}$$

Generally, other types of low-pass spatial filters having a controlled roll-off at the edges may alternatively be used to generate the spatially-filtered first 112.1' and second 112.2' histograms provided that the roll-off is sufficient to prevent joining adjacent clustering intervals, so as to provide for maintaining zero-density histogram bins 108', 108" between the adjacent clustering intervals, consistent with a real-world separation between vehicles.

Figure 22:
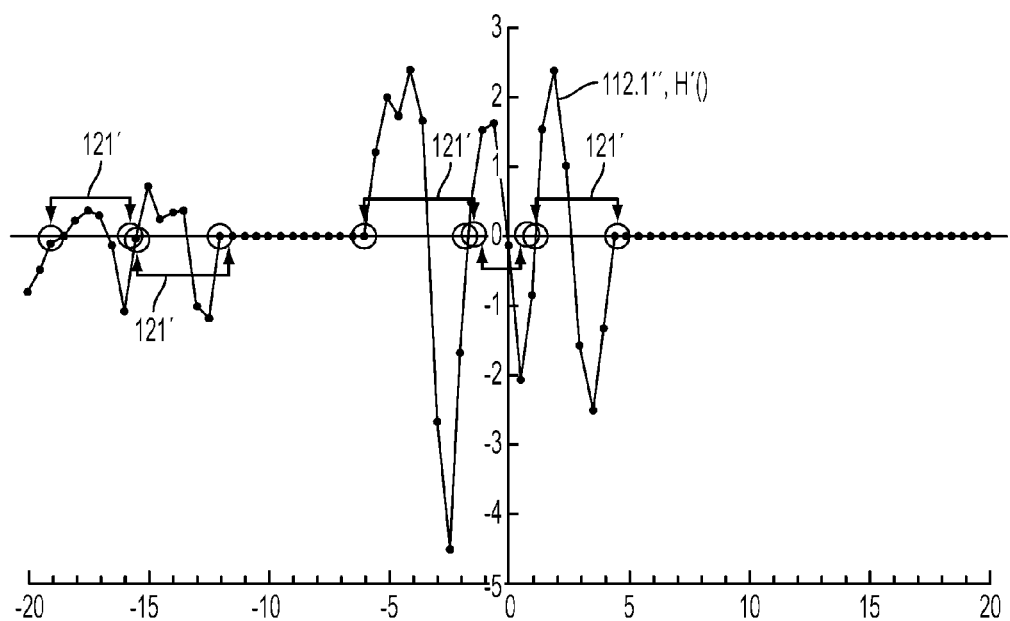
FIG. 22 illustrates a first spatial derivative of the first filtered histogram of FIG. 19b, upon which is superimposed a plurality of cross-range cluster boundaries determined therefrom, in accordance with a third embodiment of the associated clustering process.
Figure 23:
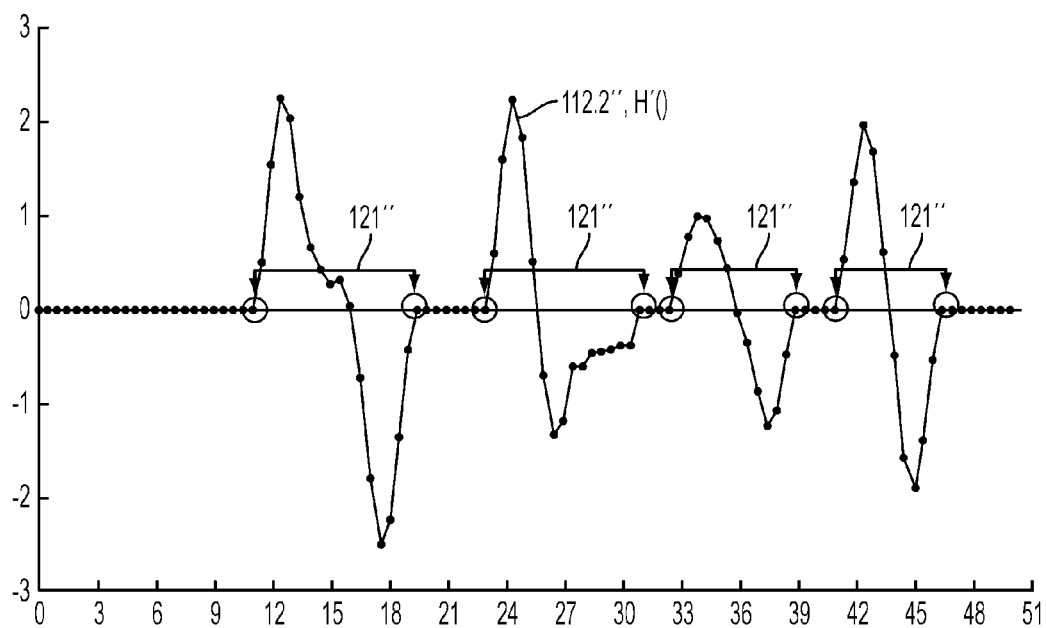
FIG. 23 illustrates a second spatial derivative of the second filtered histogram of FIG. 20b, upon which is superimposed a plurality of down-range cluster boundaries determined therefrom, in accordance with the third embodiment of the associated clustering process.

Referring to FIGS. 22 and 23, the resulting spatially-filtered first 112.1' and second 112.2' histograms provide for locally uni-modal distributions that can then be used to determine the boundaries of the corresponding one-dimensional cross-range 121' and down-range 121" clustering bins, for example, by spatially differentiating each of the spatially-filtered first 112.1' and second 112.2' histograms, so as to generate corresponding first 112.1" and second 112.2" spatially-differentiated spatially-filtered histograms, for cross-range and down-range, respectively, and then locating the edges of the associated uni-modal distributions from locations of associated zero-crossings of the associated spatial derivative functions.

More particularly, representing the $k^{th}$ element of either of the spatially-filtered first 112.1' and second 112.2' histograms as H(k), then, for example, the spatial derivative of the spatially-filtered first 112.1' and second 112.2' histograms, for example, using a central-difference differentiation formula, is given by:

$$H'(k) = \frac{H(k+1) - H(k-1)}{2}. \tag{14}$$

Alternatively, the spatial first derivative may be obtained directly using the Savitzky-Golay Smoothing Filter, as described more fully hereinbelow.

For a unimodal distribution of H(k) bounded by zero-density histogram bins, at the leading and trailing edges thereof, the first spatial derivative will be zero and the second special derivative will be positive, which, for example, is given by the $k^{th}$ element, for which:

$$H'(k) \leq 0 \text{ AND } H'(k+1) > 0 \tag{15}$$

The peak of the uni-modal distribution is located between the edge locations at the $k^{th}$ element for which:

$$H'(k) \geq 0 \text{ AND } H'(k+1) < 0 \tag{16}$$

Accordingly, the boundaries of the one-dimensional cross-range 121' and down-range 121" clustering bins are identified by pairs of zero-crossings of H'(k) satisfying equation (15), between which is located a zero-crossing satisfying equation (16). Given the location of the one-dimensional cross-range 121' and down-range 121" clustering bins, the clustering process 1500 then proceeds as described hereinabove to associate the two-dimensional range bins 108 with corresponding two-dimensional clustering bins that are identified from the above one-dimensional cross-range 121' and down-range 121" clustering bins for each set of combinations thereof.

Each centroid 116 is then used as a radial search seed 123 in a process provided for by steps (1216) through (1224) to search for a corresponding edge profile 124' of the object 50 associated therewith, wherein the first 40.1 or second 40.2 stereo image component is searched along each of a plurality of radial search paths 126—each originating at the radial search seed 123 and providing associated polar vectors 126' of image pixel 100 data—to find a corresponding edge point 124 of the object 50 along the associated radial search paths 126, wherein the edge profile 124' connects the individual edge points 124 from the plurality of associated radial search paths 126, so as to provide for separating the foreground object 50 from the surrounding background clutter 128.

More particularly, in step (1216), the limits of the radial search are first set, for example, with respect to the width and height of a search region centered about the radial search seed 123. For example, in one set of embodiments, the maximum radial search distance along each radial search path 126 is responsive to the down-range distance DR to the centroid 116 of the associated object 50. For example, in one embodiment, at 25 meters the largest roadway object 50—i.e. a laterally-oriented vehicle 12—spans 360 columns and 300 rows, which would then limit the corresponding radial search length to 235 image pixels 100 as given by half the diagonal distance of the associated rectangular boundary (i.e. $\sqrt{360^2 + 300^2}/2$). In another embodiment, the search region defining bounds of the radial search paths 126 is sized to accommodate a model vehicle 12 that is 3 meters wide and 3 meters high. In another set of embodiments, the maximum radial search distance is responsive to the associated search direction—as defined by the associated polar search direction θ—for example, so that the associated search region is within a bounding rectangle in the first 40.1 or second 40.2 stereo image component that represents a particular physical size at the centroid 116. Alternatively, the maximum radial search distance is responsive to both the associated search direction and a priori knowledge of the type of object 50, for example, that might result from tracking the object 50 over time.

Figure 27:
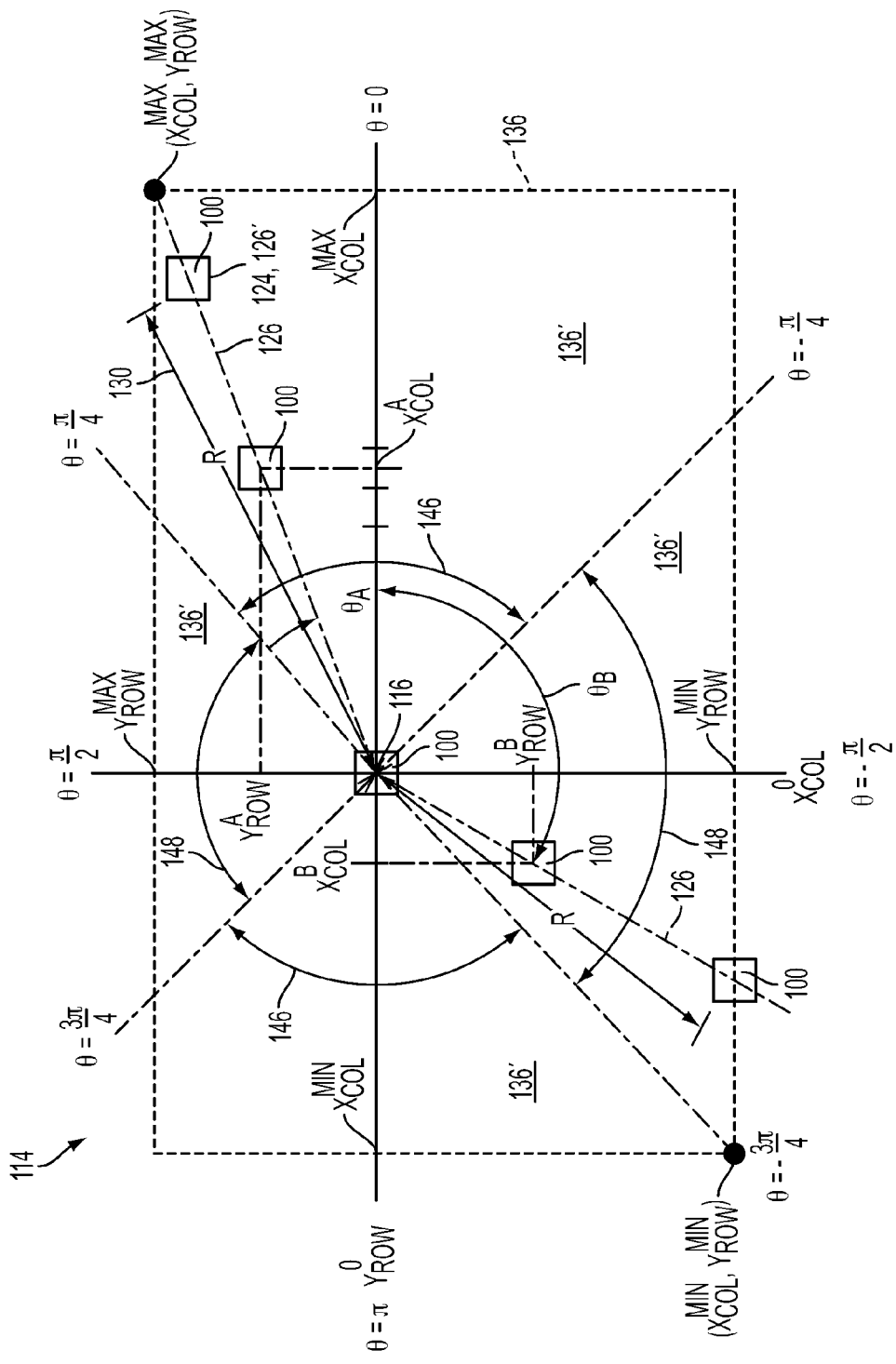
FIG. 27 illustrates several image pixels in a centroid-centered local coordinate system associated with the process illustrated in FIG. 26.

Then, referring to FIGS. 24a, 25a and 27, in step (1218), for each of a plurality of different polar search directions θ, in step (1220), the first 40.1 or second 40.2 stereo image component is searched, commencing at the radial search seed 123 and searching radially outwards therefrom along the radial search path 126, so as to provide for determining the radius 130 of the edge point 124 of the object 50 along the associated radial search path 126 at the associated polar search direction θ thereof, wherein, for example, in one set of embodiments, the plurality of radial search paths 126 are uniformly spaced in polar search direction θ. For example, FIG. 24a illustrates 30 uniformly spaced radial search paths 126, and FIG. 25a illustrates 45 uniformly spaced radial search paths 126. In both FIGS. 24a and 25a, the maximum radial search distance varies with search direction in accordance with an associated search region to accommodate vehicles 12 that are wider than they are high.

In step (1222), during the search along each radial search path 126, the associated image pixels 100 of the first 40.1 or second 40.2 stereo image component therealong are filtered with an Edge Preserving Smoothing (EPS) filter 132' so as to provide for separating the foreground object 50 from the surrounding background clutter 128, thereby locating the associated edge point 124 along the radial search path 126. For example, in one set of embodiments, the Edge Preserving Smoothing (EPS) filter 132' comprises a Maximum Homogeneity Neighbor (MHN) Filter 132—described more fully hereinbelow—that provides for removing intra-object variance while preserving boundary of the object 50 and the associated edge points 124. Then, from step (1224), step (1218) of the range-cued object detection process 1200 is repeated for each different polar search direction θ, until all polar search directions θ are searched, resulting in an edge profile vector 124" of radial distances of the edge points 124 from the centroid 116 of the object 50 associated with the region of interest (ROI) 114 being processed. The edge profile 124' of the object 50 is formed by connecting the adjacent edge points 124 from each associated radial search path 126—stored in the associated edge profile vector 124"—so as to approximate a silhouette of the object 50, the approximation of which improves with an increasing number of radial search paths 126 and corresponding number of elements of the associated edge profile vector 124", as illustrated by the comparison of FIGS. 24b and 25b for 30 and 45 radial search paths 126, respectively.

In step (1226), in one set of embodiments, each element of the edge profile vector 124" is transformed from centroid-centered polar coordinates to the image coordinates ($X_{COL}$(i,m), $Y_{ROW}$(i,m)) of one of the first 40.1 or second 40.2 stereo image components—i.e. to the mono-image geometry,—as follows, so as to provide for detecting the associated $i^{th}$ object 50 in the associated mono-image geometry:

$$X_{COL}(i,m) = X_{COL}^0 + R(i,m) \cdot \cos(\theta_m), \text{ and} \quad (17.1)$$

$$Y_{ROW}(i,m) = Y_{ROW}^0 + R(i,m) \cdot \sin(\theta_m); \quad (18.1)$$

or, for a total of M equi-angularly spaced polar vectors 126':

$$X_{COL}(i, m) = X_{COL}^0(i) + R(i, m) \cdot \cos\left(\frac{m \cdot 2\pi}{M}\right), \quad (17.2)$$

and $$Y_{ROW}(i, m) = Y_{ROW}^0(i) + R(i, m) \cdot \sin\left(\frac{m \cdot 2\pi}{M}\right), \quad (18.2)$$

wherein m is the search index that ranges from 0 to M, R(i,m) is the $m^{th}$ element of the edge profile vector 124" for the $i^{th}$ object 50, given by the radius 130 from the corresponding centroid 116 ($X_{COL}^0$(i), $Y_{ROW}^0$(i)) to the corresponding edge point $124^m$ of the object 50. For example, in one set of embodiments, the transformed image coordinates ($X_{COL}$(i,m), $Y_{ROW}$(i,m)) are stored in an associated transformed edge profile vector 124'".

In step (1228) the process continues with steps (1212) through (1226) for the next region of interest (ROI) 114, until all regions of interest (ROI) 114 have been processed.

Then, or from step (1226) for each object 50 after or as each object 50 is processed, either the transformed edge profile vector 124'", or the edge profile vector 124" and associated centroid 116 ($X_{COL}^0$ (i), $Y_{ROW}^0$ (i)), or the associated elements thereof, representing the corresponding associated detected object 134, is/are outputted in step (1230), for example, to an associated object discrimination system 92, for classification thereby, for example, in accordance with the teachings of U.S. patent application Ser. No. 11/658,758 filed on 19 Feb. 2008, entitled Vulnerable Road User Protection System, or U.S. patent application Ser. No. 13/286,656 filed on 1 Nov. 2011, entitled Method of Identifying an Object in a Visual Scene, which are incorporated herein by reference.

Figure 26:
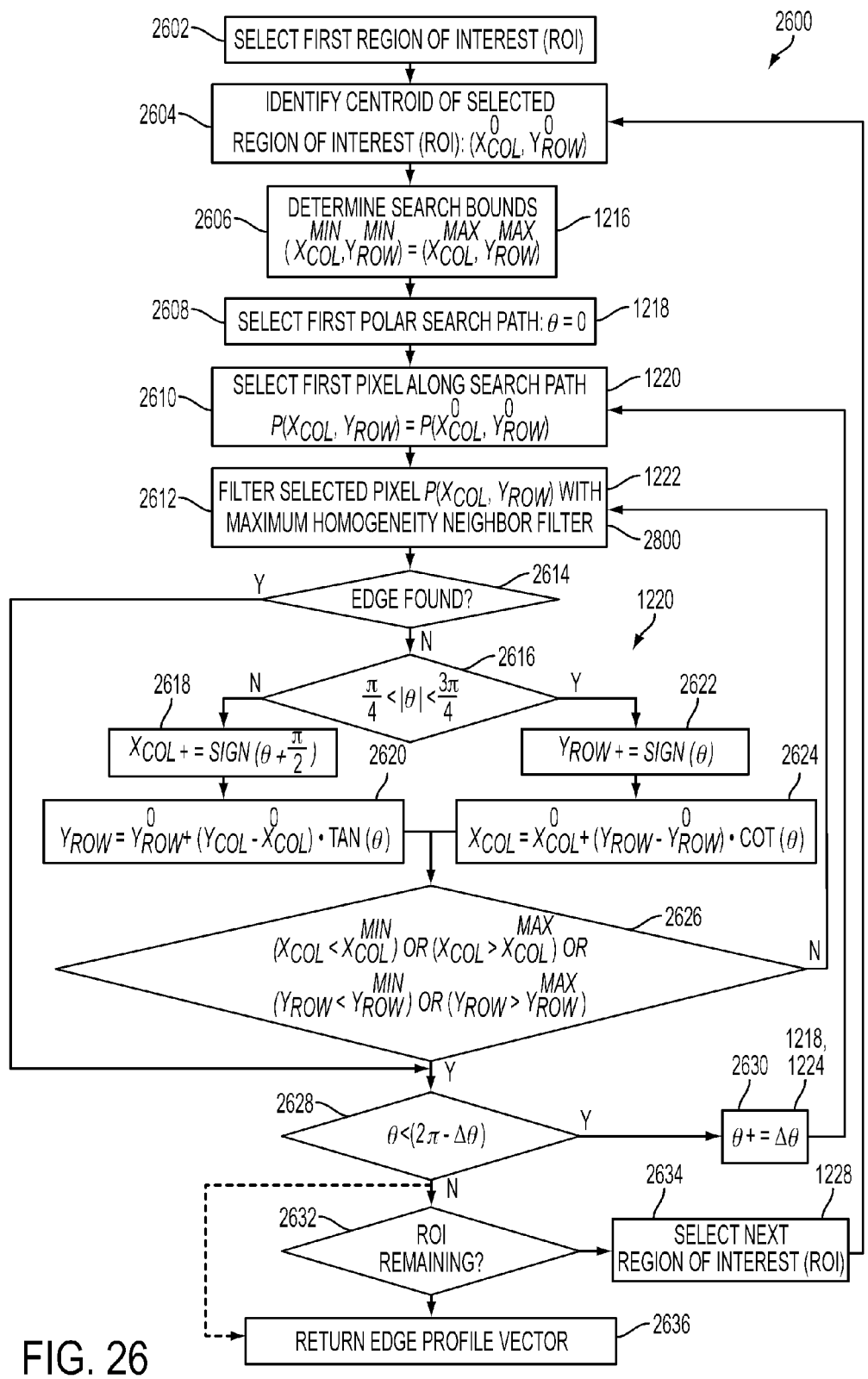
FIG. 26 illustrates a flow chart of an object detection process for finding edges of objects in an image.

For example, referring to FIG. 26, there is illustrated a mono-image-based object detection process 2600 that illustrates one embodiment of steps (1212), (1214)-(1224) and (1228) of the above-described range-cued object detection process 1200, and that provides for detecting objects 50, 134 within associated regions of interest (ROI) 114 within one of the first 40.1 or second 40.2 stereo image components, given the locations therein of the corresponding centroids 116 thereof. More particularly, in step (2602), the first region of interest (ROI) 114 is selected, for example, in accordance with the priority from step (1210) hereinabove. Then, in step (2604), the centroid 116 ($X_{COL}^0$, $Y_{ROW}^0$) of the selected region of interest (ROI) 114 is identified with respect to the image coordinate system of the associated first 40.1 or second 40.2 stereo image component, for example, as given from step (1214) hereinabove. Then, referring to FIG. 27, in step (2606), the associated search bounds are determined, for example, as given from step (1216) hereinabove, for example, so as to determine the coordinates of opposing corners ($X_{COL}^{MIN}$, $Y_{ROW}^{MIN}$), ($X_{COL}^{MAX}$, $Y_{ROW}^{MAX}$) of an associating bounding search rectangle 136. Then, in step (2608)—corresponding to step (1218)—the first polar search direction θ selected, for example, 0 degrees, and in step (2610)—corresponding to step (1220)—the first image pixel 100 is selected to be filtered and searched along the associated radial search path 126, i.e. P($X_{COL}$, $Y_{ROW}$), for example, at the centroid 116 ($X_{COL}^0$, $Y_{ROW}^0$). Then, in step (2612)—corresponding to step (1222)—the selected image pixel 100 P($X_{COL}$, $Y_{ROW}$) is filtered using a Maximum Homogeneity Neighbor (MHN) Filter 132, for example, by an associated Maximum Homogeneity Neighbor (MHN) filtering process 2800 illustrated in FIG. 28.

Figure 28:
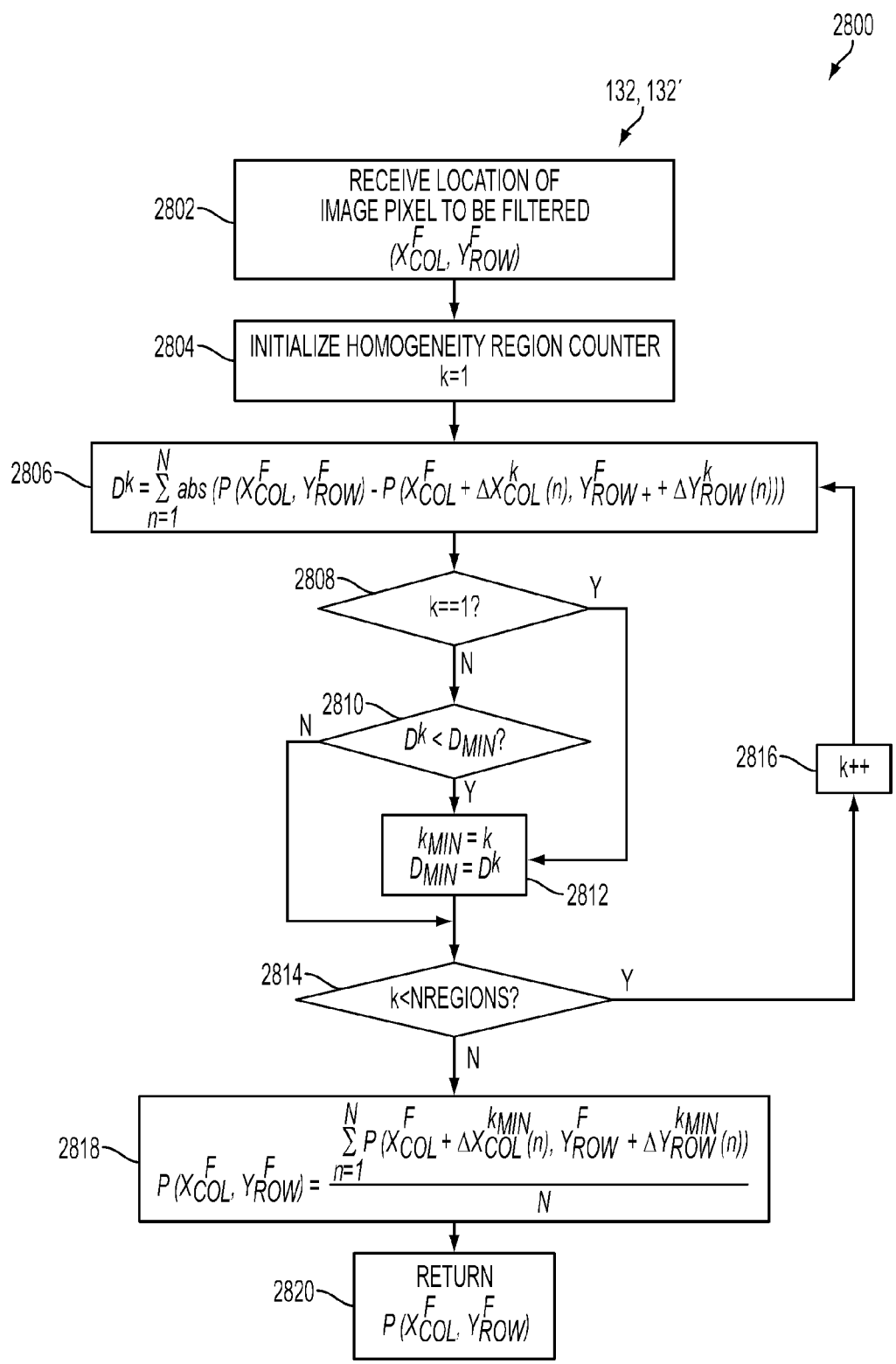
FIG. 28 illustrates a flow chart of a Maximum Homogeneity Neighbor filtering process.

More particularly, referring to FIG. 28, in step (2802), the Maximum Homogeneity Neighbor (MHN) filtering process 2100 receives the location of the image pixel 100 P($X_{COL}$, $Y_{ROW}$) to be filtered, designated herein by the coordinates ($X_{COL}^F$, $Y_{ROW}^F$). Then, in step (2804), a homogeneity region counter k is initialized, for example, to a value of 1.

In step (2806), the image pixel $100^0$ P($X_{COL}^F$, $Y_{ROW}^F$) is filtered using a plurality of different homogeneity regions 138, each comprising a particular subset of plurality of neighboring image pixels $100^n$ at particular predefined locations relative to the location of the image pixel $100^0$ P($X_{COL}^F$, $Y_{ROW}^F$) being filtered, wherein each homogeneity region 138 is located around the image pixel 100$^0$ P($X_{COL}^F$,$Y_{ROW}^F$), for example, so that in one embodiment, the image pixel 100$^0$ P($X_{COL}^F$,$Y_{ROW}^F$) being filtered is located at the center 140 of each homogeneity region 138, and the particular subsets of the neighboring image pixels 100$^n$ are generally in a radially outboard direction within each homogeneity region 138 relative to the center 140 thereof. For example, in one embodiment, each homogeneity region 138 spans a 5-by-5 array of image pixels 100 centered about the image pixel 100$^0$ P($X_{COL}^F$,$Y_{ROW}^F$) being filtered.

For example, referring to FIG. 29i, for purposes of describing the particular homogeneity regions 138, for example, each location therewithin is identified by relative coordinates (i,j) that refer to the location thereof relative to the center 140 of the corresponding homogeneity region 138. Each homogeneity region 138 contains a plurality of N active elements 142 for which the values of the corresponding image pixels 100 being filtered are summed so produce an associated intermediate summation result during the associated filtering process for that particular homogeneity region 138. Accordingly, for a given homogeneity region 138$^k$, if the associated homogeneity region 138$^k$, identified as F$^k$(i,j) has values of 1 for each of the associated active elements 142, and 0 elsewhere, and if the corresponding values of the image pixels 100 at locations relative to the location of the image pixel 100$^0$ being filtered are given by P(i,j), wherein P(0,0) corresponds to the image pixel 100$^0$ being filtered, then for the homogeneity region 138$^k$ spanning columns $I_{MIN}$ to $I_{MAX}$, and rows $J_{MIN}$ to $J_{MAX}$, then the corresponding associated deviation D$^k$ is given by:

$$D^k = \sum_{i=I_{MIN}}^{I_{MAX}} \sum_{j=J_{MIN}}^{J_{MAX}} F^k(i,j) \cdot (P(0,0) - P(i,j)), \quad (19.1)$$

which can be simplified to $$D^k = \sum_{n=1}^{N} \text{abs}(P_0 - P_n), \quad (19.2)$$

wherein $P_0$ is the value of the image pixel 100$^0$ being filtered, $P_n$ is the value of a neighboring image pixel 100$^n$ corresponding to the n$^{th}$ active element 142 of the associated homogeneity region 138$^k$ for which there are a total of N active elements 142. Alternatively, as illustrated in FIG. 28 for step (2806), the deviation D$^k$ can be expressed with respect to absolute coordinates of associated image pixels 100 as:

$$D^k = \sum_{n=1}^{N} \text{abs}(P(X_{COL}^F, Y_{ROW}^F) - \quad (19.3)$$
$$P(X_{COL}^F + \Delta X_{COL}^k(n), Y_{ROW}^F + \Delta Y_{ROW}^k(n))),$$

wherein $\Delta X_{COL}^k(n)$ and $\Delta Y_{ROW}^k(n)$ are the relative locations of the n$^{th}$ active element 142 of the k$^{th}$ homogeneity region 138$^k$, i.e. the respective coordinates (i,j) of active element 142 F$^k$(i,j), so that $\Delta X_{COL}^k(n)$=i and $\Delta Y_{ROW}^k(n)$=j per the illustration of FIG. 29i.

For example, FIG. 29a illustrates a first homogeneity region 138$^1$ having active elements 142 at locations (−2,2), (−1,0), (−1,1) and (0,1) so as to operate on selected image pixels 100 in an upward-leftward direction nominally at 135 degrees from the X-axis 144; FIG. 29b illustrates a second homogeneity region 138$^2$ having active elements 142 at locations (0,2), (−1,0), (0,1) and (1,0) so as to operate on selected image pixels 100 in an upward direction nominally at 90 degrees from the X-axis 144; FIG. 29c illustrates a third homogeneity region 138$^3$ having active elements 142 at locations (2,2), (0,1), (1,1) and (1,0) so as to operate on selected image pixels 100 in an upward-rightward direction nominally at 45 degrees from the X-axis 144; FIG. 29d illustrates a fourth homogeneity region 138$^4$ having active elements 142 at locations (−2,−2), (−1,0), (−1,−1) and (0,−1) so as to operate on selected image pixels 100 in a downward-leftward direction nominally at −135 degrees from the X-axis 144; FIG. 29e illustrates a fifth homogeneity region 138$^5$ having active elements 142 at locations (0,−2), (−1,0), (0,−1) and (1,0) so as to operate on selected image pixels 100 in a downward direction nominally at −90 degrees from the X-axis 144; FIG. 29f illustrates a sixth homogeneity region 138$^6$ having active elements 142 at locations (2,−2), (0,−1), (1,−1) and (1,0) so as to operate on selected image pixels 100 in a downward-rightward direction nominally at −45 degrees from the X-axis 144; FIG. 29g illustrates a seventh homogeneity region 138$^7$ having active elements 142 at locations (−2,0), (0,−1), (−1,0) and (0,1) so as to operate on selected image pixels 100 in a leftward direction nominally at 180 degrees from the X-axis 144; and FIG. 29h illustrates a eighth homogeneity region 138$^8$ having active elements 142 at locations (2,0), (0,1), (1,0) and (0,−1) so as to operate on selected image pixels 100 in a rightward direction nominally at 0 degrees from the X-axis 144, wherein the particular image pixels 100 associated with each homogeneity region 138$^k$ are identified in accordance with the legend of FIG. 29i.

Following calculation of the deviation D$^k$ in step (2806), in step (2808), during the first loop of the Maximum Homogeneity Neighbor (MHN) filtering process 2800 for which the associated homogeneity region counter k has a value of 1, or subsequently from step (2810), if the value of the deviation D$^k$ for k$^{th}$ homogeneity region 138$^k$ is less than a previously stored minimum deviation value $D_{MIN}$, then, in step (2812), the minimum deviation value $D_{MIN}$ is set equal to the currently calculated value of deviation D$^k$, and the value of an associated minimum deviation index $k_{MIN}$T is set equal to the current value of the homogeneity region counter k. Then, in step (2814), if the current value of the homogeneity region counter k is less than the number NRegions of homogeneity regions 138, then the homogeneity region counter k is incremented in step (2816), and the Maximum Homogeneity Neighbor (MHN) filtering process 2800 continues with steps (2806)-(2814) for the next homogeneity region 138.

Otherwise, from step (2814), after the deviation D$^k$ has been calculated and processed for each of the NRegions homogeneity regions 138, then, in step (2818), in one embodiment, the image pixel 100$^0$ P($X_{COL}^F$, $Y_{ROW}^F$) being filtered is replaced with the average value of the neighboring image pixels 100$^n$ of the homogeneity region 138 having the minimum deviation D$^{k_{MIN}}$. If the number N of active elements 142 is equal to a power of 2, then the division by N in step (2818) can be implemented with a relatively fast binary right-shift of N bits. Alternatively, in another embodiment of step (2818), the image pixel 100$^0$ P($X_{COL}^F$, $Y_{ROW}^F$) being filtered is replaced with the median of the values of the neighboring image pixels 100$^6$ of the homogeneity region 138 having the minimum deviation D$^{k_{MIN}}$, which may be more robust relative to the corresponding average value, although the average value can generally be computed more quickly than the median value.

In one embodiment, the Maximum Homogeneity Neighbor (MHN) filtering process 2800 utilizes the NRegions=6 homogeneity regions 138 illustrated in FIGS. 29a-29f, collectively with active elements 142 so as to provide for operating on selected image pixels 100 in upward-leftward, upward, upward-rightward, downward-leftward, downward, and downward rightward directions relative to the image pixel $100^0$ ($X_{COL}^F$, $Y_{ROW}^F$) being filtered, wherein it is observed that relative to leftward and rightward directions, the upward and downward directions appear to provide for distinct uniqueness amongst real-world objects 50, so as to preclude—in some embodiments of the Maximum Homogeneity Neighbor (MHN) filtering process 2800—the need for the homogeneity regions 138 illustrated in FIGS. 29g and 29h.

Generally, the Maximum Homogeneity Neighbor (MHN) Filter 132 acts similar to a low-pass filter. For example, the action of the Maximum Homogeneity Neighbor (MHN) Filter 132 is illustrated in FIGS. 30-32, wherein FIG. 30 illustrates an image 146, for which a portion 146.1 thereof illustrated in FIG. 31—shown at 2× magnification relative to that of FIG. 30—is filtered with the above-described Maximum Homogeneity Neighbor (MHN) filtering process 2800 using the NRegions=6 homogeneity regions 138 illustrated in FIGS. 29a-29f, pixel-by-pixel, so as to generate the corresponding filtered image portion 146.1' is illustrated in FIG. 32, the latter of which, relative to the original image portion 146.1, exhibits substantially less variation in local intensity, but with sharp edges preserved.

Returning to FIGS. 28 and 26, respectively, in step (2820) of the Maximum Homogeneity Neighbor (MHN) filtering process 2800, the filtered image pixel $100^0$ $P(X_{COL}^F, Y_{ROW}^F)$ is returned to step (2612) of the mono-image-based object detection process 2600, after which, in step (2614), this filtered image pixel $100^0$ $P(X_{COL}^F, Y_{ROW}^F)$ associated with a given polar vector 126' is analyzed in view of previously returned values of the same polar vector 126' to determine if the current filtered image pixel $100^0$ $P(X_{COL}^F, Y_{ROW}^F)$ is an edge point 124 of the associated object 50. The criteria for finding the edge point 124 along a given polar vector 126' is based primarily on differential intensity between foreground and background regions. The Maximum Homogeneity Neighbor (MHN) filtering process 2800 provides for suppressing interior edges so as to provide for more accurately determining the corresponding edge points 124 along each radial search path 126 associated with the actual boundary of the object 50, as described more fully hereinbelow.

If, from step (2614), the edge point 124 is not found, then, in accordance with one embodiment, the next image pixel 100 to be filtered along the radial search path 126 is located in accordance with steps (2616)-(2626), as follows:

Referring again to FIG. 27, if, in step (2616), the absolute value of angle of the polar search direction θ as measured from the X-axis 144 (to which the rows of image pixels 100 are parallel) is not between π/4 and 3π/4 radians, so that the associated radial search path 126 is located in a first portion 146 of the image space 136' within the bounding search rectangle 136, then the next image pixel 100 along the radial search path 126 is advanced to the next column $X_{COL}(i+1)$ along the radial search path 126 further distant from the associated centroid 116, and to the corresponding row $Y_{ROW}(i+1)$ along the radial search path 126. More particularly, in step (2618), the next column $X_{COL}(i+1)$ is given by adding the sign of (θ+π/2) to the current column $X_{COL}(i)$, and, in step (2620), the next row $Y_{ROW}(i+1)$ is given by:

$$Y_{ROW}(i+1)=Y_{ROW}^0+(X_{COL}(i+1)-X_{COL}^0)\cdot\tan(\theta_m),\qquad(20.1)$$

which, for integer-valued results, can be effectively rounded to give:

$$Y_{ROW}(i+1)=Y_{ROW}^0+\text{INT}((X_{COL}(i+1)-X_{COL}^0)\cdot\tan(\theta_m)+0.5).\qquad(20.2)$$

Otherwise, from step (2616), if the absolute value of angle of the polar search direction θ is between π/4 and 3π/4 radians, so that the associated radial search path 126 is located in a second portion 148 of the image space 136' within the bounding search rectangle 136, then the next image pixel 100 along the radial search path 126 is advanced to the next row $Y_{ROW}(i+1)$ along the radial search path 126 further distant from the associated centroid 116, and to the corresponding column $X_{COL}(i+1)$ along the radial search path 126. More particularly, in step (2622), the next row $Y_{ROW}(i+1)$ is given by adding the sign of θ to the current row $Y_{ROW}(i)$, and, in step (2624), the next column $X_{COL}(i+1)$ is given by:

$$X_{COL}(i+1)=X_{COL}^0+(Y_{ROW}(i+1)-Y_{ROW}^0)\cdot\cot(\theta),\qquad(21.1)$$

which, for integer-valued results, can be effectively rounded to give:

$$X_{COL}(i+1)=X_{COL}^0+\text{INT}((Y_{ROW}(i+1)-Y_{ROW}^0)\cdot\cot(\theta)+0.5).\qquad(21.2)$$

Then, in step (2626), if the location ($X_{COL}(i+1)$, $Y_{ROW}(i+1)$) of the next image pixel 100 is not outside the bounding search rectangle 136, then the mono-image-based object detection process 2600 continues with steps (2612)-(2626) in respect of this next image pixel 100. Accordingly, if an edge point 124 along the radial search path 126 is not found within the bounding search rectangle 136, then that particular radial search path 126 is abandoned, with the associated edge point 124 indicated as missing or undetermined, for example, with an associated null value. Otherwise, in step (2628), if all polar search directions θ have not been searched, then, in step (2630), the polar search direction θ is incremented to the next radial search path 126, and the mono-image-based object detection process 2600 continues with steps (2610)-(2626) in respect of this next polar search direction θ. Otherwise, in step (2632), if all regions of interest (ROI) 114 have not been processed, then, in step (2634), the next region of interest (ROI) 114 is selected, and the mono-image-based object detection process 2600 continues with steps (2604)-(2626) in respect of this next region of interest (ROI) 114. Otherwise, from step (2632) if all regions of interest (ROI) 114 have been processed, or alternatively, from step (2628) as each region of interest (ROI) 114 is processed, in step (2636), the associated edge profile vector 124" or edge profile vectors 124" is/are returned as the detected object(s) 134 so as to provide for discrimination thereof by the associated object discrimination system 92.

Figure 33A:
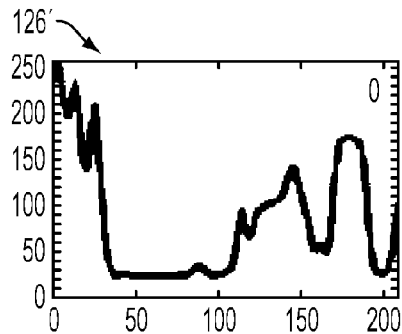
Figure 33B:
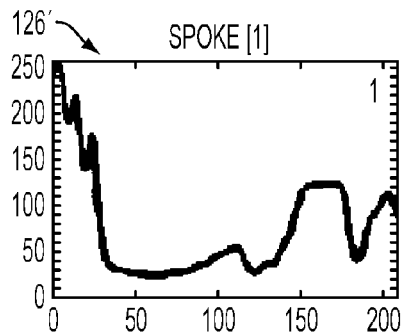
Figure 33C:
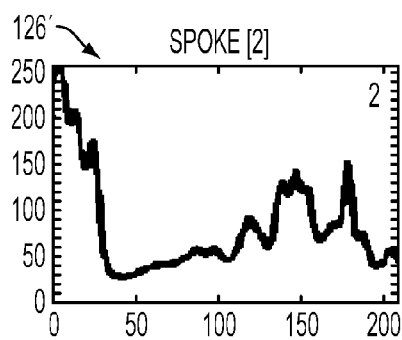
Figure 33D:
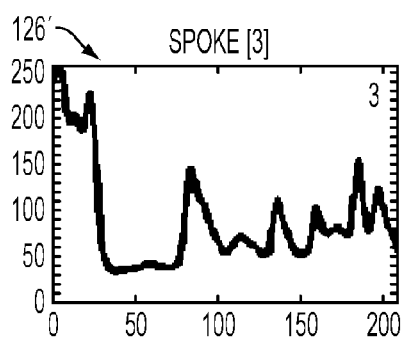
Figure 33E:
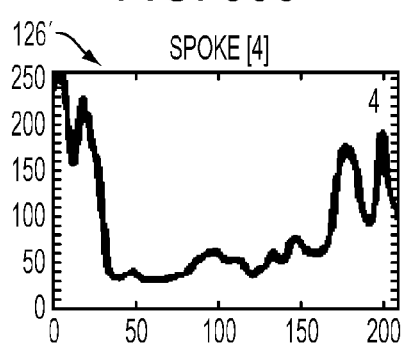
Figure 33F:
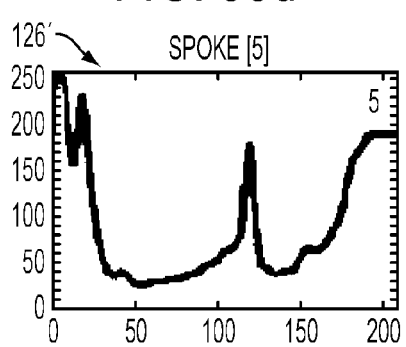
Figure 33G:
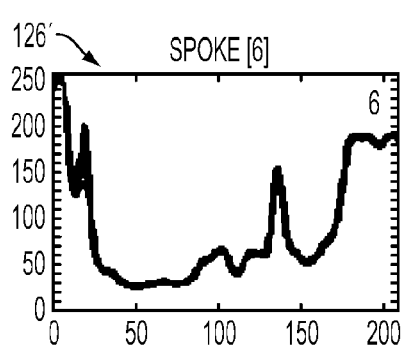
Figure 33H:
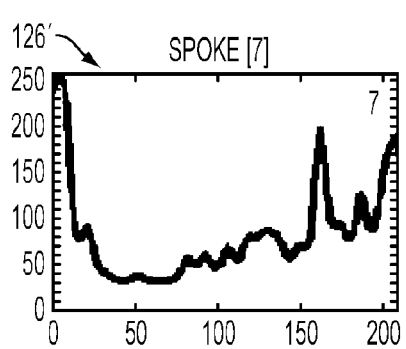
Figure 33I:
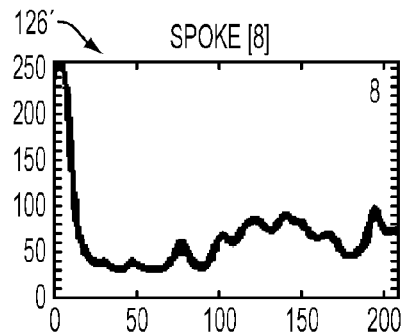
Figure 33J:
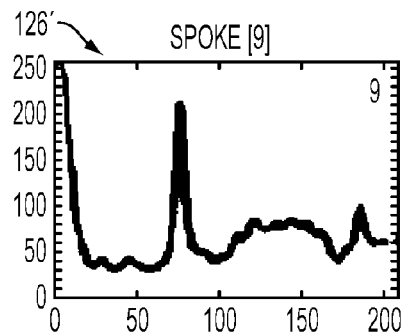
Figure 33K:
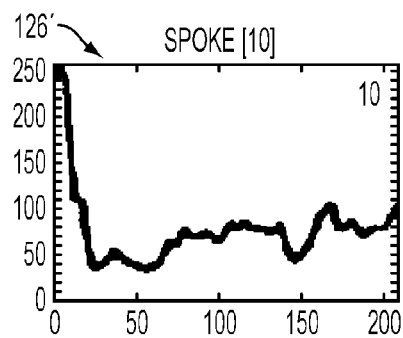
Figure 33L:
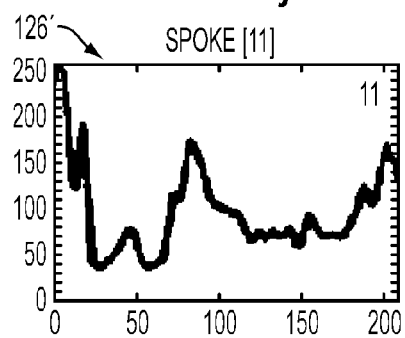
Figure 33M:
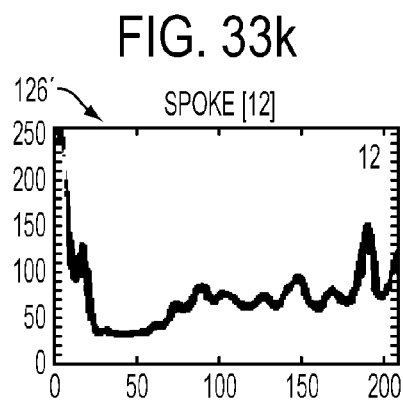
Figure 33N:
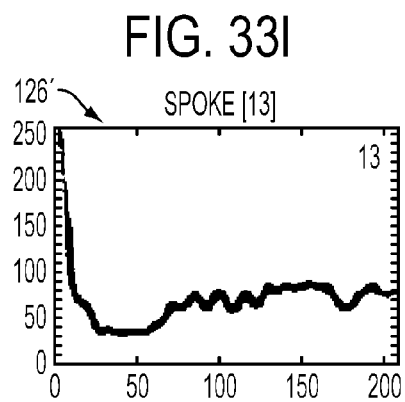
Figure 33O:
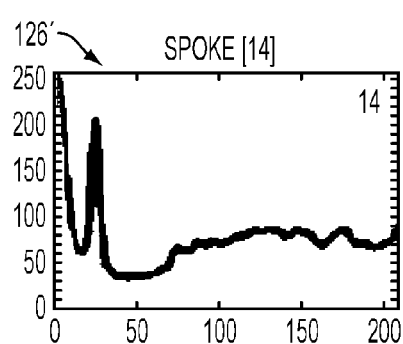
Figure 33P:
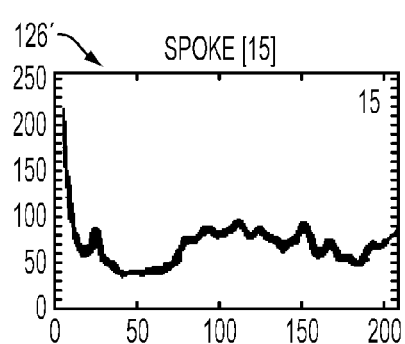
Figure 33Q:
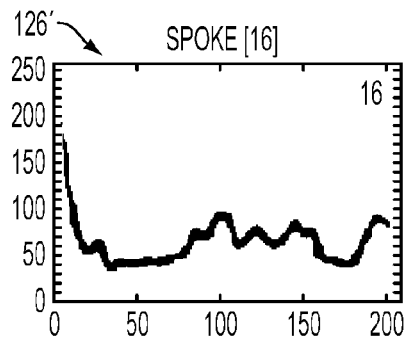
Figure 33R:
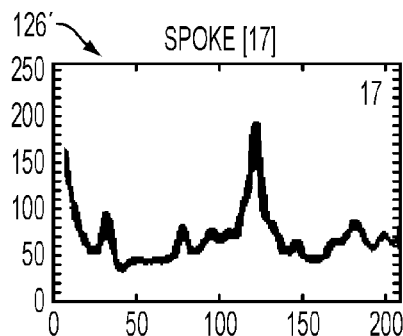
Figure 33S:
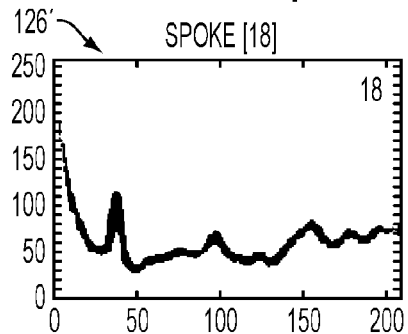
Figure 33T:
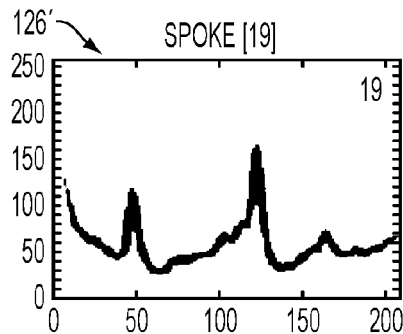
Figure 33U:
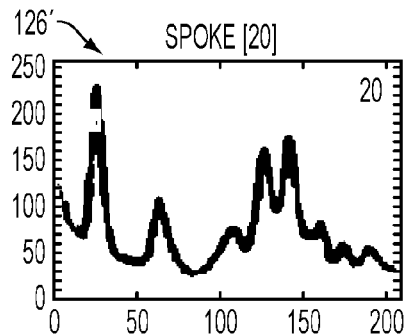
Figure 33V:
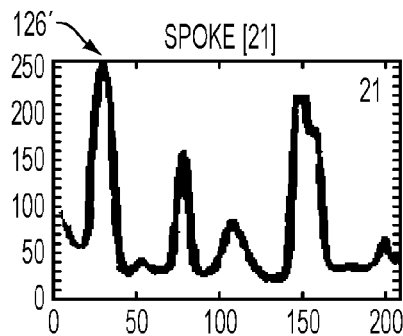
Figure 33W:
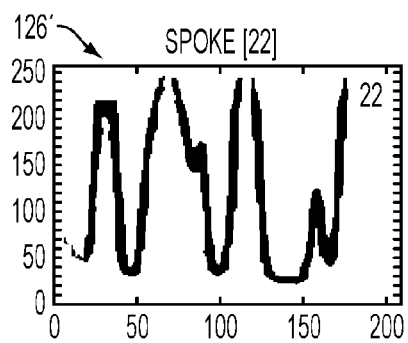
Figure 33X:
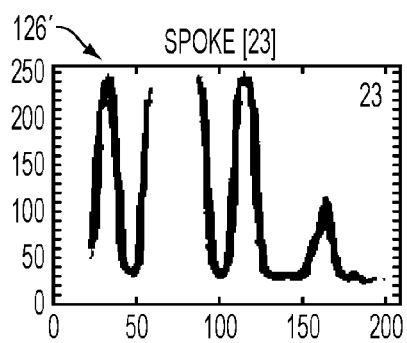
Figure 33Y:
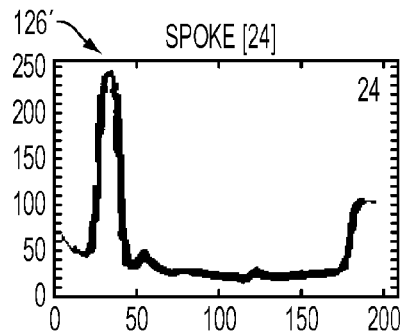
Figure 33Z:
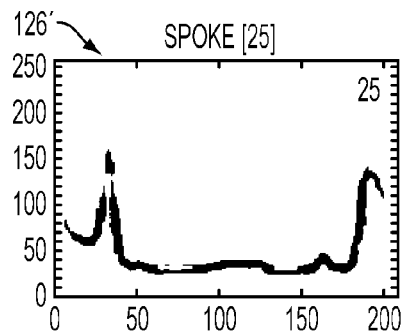
Figure 33A:
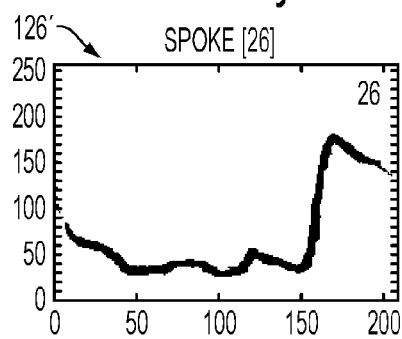
Figure 33B:
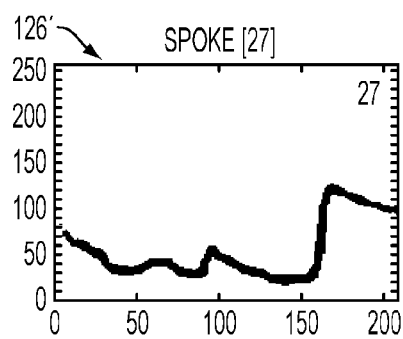
Figure 33C:
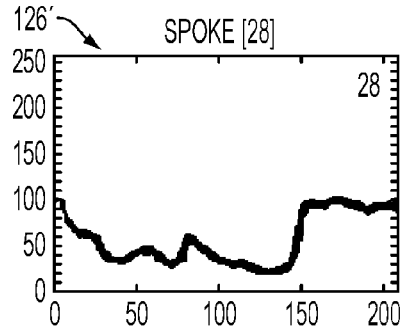
Figure 33D:
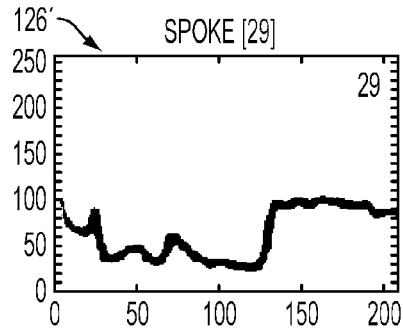
Figure 33E:
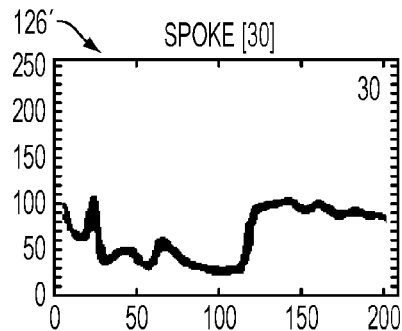
Figure 33F:
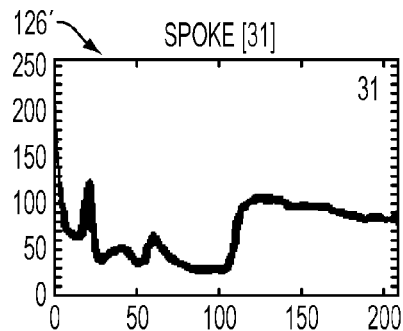
Figure 33G:
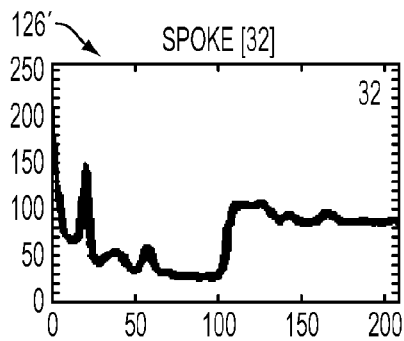
Figure 33H:
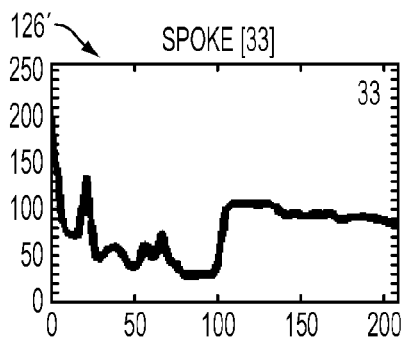
Figure 33I:
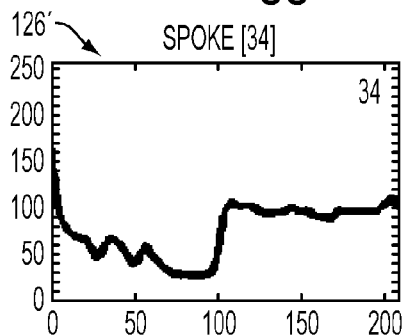
Figure 33J:
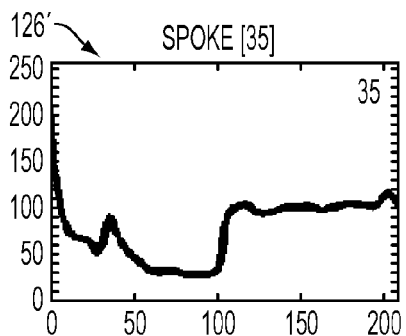
Figure 33K:
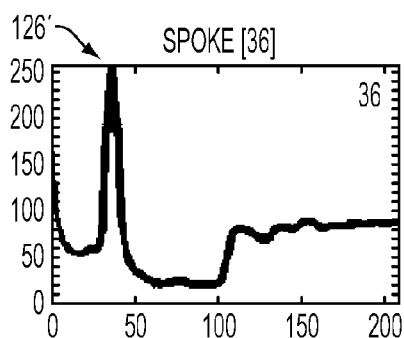
Figure 33L:
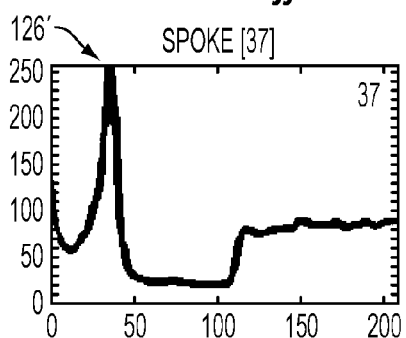
Figure 33M:
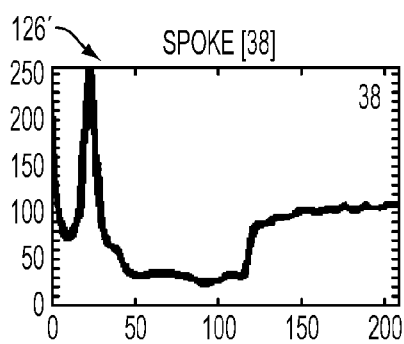
Figure 33N:
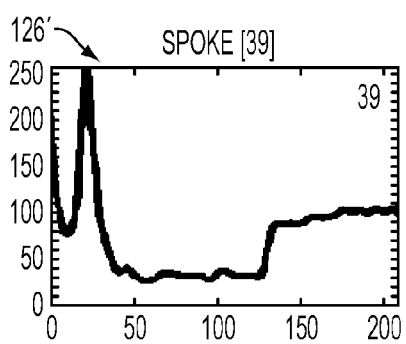
Figure 33O:
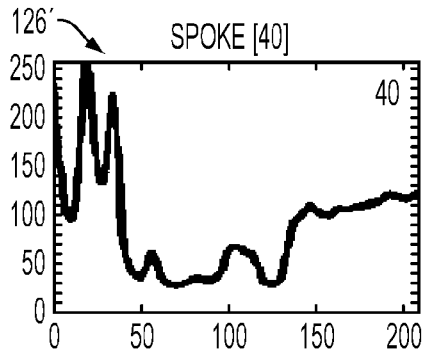
Figure 33P:
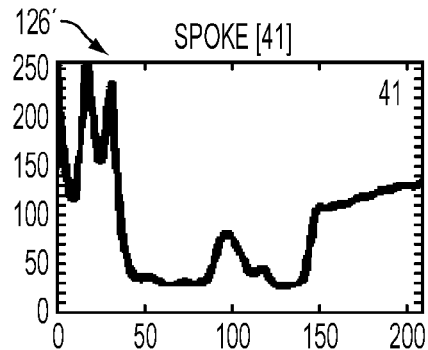
Figure 33Q:
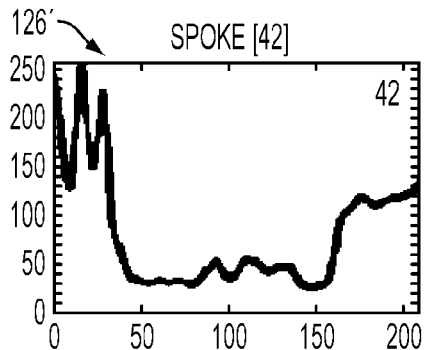
Figure 33R:
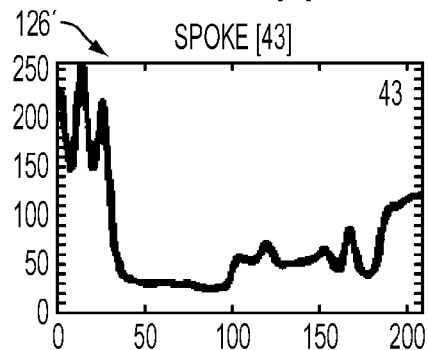
Figure 33S:
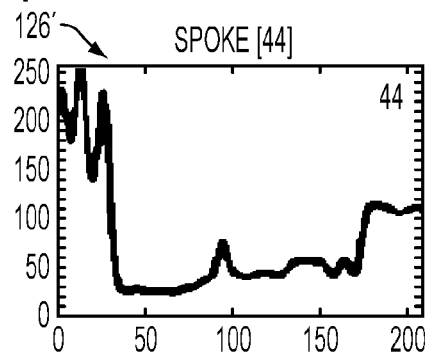

For example, FIGS. 33a-33ss illustrates a plurality of 45 polar vectors 126' for the object 50 illustrated in FIG. 25a—each containing the values of the image pixels 100 along the corresponding radial search path 126—that are used to detect the associated edge profile 124' illustrated in FIG. 25b, the latter of which is stored as an associated edge profile vector 124"/transformed edge profile vector 124'" that provides a representation of the associated detected object 134.

Figure 34:
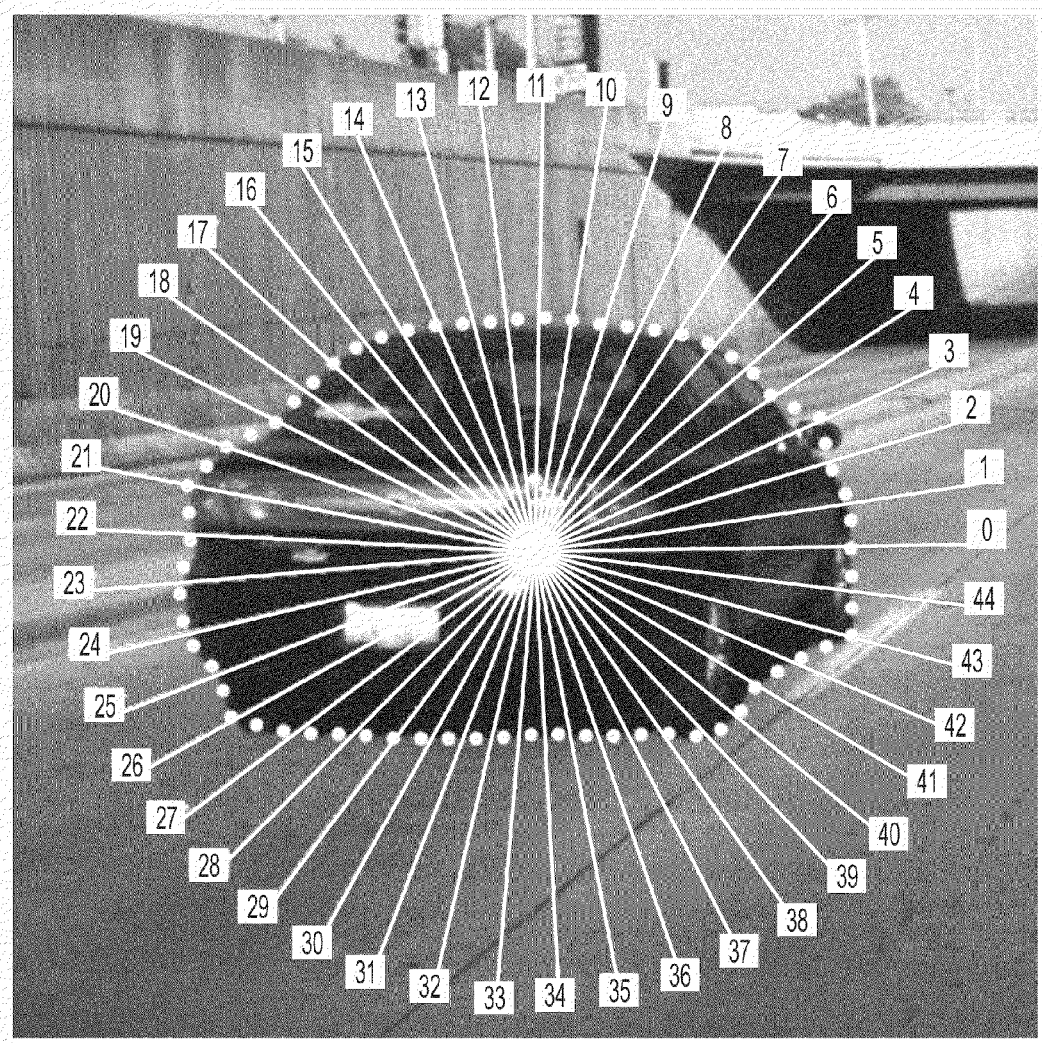
FIG. 34 illustrates an image of a vehicle object detected with in an associated region of interest, upon which is superimposed a plurality of 45 associated radial search paths.
Figure 35A:
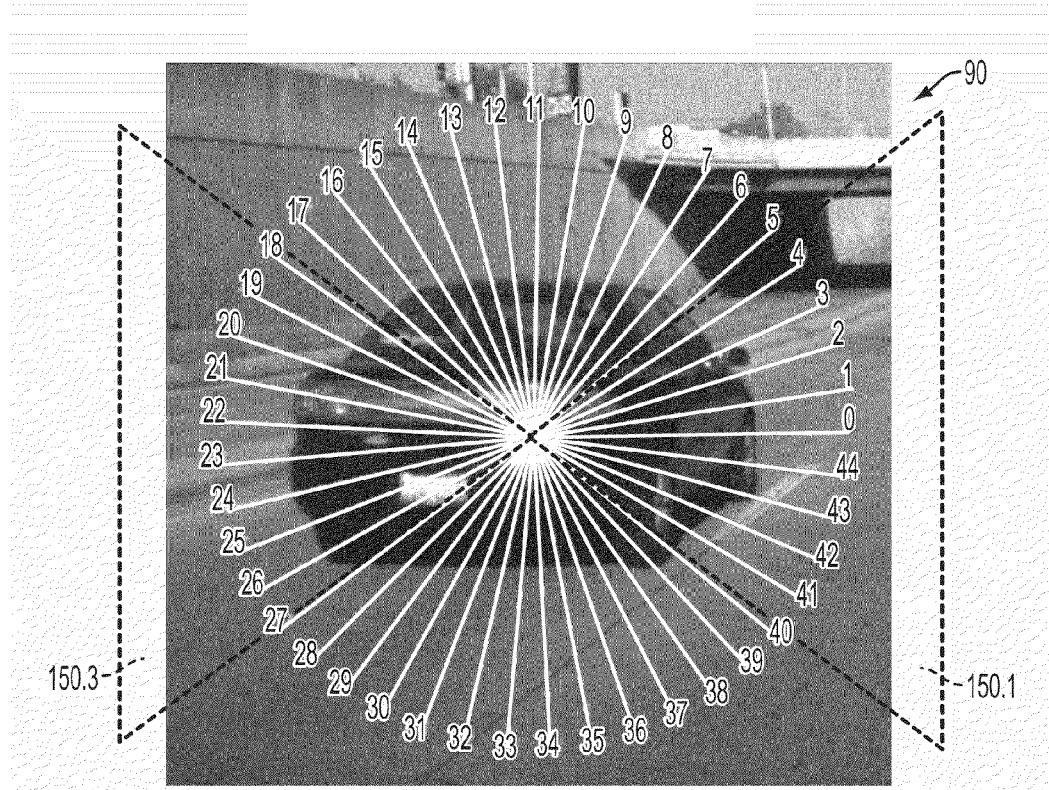
FIG. 35a illustrates the image of the vehicle object from FIG. 34 together with the boundaries of first and third quadrants associated with the detection of associated edge points of the vehicle object.
Figure 35B:
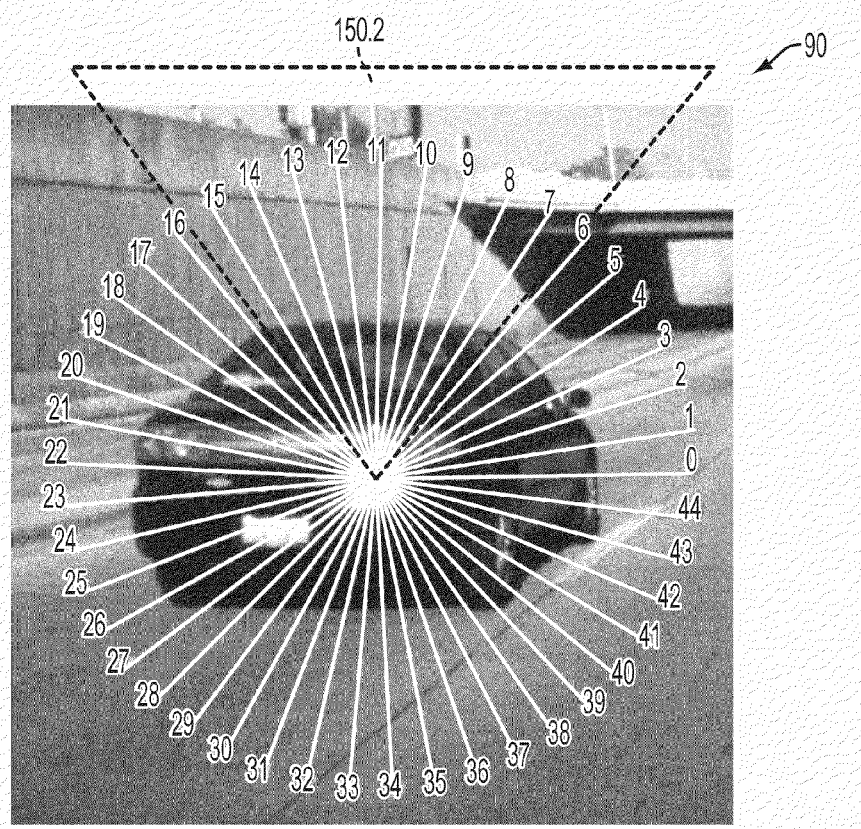
FIG. 35b illustrates the image of the vehicle object from FIG. 34 together with the boundaries of a second quadrant associated with the detection of associated edge points of the vehicle object.
Figure 35C:
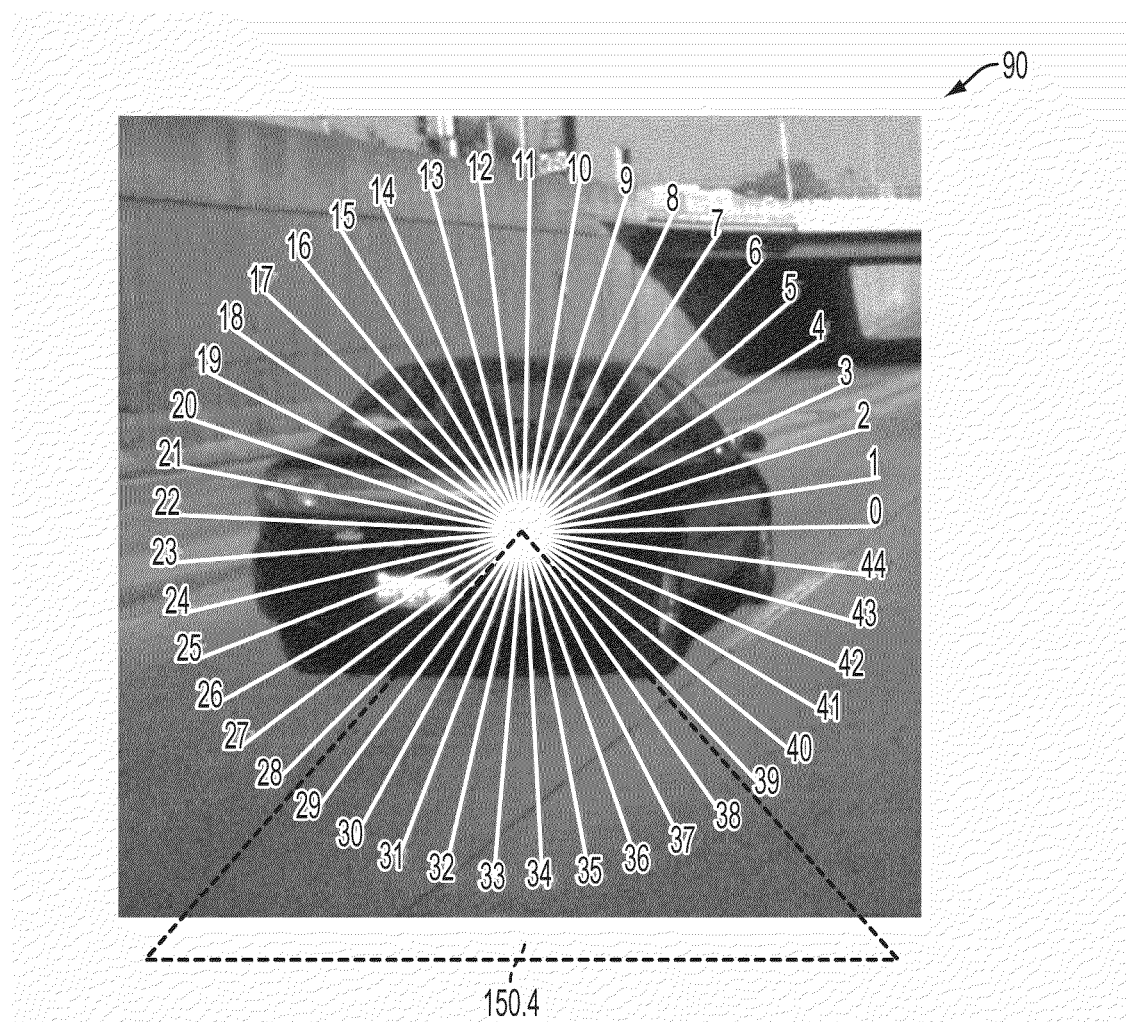
FIG. 35c illustrates the image of the vehicle object from FIG. 34 together with the boundaries of a fourth quadrant associated with the detection of associated edge points of the vehicle object.

Referring to FIG. 34, the edge points 124 for 45 associated radial search paths 126—identified by numbers 0 through 44—are illustrated for an associated vehicle object 50', wherein each radial search path 126 originates at the centroid 116 and each edge point 124—indicated by a white dot in FIG. 34—is at a distance $R_i$, therefrom. Referring to FIGS. 35a-c, each region of interest (ROI) 114 is divided into 4 quadrants 150.1, 150.2, 150.3 and 150.4, and the condition for detecting a particular edge point 124 depends upon the corresponding quadrant 150.1, 150.2, 150.3, 150.4 within which the edge point 124 is located.

Referring to FIG. 35a, for the first 150.1 and third 150.3 quadrants, extending from 315 degrees to 45 degrees, and from 135 degrees to 225 degrees, respectively, within which a target vehicle object 50' would typically transition to either a background regions or an adjacent object within the associated image 90, the transition associated with an edge point 124 is typically characterized by a relatively large shift in amplitude of the associated image pixels 100. Relatively small amplitude shifts relatively close to the associated centroid 116 would typically correspond to internal structure(s) within the target vehicle object 50', which internal structure(s) are substantially eliminated or attenuated by the Maximum Homogeneity Neighbor (MHN) Filter 132. For example, FIGS. 36a-c and FIGS. 36g-i illustrate the associated polar vectors 126' and the locations of the associated edge points 124 for radial search paths 126 identified in FIG. 34 as 0, 1, 2, 22, 23 and 24, respectively, at respective angles of 0 degrees, 8 degrees, 16 degrees, 176 degrees, 184 degrees, and 192 degrees.

Figure 36A:
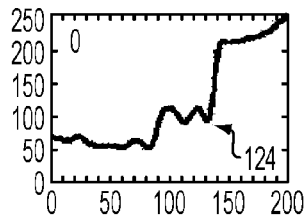
FIGS. 36a-l illustrate plots of the amplitudes of polar vectors for selected radial search paths from FIGS. 34 and 35a-c.
Figure 36B:
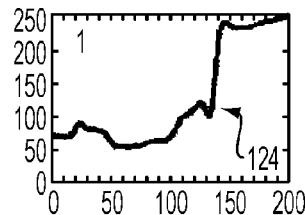
Figure 36C:
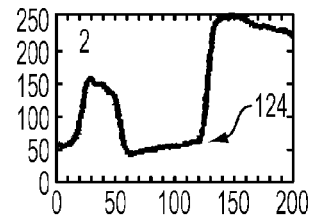
Figure 36D:
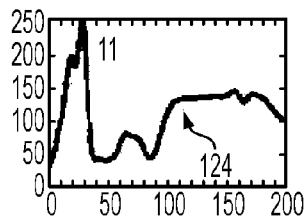
Figure 36E:
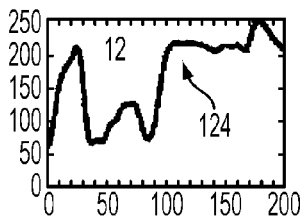
Figure 36F:
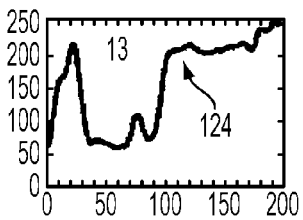
Figure 36G:
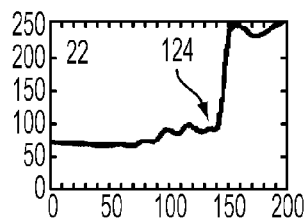
Figure 36H:
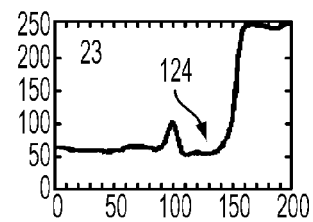
Figure 36I:
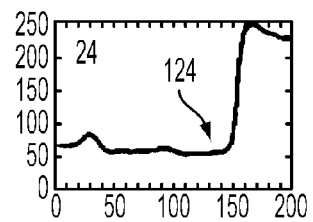

Referring to FIG. 35b, for the second quadrant 150.2, extending from 45 degrees to 135 degrees, within which a target vehicle object 50' would typically transition to a background region within the associated image 90, the transition associated with an edge point 124 is typically characterized by a shift in amplitude of the associated image pixels 100 and a continued relatively low variance in the amplitude thereof within that associated background region. For example, FIGS. 36d-f illustrate the associated polar vectors 126' and the locations of the associated edge points 124 for radial search paths 126 identified in FIG. 34 as 11, 12 and 13, respectively, at respective angles of 88 degrees, 96 degrees, and 104 degrees.

Figure 36J:
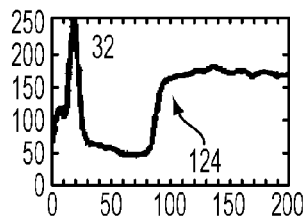
Figure 36K:
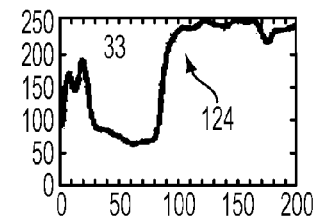
Figure 36L:
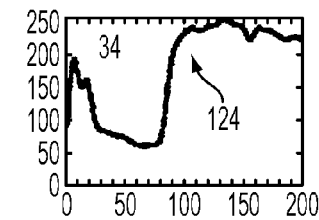

Referring to FIG. 35c, for the fourth quadrant 150.4, extending from 225 degrees to 315 degrees, within which a target vehicle object 50' would typically transition to the ground 99 or a roadway 99' within the associated image 90, the transition associated with an edge point 124 is typically characterized by a shift in amplitude of the associated image pixels 100 and a continued relatively low variance in the amplitude thereof corresponding to the ground 99 or roadway 99'. For example, FIGS. 36j-l illustrate the associated polar vectors 126' and the locations of the associated edge points 124 for radial search paths 126 identified in FIG. 34 as 32, 33 and 34, respectively, at respective angles of 256 degrees, 264 degrees, and 272 degrees.

Figure 37:
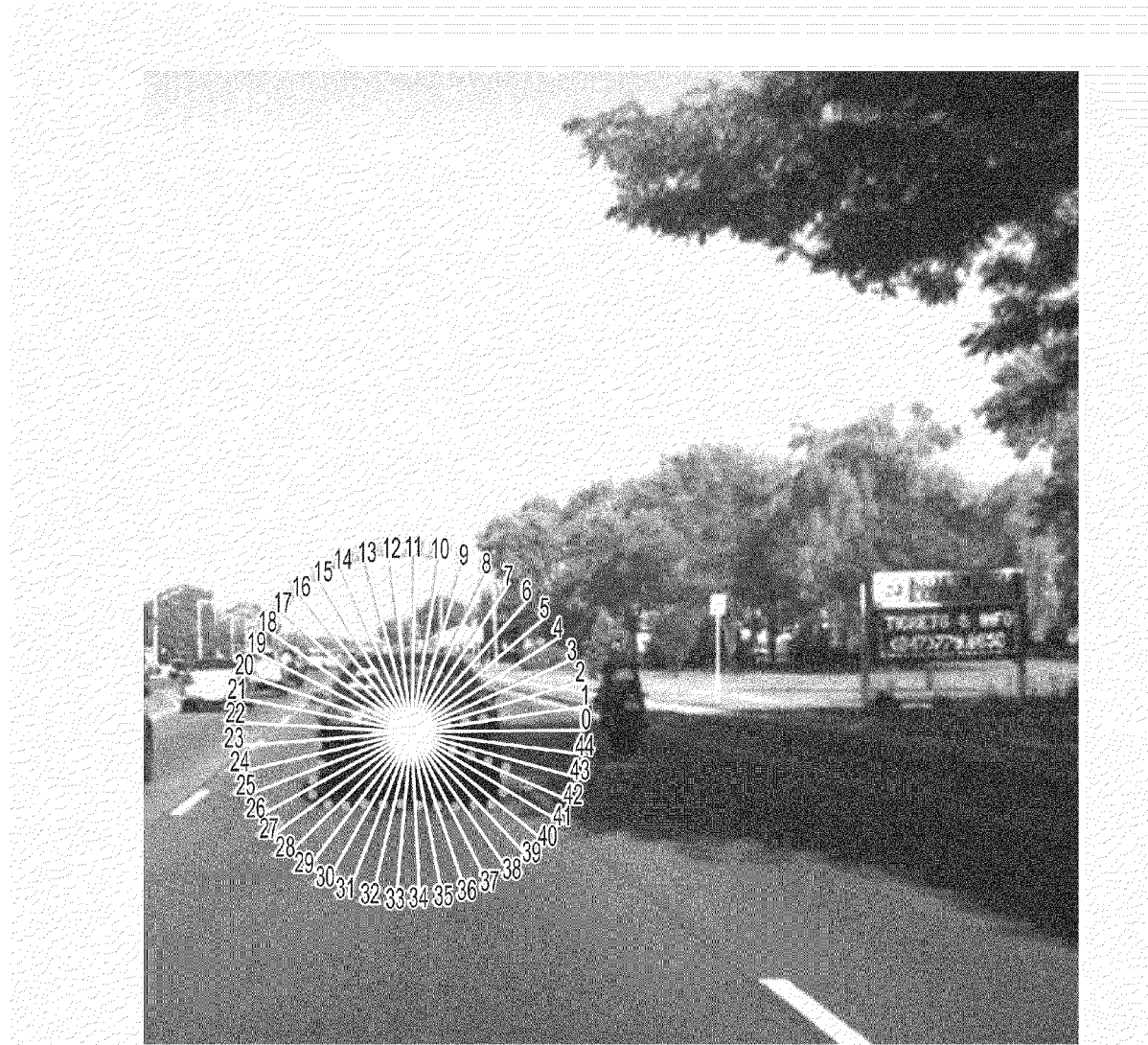
FIG. 37 illustrated a vehicle object partially shadowed by a tree.
Figure 38A:
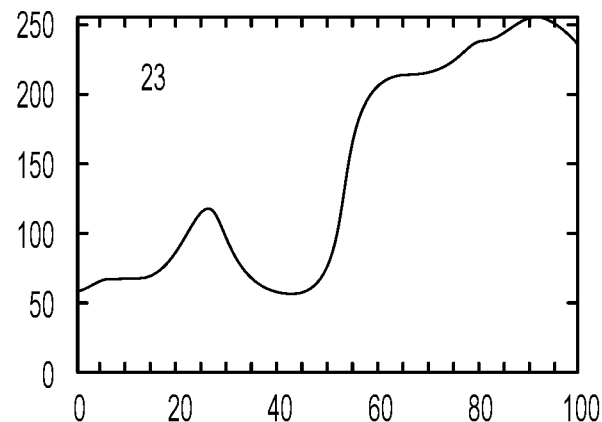
FIGS. 38a-b illustrate plots of the amplitudes of polar vectors for selected radial search paths from FIG. 37.
Figure 38B:
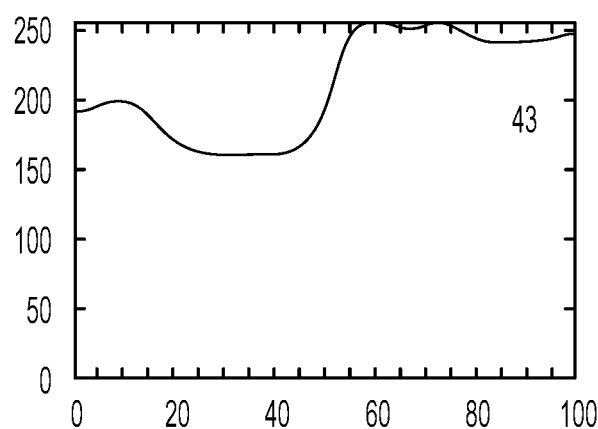

Referring to FIG. 37, the search along radial search paths 126 identified therein as 43, 44 and 0, respectively, at respective angles of 344 degrees, 352 degrees, and 0 degrees, respectively, terminates at the associated boundary of the associated bounding search rectangle 136 without finding associated edge points 124 because of ambiguities in the corresponding locations of the boundary of the associated vehicle object 50' therealong, caused by the vehicle object 50' being within a shadow of an overhanging tree, so that the associated variation in amplitudes of the associated image pixels 100 is too gradual to provide for detecting associated edge points 124. In this situation, the loss of information caused by the ambient illumination conditions is temporary, for example, lasting only a few frames. FIGS. 38a and 38b illustrate the associated polar vectors 126' for radial search paths 126 identified in FIG. 30 as 23 and 43, respectively, at respective angles of 184 degrees and 344 degrees, respectively, wherein for the radial search path 126 illustrated in FIG. 38a, the corresponding associated radial search successfully terminated at a corresponding edge point 124, whereas for the radial search path 126 illustrated in FIG. 38b, the corresponding associated radial search was unable to find a corresponding edge point 124.

Figure 39:
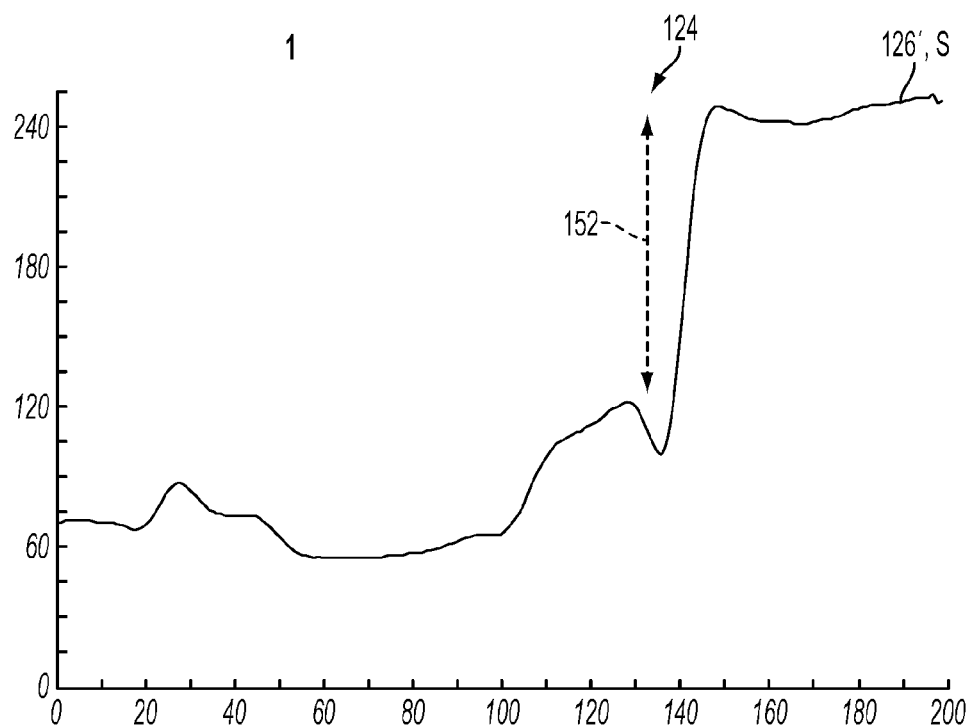
FIG. 39 illustrates a plot of the amplitude of a polar vector associated with one of the radial search paths illustrated in FIG. 34, from which an associated edge point is identified corresponding to a substantial change in amplitude.
Figure 40:
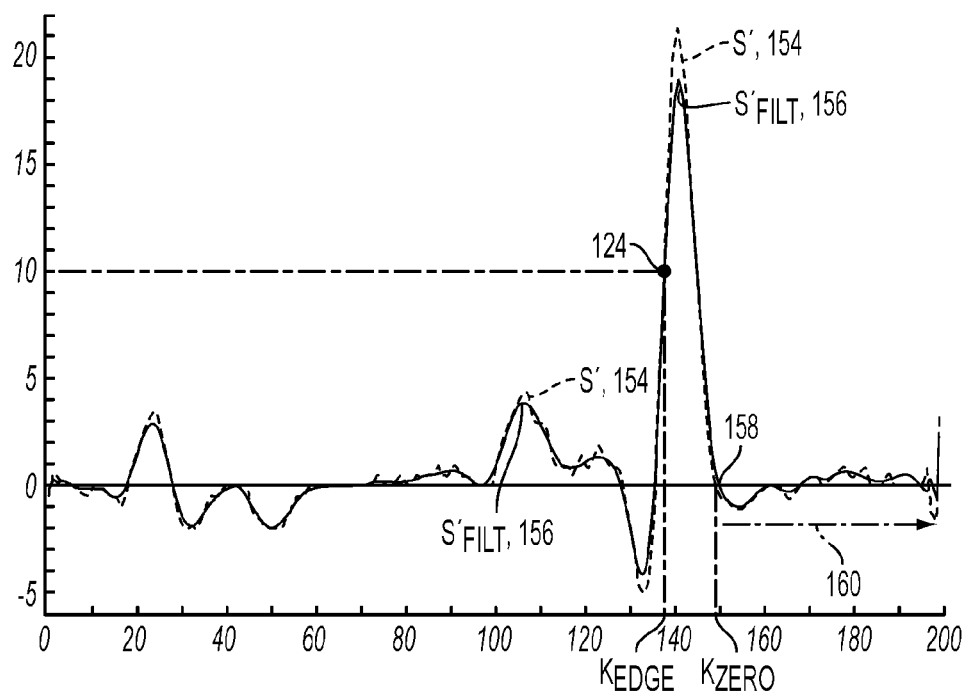
FIG. 40 illustrates a spatial derivative of the polar vector illustrated in FIG. 39, a corresponding filtered version thereof, and an associated relatively low variance distal portion thereof.

More particularly, referring to FIGS. 39 and 40, the process of detecting edge points 124 is illustrated with respect to the polar vector 126' for the radial search path 126 identified in FIG. 34 as 1, wherein FIG. 39—corresponding to FIG. 36b—illustrates the associated polar vector 126', and FIG. 40 illustrates plots of the spatial derivative thereof, before and after filtering, as described more fully hereinbelow. Generally, the location an edge points 124 along a given polar vector 126' is identified in all cases by a relatively large change in amplitude thereof with respect to radial distance along the radial search path 126, and in some cases, followed by a confirmation of relatively low variance within a relatively distal portion of the polar vector 126' that is radially further distant from the location of the relatively large change in amplitude.

In accordance with one embodiment, for a given polar vector 126', for example, identified as S and comprising a plurality of elements $S_k$, a relatively large amplitude shift 152 along S is located by first calculating the spatial first derivative 154, i.e. S', thereof, for example, the central first derivative which is given by:

$$S'_k = \frac{S_{k+1} - S_{k-1}}{2}. \tag{22}$$

This spatial first derivative 154, S', is then filtered with a low-pass, zero-phase-shifting filter, for example, a Savitzky-Golay Smoothing Filter, so as to generate the corresponding filtered spatial first derivative 156, i.e. $S'_{filt}$', for example, in accordance with the method described in William H. PRESS, Brian P. FLANNERY, Saul A. TEUKOLSKY and William T. VETTERLING, *NUMERICAL RECIPES IN C: THE ART OF SCIENTIFIC COMPUTING* (ISBN 0-521-43108-5), Cambridge University Press, 1988-1992, pp. 650-655, which is incorporated by reference herein.

More particularly:

$$S'_{filt}(i) = \sum_{n=-n_L}^{n_R} c_n \cdot S'_{i+n}. \tag{23}$$

wherein $n_R$ and $n_L$ are the number of elements of $S'_{filt}$ before and after the location of the filtered value $S'_{filt}(i)$ to be used to calculated the filtered value $S'_{filt}(i)$, and the associated coefficients $c_n$ are given by:

$$c_n = \{(A^T \cdot A)^{-1} \cdot (A^T \cdot e_n)\}_0 = \sum_{m=0}^{M} \{(A^T \cdot A)^{-1}\}_{0m} n^m, \tag{24}$$

wherein M is the desired order of the filter, i.e. the order of an associated underlying polynomial approximating the data, and represents that highest conserved order, and:

$$A_{ij} = i^j \quad i = -n_L, \ldots, n_R, j = 0, \ldots, M. \tag{25}$$

For example, in one embodiment, the filter order M is set equal to 4, and the symmetric width of the associated moving window is 6, i.e. $n_R=6$ and $n_L=6$, resulting in the following associated filter coefficients from equation (19):

$$c=\{0.04525, -0.08145, -0.05553, 0.04525, 0.16043,\\ 0.24681, 0.27849, 0.24681, 0.16043, 0.04525,\\ -0.05553, -0.08145, 0.04525\} \quad (26)$$

The location of a relatively large amplitude shift 152 along the particular radial search path 126 is then identified as the closest location k to the centroid 116 (i.e. the smallest value of k) for which the absolute value of the filtered spatial first derivative 156, $S'_{filt}$, i.e. $S'_{filt}(k)$, exceeds a threshold value, for example, a threshold value of 10, i.e.

$$k_{Edge}=k||S'_{filt}(k)|>10. \quad (27)$$

This location is found by searching the filtered spatial first derivative 156, $S'_{filt}$ radially outwards, for example, beginning with k=0, with increasing values of k, to find the first location k that satisfies equation (22). Generally relatively small changes in amplitude relatively closer to the centroid 116 than the corresponding edge point 124 are associated with corresponding image structure of the associated object 50. The resulting edge index $k_{Edge}$ is then saved and used to identify the corresponding edge point 124, for example, saved in the associated edge profile vector 124", or from which the associated corresponding radial distance R can be determined and saved in the associated edge profile vector 124". This process is then repeated for each polar vector 126', S associated with each radial search path 126 so as to define the associated edge profile vector 124". Alternatively, rather than explicitly calculating the first spatial derivative as in equation (17), and then filtering this with the above-described smoothing variant of the above-described Savitzky-Golay Smoothing Filter, the Savitzky-Golay Smoothing Filter may alternatively be configured to generate a smoothed first spatial derivative directly from the data of the polar vector 126', S, for example, using a parameter value of ld=1 in the algorithm given in the incorporated subject matter from *NUMERICAL RECIPES IN C: THE ART OF SCIENTIFIC COMPUTING*, so as to provide for a convolution of a radial profile with an impulse-response sequence. However, the pre-calculation of the spatial first derivative 154, S', for example, using equation (17), provides for choosing the associated method, for example, either a central difference as in equation (17), a left difference, a right difference, a second central difference, or some other method. Furthermore, alternatively, some other type of low-pass filter could be used instead of the Savitzky-Golay Smoothing Filter.

As described hereinabove, in respect of the second 150.2 and fourth 150.4 quadrants, the identification of an associated edge point 124 is also dependent upon the detection of a relatively low variance in the amplitude of the polar vector 126', S in the associated background and ground 99 regions abutting the object 50 beyond the location of the associated edge point 124, for example, in accordance with the following method:

Having found a prospective edge point 124, the filtered spatial first derivative 156, $S'_{filt}$ is searched further radially outwards, i.e. for increasing values of k greater than the edge index $k_{Edge}$, e.g. starting with $k_{Edge}+1$, in order to locate the first occurrence of a zero-crossing 158 having a corresponding zero-crossing index $k_{zero}$ given by:

$$k_{zero}=k|(S'_{filt}(k)\geq 0)\&\&(S'_{filt}(k+1)<0). \quad (28)$$

Then, beginning with index k equal to the zero-crossing index $k_{zero}$, a corresponding weighted forward moving average $V_k$ is calculated as:

$$V_k = \sum_{i=0}^{4} wgt(i) \cdot S'_{filt}(k+i) \quad (29)$$

wherein the associates weighting vector wgt is given by:

$$wgt=\{0.35, 0.25, 0.20, 0.10, 0.10\} \quad (30)$$

If the value of the weighted forward moving average $V_k$ is less than a threshold, for example, if $V_k<5$, then the index k is incremented, and this test is repeated, and the process is repeated over the remaining relatively distal portion 160 of the polar vector 126', S as long as the value of the weighted forward moving average $V_k$ is less than the threshold. If for any value of the index k, the value of the weighted forward moving average $V_k$ is greater than or equal to the threshold, then the search is terminated and the corresponding edge point 124 of the associated radial search path 126 is marked as indeterminate. Otherwise, if every value of the weighted forward moving average $V_k$ is less than the threshold for the remaining points of the polar vector 126', S along the radial search path 126, then the resulting edge point 124 is given from the previously determined corresponding edge index $k_{Edge}$.

Referring to FIGS. 41a through 41d, the range-cued object detection process 1200 provides for more robustly and accurately detecting the edge profile 124' of an object in comparison with a detection limited to the use of information from an associated range map image 80 alone. For example, FIGS. 41a through 41c illustrate a first edge profile 124'$^A$ of a vehicle object 50' that was determined exclusively from the range map image 80 alone, for example, in accordance with a process disclosed in U.S. application Ser. No. 11/658,758 filed on 19 Feb. 2008, based upon International Application No. PCT/US05/26518 filed on 26 Jul. 2005, claiming benefit of U.S. Provisional Application No. 60/591,564 filed on 26 Jul. 2004, each of which is incorporated by reference in its entirety. By comparison, FIGS. 41b and 41d illustrate a corresponding second edge profile 124'$^B$ of the vehicle object 50', but determined using the above-described range-cued object detection process 1200, whereby a comparison of the first 124'$^A$ and second 124'$^B$ edge profiles in FIG. 41b shows that the latter exhibits substantially better fidelity to the vehicle object 50' than the former. The improved fidelity, in turn, provides for a more accurate discrimination of the underlying vehicle object 50'.

Figure 42:
FIG. 42 illustrates a half-tone image of a scene containing a plurality of vehicle objects.
Figure 43:
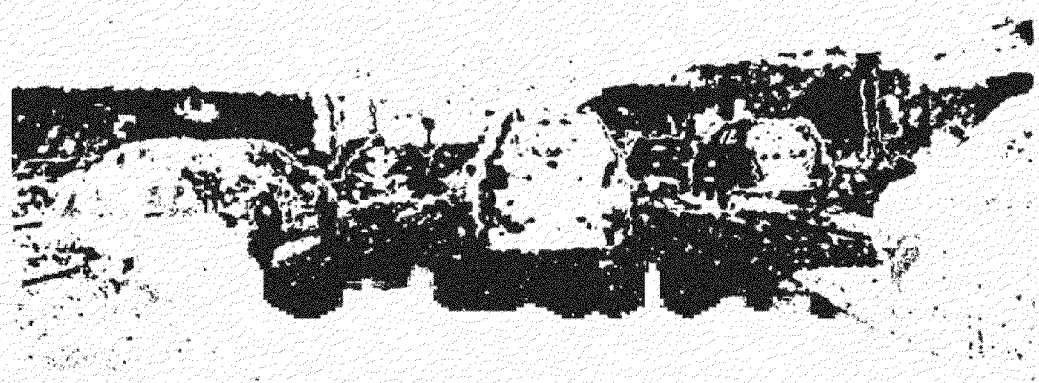
FIG. 43 illustrates a range map image generated by a stereo-vision system, of the scene illustrated in FIG. 42.
Figure 44:
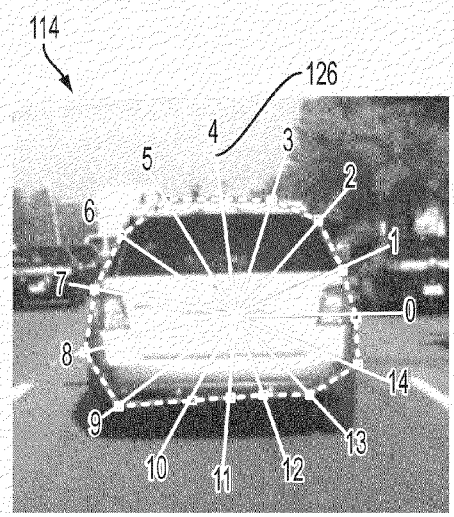
FIG. 44 illustrates a half-tone image of one of the vehicle objects illustrated in FIG. 42 upon which is superimposed fifteen associated uniformly-spaced centroid-centered radial search paths and associated edge locations.
Figure 45:
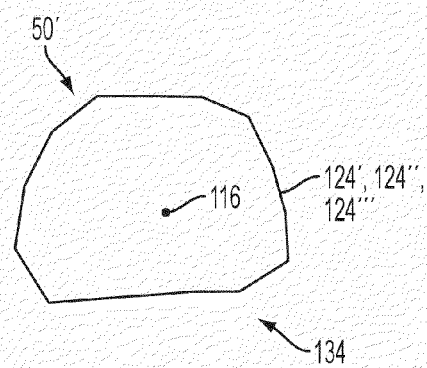
FIG. 45 illustrates a profile of the edge locations from FIG. 44.

Referring to FIGS. 42-45, the range-cued object detection process 1200 is applied to the visual scene 24 illustrated in FIG. 42 so as to generate the range map image 80 illustrated in FIG. 43, from which a region of interest (ROI) 114 associated with a near-range vehicle object 50' is processed using 15 radial search paths 126 illustrated in FIG. 44 overlaid upon a corresponding portion of the visual scene 24 from FIG. 42, from which the corresponding edge profile 124' illustrated in FIG. 45 is detected, and provided in the form of an associated transformed edge profile vector 124'''—or the corresponding edge profile vector 124" and associated centroid 116 location—to the object discrimination system 92 so as to provide for discriminating or classifying the associated detected object 134.

In accordance with a first aspect, the range-cued object detection system 10, 10' uses the associated stereo-vision system 16, 16' alone for both generating the associated range map image 80 using information from both associated stereo-vision cameras 38, and for discriminating the object using one of the associated first 40.1 or second 40.2 stereo image components from one of the associated stereo-vision cameras 38.

Figure 46:
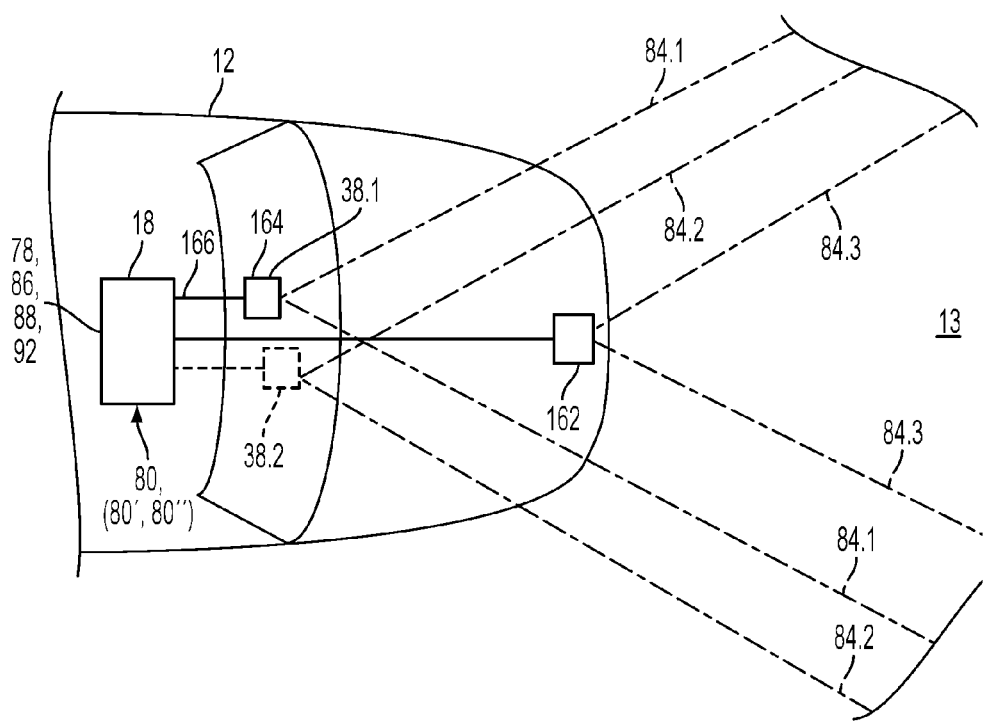
FIG. 46 illustrates a second aspect of a range-cued object detection system.

Referring to FIG. 46, in accordance with a second aspect, the range-cued object detection system 10, 10" incorporates separate ranging system 162 that cooperates with either the stereo-vision system 16, 16' or with a separate camera 164, so as to provide for substantially the same functionality as described hereinabove for the first aspect of the range-cued object detection system 10, 10'. In one set of embodiments, the ranging system 162 provides for determining the associated range map image 80. The range map image 80 is then processed in cooperation with an associated mono-image 166 from either the first 40.1 or second 40.2 stereo image components of one of the first 38.1, 38.1' or second 38.2, 38.2' stereo-vision cameras, or from a mono-image 166 from the separate camera 164, as described hereinabove for the first aspect, the range-cued object detection system 10, 10' so as to provide for detecting and discriminating any objects 50 within the associated visual scene 24 that is imaged by either the stereo-vision system 16, 16' or the separate camera 164. In another set of embodiments, a range map image 80' from the stereo-vision system 16, 16' is combined with a separately generated range map image 80"—or corresponding ranging information—from the ranging system 162 using a process of sensor fusion, so as to provide for a more robust and accurate composite range map image 80, that together with either the first 40.1 or second 40.2 stereo image components of one of the first 38.1, 38.1' or second 38.2, 38.2' stereo-vision cameras is used as described hereinabove for the first aspect, the range-cued object detection system 10, 10' so as to provide for detecting and discriminating any objects 50 within the associated visual scene 24 that is imaged by the stereo-vision system 16, 16'.

For example, in one set of embodiments, the ranging system 162 comprises either a radar or lidar system that provides a combination of down-range and cross-range measurements of objects 50 within the field of view 84.3 thereof. In one set of embodiments, when the host vehicle 12 and objects 50 are in alignment with one another relative to the ground 99, either a planar radar or planar lidar are sufficient. Objects 50 not in the same plane as the host vehicle 12 can be accommodated to at least some extent by some embodiments of planar radar having a vertical dispersion of about 4 degrees, so as to provide for detecting objects 50 within a corresponding range of elevation angles ϕ. Some planar lidar systems have substantially little or no vertical dispersions. A greater range of elevation angles ϕ when using either planar radar or planar lidar can be achieved by either vertically stacking individual planar radar or planar lidar systems, or by providing for scanning the associated beams of electromagnetic energy. The range map image 80, 80" from the ranging system 162 is co-registered with either the first 40.1 or second 40.2 stereo image components of one of the first 38.1, 38.1' or second 38.2, 38.2' stereo-vision cameras, or from a mono-image 166 from the separate camera 164, so as to provide for transforming the centroid 116 locations determined from the segmented range map image 80, 80" to corresponding locations in either the first 40.1 or second 40.2 stereo image components of one of the first 38.1, 38.1' or second 38.2, 38.2' stereo-vision cameras, or from a mono-image 166 from the separate camera 164.

As used herein, the term centroid 116 is intended to be interpreted generally as a relatively-central location 116 relative to a collection of associated two-dimensional range bins 108 of an associated region of interest 114, wherein the relatively-central location 116 is sufficient to provide for discriminating an associated object 50 from the associated edge profile vector 124" generated relative to the relatively-central location 116. For example, in addition to the canonical centroid 116 calculated in accordance with equations (5.1) and (6.1) or (5.2) and (6.2), the relatively-central location 116 could alternatively be given by corresponding median values of associated cross-range CR and down-range DR distances of the associated two-dimensional range bins 108, or average values of the associated maximum and minimum cross-range CR and down-range DR distances of the associated two-dimensional range bins 108, or some other measure responsive to either the associated two-dimensional range bins 108, responsive to an associated two-dimensional nominal clustering bin 113, or responsive to a two-dimensional nominal clustering bin identified from corresponding one-dimensional cross-range 121' and down-range 121" clustering bins.

Furthermore, the relatively-central location 116 may be different for stages of the associated range-cued object detection process 1200. For example, the relatively-central location 116 calculated in step (1518) and used and possibly updated in step (1528) of the associated clustering process 1500, for purposes of clustering the associated two-dimensional range bins 108 in a top-down space 102, could be recalculated using a different metric either in step (1208) or step (1214), or both, the value from the latter of which is used in step (1220) of the range-cued object detection process 1200. For example, even if from steps (1518), (1528) and (1208) the relatively-central location 116 is not a canonical centroid 116, a corresponding canonical centroid 116 could be calculated in step (1214) with respect to image space 136' from the corresponding associated range bins 108.

Accordingly, the range-cued object detection system 10 provides for detecting some objects 50 that might not otherwise be detectable from the associated range map image 80 alone. Notwithstanding that the range-cued object detection system 10 has been illustrated in the environment of a vehicle 12 for detecting associated near-range vehicle objects 50', it should be understood that the range-cued object detection system 10 is generally not limited to this, or any one particular application, but instead could be used in cooperation with any combination of a ranging 152 or stereo vision 16 system in combination with co-registered mono-imaging system—for example, one of the stereo-vision cameras 38 or a separate camera 164—so as facilitate the detection of objects 50, 50' that might not be resolvable in the associated range map image 80 alone, but for which there is sufficient intensity variation so as to provide for detecting and associated edge profile 124' from either the first 40.1 or second 40.2 stereo image components of one of the first 38.1, 38.1' or second 38.2, 38.2' stereo-vision cameras, or from a mono-image 166 from the separate camera 164.

For a range-cued object detection system 10 incorporating a stereo-vision system 16, notwithstanding that the stereo-vision processor 78, image processor 86, object detection system 88 and object discrimination system 92 have been illustrated as separate processing blocks, it should be understood that any two or more of these blocks may be implemented with a common processor, and that the particular type of processor is not limiting. Furthermore, it should be understood that the range-cued object detection system 10 is not limited in respect of the process by which the range map image 80 is generated from the associated first 40.1 and second 40.2 stereo image components.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of filtering an image, comprising:
   a. identifying a plurality of homogeneity regions in relative pixel space, wherein each homogeneity region of said plurality of homogeneity regions comprises a plurality of active relative pixels located at a corresponding plurality of locations that are located relative to a relatively central pixel within a boundary circumscribing a composite of all of said plurality of homogeneity regions, said plurality of locations of said plurality of active relative pixels are symmetric relative to a corresponding radially-extending axis extending outwards in a corresponding polar direction from the location of said relatively central pixel to said boundary, said plurality of locations of said plurality of active relative pixels include all active relative pixels thereof that are intersected by said radially-extending axis, and each different homogeneity region of said plurality of homogeneity regions corresponds to a different said radially-extending axis extending in a different said polar direction relative to an orientation of said boundary;
   b. receiving or determining a location of a pixel of the image to be filtered;
   c. for each of said plurality of homogeneity regions:
      i. selecting one of said plurality of homogeneity regions;
      ii. calculating a deviation associated with said one of said plurality of homogeneity regions, wherein said relatively central pixel of said plurality of homogeneity regions is co-located with said pixel of said image, said deviation is given by a sum of a plurality of associated difference values, and each associated difference value of said plurality of associated difference values is given by the absolute value of a difference between a value of said pixel to be filtered and a value of a neighboring pixel of said image at a relative location corresponding to a corresponding relative location of a selected active relative pixel of said homogeneity region, for each of said plurality of active relative pixels of said one of said plurality of homogeneity regions corresponding to a corresponding plurality of neighboring pixels of said image, wherein each said neighboring pixel of said image is one of said plurality of neighboring pixels of said image;
   d. finding at least one said homogeneity region of said plurality of homogeneity regions for which a corresponding said deviation is a minimum;
   e. generating a filtered pixel value of said pixel of said image to be filtered, wherein said filtered pixel value is responsive to values of each of said plurality of neighboring pixels of said image to be filtered, and each said neighboring pixel of said plurality of neighboring pixels corresponds to a different said selected active relative pixel of said at least one said homogeneity region for which said corresponding said deviation is said minimum.

2. A method of filtering an image as recited in claim 1, wherein each said polar direction is selected from the group consisting of angles of 45 degrees, 90 degrees, 135 degrees, 215 degrees, 270 degrees and 315 degrees as measured from an X-axis of said relative pixel space, wherein a row dimension of said relative pixel space is aligned with said X-axis.

3. A method of filtering an image as recited in claim 1, wherein said plurality of active relative pixels comprise three relatively-proximal pixels and one relatively distal pixel, each of said three relatively-proximal pixels is either laterally adjacent or diagonally adjacent to said relatively central pixel, and said one relatively distal pixel is either laterally adjacent or diagonally adjacent to, and relatively distal with respect to, one of said three relatively-proximal pixels along said radially-extending axis.

4. A method of filtering an image as recited in claim 1, wherein said filtered pixel value is generated from an average of said values of said plurality of neighboring pixels.

5. A method of filtering an image as recited in claim 4, wherein a count of said plurality of neighboring pixels is equal to a power of two, and said average of said values of said plurality of neighboring pixels is determined from a binary right-shift of a sum of said values of said plurality of neighboring pixels by an amount corresponding to said power of two.

6. A method of filtering an image as recited in claim 1, wherein said filtered pixel value is generated as a median value of said values of said plurality of neighboring pixels.

* * * * *